United States Patent [19]
Bonke et al.

[11] Patent Number: 5,661,848
[45] Date of Patent: Aug. 26, 1997

[54] MULTI-DRIVE CONTROLLER WITH ENCODER CIRCUITRY THAT GENERATES ECC CHECK BYTES USING THE FINITE FIELD FOR OPTICAL DATA FOR APPENDING TO DATA FLOWING TO HDA

[76] Inventors: Carl E. Bonke, 9 Via Nandina, Rancho Santa Margarita, Calif. 92688; Devon Worrell, 8842 Williamsburg, Westminster, Calif. 92683; Kenneth D'Souza, 29 Yorktown, Irvine, Calif. 92720; Kiem Nguyen, 17859 Oak St., Fountain Valley, Calif. 92708

[21] Appl. No.: 302,639

[22] Filed: Sep. 8, 1994

[51] Int. Cl.$^6$ .................................................. G06F 13/00
[52] U.S. Cl. ................ 395/439; 364/236.2; 364/238.3; 364/248.1; 364/239; 364/926.93; 364/968; 395/182.04; 395/500; 360/48; 360/69; 371/377
[58] Field of Search ................ 364/200, 231.5, 364/236, 238, 239, 952, 957, 968, 236.2, 238.3, 248.1, 926.93; 360/48, 69; 371/37.7; 395/182.04, 439, 500, 600, 800, 894

[56] References Cited

U.S. PATENT DOCUMENTS

| | | | |
|---|---|---|---|
| 4,103,328 | 7/1978 | Dalmasso | 364/200 |
| 4,246,637 | 1/1981 | Brown et al. | 364/200 |
| 4,268,906 | 5/1981 | Bourke et al. | 364/200 |
| 4,602,331 | 7/1986 | Sheth | 364/200 |
| 4,802,152 | 1/1989 | Markvoort et al. | 369/32 |
| 4,805,090 | 2/1989 | Coogan | 364/200 |
| 4,825,357 | 4/1989 | Ovies et al. | 395/849 |
| 4,864,532 | 9/1989 | Reeve et al. | 364/900 |
| 4,897,840 | 1/1990 | Weiss et al. | 371/40.1 |
| 4,905,184 | 2/1990 | Giridhar et al. | 364/900 |
| 5,016,121 | 5/1991 | Peddle et al. | 360/39 |
| 5,058,004 | 10/1991 | Ravid | 395/822 |
| 5,121,492 | 6/1992 | Saville, III et al. | 395/500 |
| 5,150,465 | 9/1992 | Bush et al. | 395/834 |
| 5,159,336 | 10/1992 | Rabin et al. | 341/51 |
| 5,187,615 | 2/1993 | Miyazawa et al. | 360/46 |
| 5,193,168 | 3/1993 | Corrigan et al. | 395/600 |
| 5,261,072 | 11/1993 | Siegel | 395/842 |
| 5,266,781 | 11/1993 | Warwick et al. | 235/375 |
| 5,293,590 | 3/1994 | Keener et al. | 395/310 |
| 5,307,471 | 4/1994 | Ishikawa | 395/280 |
| 5,313,612 | 5/1994 | Satoh et al. | 395/489 |
| 5,313,617 | 5/1994 | Nakano et al. | 395/500 |

OTHER PUBLICATIONS

SCSI Understanding the Small Computer System Interface, NCR Corporation 1990 Prentice Hall, p. 55.

*Primary Examiner*—Thomas C. Lee
*Assistant Examiner*—Anderson I. Chen

[57] ABSTRACT

A multiple-drive data-storage system includes a multiple-drive controller, a fixed-media disk drive, and a removable-media, optical-disk disk drive. Preferably, the controller is defined on a printed circuit board assembly attached to a head disk assembly containing the fixed media, and includes a host interface and a command decoder for receiving and decoding commands. A shared buffer memory has allocated storage space for data read from the fixed-media and from the removable optical disks. An error corrector corrects data errors including errors in address-defining data retrieved from headers in the removable optical disks. Caching of data read from the optical disks onto the fixed media allows high speed operation of the combined system and reduced blocking of the host I/O bus.

20 Claims, 30 Drawing Sheets

MULTI-DRIVE CONTROLLER WITH ENCODER CIRCUITRY THAT GENERATES ECC CHECK BYTES USING THE FINITE FIELD FOR OPTICAL DATA FOR APPENDING TO DATA FLOWING TO HDA

BACKGROUND OF THE INVENTION

1. Field of the Invention

This invention relates to a low-cost, multiple-drive, data-storage system. More particularly, it relates to such a data-storage system comprising a controller that preferably is incorporated within a fixed-media disk drive and that decodes commands provided by a host computer to control both the fixed-media disk drive and a removable-media, optical-disk, disk drive.

2. Description of the Prior Art

Price competition has long been intense among manufacturers of various kinds of mass-market computer equipment. Such competition began to intensify in the early 1980's as desktop personal computers ("PC's") became popular. Throughout the 1980's and into the 1990's, such competition has remained relentless in the market for these desktop PC's, and the later-commercialized PC's such as laptops, and notebooks. Each of the foregoing PC's and each other programmable product that contains a central processing unit ("CPU"), a random access memory (RAM), and an input/output ("I/O") interface is referred to herein as a "host."

In the market for peripherals, such price competition has been and continues to be at least as intense as the price competition in the market for hosts. This is particularly true for products containing or consisting of drive mechanisms; such as small form factor fixed-media disk drives, and small form factor removable-media disk drives including floppy-disk disk drives and optical-disk disk drives. As used herein, the term "disk mechanism" applies equally to each of a variety of products, including "OEM-level" products (i.e., products which are generally sold only at the original equipment manufacturer ("OEM") level) and "retail-level" products (products which are sold at the retail level). One type of OEM-level, disk mechanism is interchangeably called a "head disk assembly" or an "HDA." One type of retail-level product that contains a disk mechanism is interchangeably referred to as a "fixed disk drive" or "hard disk drive," and generally includes a HDA and a controller for it. One type of OEM-level, removable-media disk mechanism into which an optical disk can be loaded is generally referred to herein as a "player mechanism"; one type of retail-level, removable-media product containing a disk mechanism, referred to as an "optical-disk disk drive," includes such a player mechanism and a controller for it. Each of these OEM-level and retail-level products and each other product that includes a housing containing a disk-supporting spindle, a spindle motor, a transducer, and a transducer-supporting actuator assembly, arranged to provide for reading data from at least one rotating disk, is within the scope of the term "disk mechanism," as used herein.

Reducing manufacturing cost to be less than those of competitors is generally a condition precedent to a manufacturer having its products enjoy commercial success in these markets. A reduction in either the number or cost of components can be quite significant to overall manufacturing costs, and accordingly extensive research and development efforts have been continuously expended by essentially all major manufacturers in this broad market with the common goal being to design and develop products incorporating fewer and less costly components.

One factor that has enabled computer-equipment manufacturers to reduce the number of components in their products is that semiconductor-fabrication technology has made it practical to combine many separate circuit structures into a single component; i.e., an integrated circuit ("IC"). This type of cost-reduction approach, involving combining of components, has occurred with great frequency in recent years. Another type of cost-reduction approach, involving integration of products, is much more rare. This cost-reduction approach is exemplified by a historical development in multiple-drive, data-storage systems.

In the early 1980's, a typical multiple-drive, data-storage system for a host such as a desktop PC included a so-called "storage board," and at least two so-called "dumb" magnetic disk drives. In such a data storage system, one of the two drives used floppy disks (i.e., removable media), and the other used built-in disks generally having higher capacity than a single floppy disk. Such a storage board generally included host-interface controller circuitry for interfacing the data-storage system to an I/O bus in the host. The host-interface controller circuitry operates in accordance with the protocol used for communication via the host I/O bus. Generally, such a storage board also includes a microprocessor, various general-purpose IC's such as memory circuits defining read-only memory ("ROM") and random-access memory ("RAM"), and various application-specific integrated circuits ("ASIC's"). These ASIC's include IC's that define a "channel" for performing functions involved in timing control needed for reading and writing data, circuits for implementing the host interface circuitry, and circuits for providing multiple peripheral-interface controllers for interfacing to a floppy disk drive and to a "dumb" fixed-disk drive conforming to the ST506 standard.

During the 1980's, the capacity and performance requirements for fixed-media disk drives increased, and "smarter" fixed-media, ST506 disk drives became commercially available. Such a "smarter" fixed-media ST506 disk drive includes a microprocessor and a memory for storing firmware, etc., for the microprocessor.

By the late-1980's, such multiple-drive, data-storage systems had been improved, and reduced in cost, by introduction of the intelligent fixed-disk drives referred to as "IDE drives" (The term "IDE" is an acronym for "Integrated Drive Electronics," and the term "IDE interface" is used interchangeably with interfaces defined in certain "ATA" specifications discussed below.) An IDE drive generally includes an HDA and a controller having an intelligent interface for communicating with a host computer and a low-level interface for communicating with the HDA. In contrast to the combination of two separate products, a "storage board" having its own microprocessor, and an ST506 drive also having its own microprocessor, the controller within an IDE drive generally includes a microprocessor that performs most if not all of the functions performed by the two microprocessors in the older storage-board based systems. This and other reductions in the number of components has contributed significantly to lower manufacturing costs, and has been accompanied by various performance improvements. One such performance improvement that accompanied the introduction of IDE drives involves caches in such drives. Nevertheless, the need for further cost reductions, particularly when combined with performance improvement, continues unabated. As for performance improvement, a need continues to exist for an improved architecture for allowing independent drives to operate concurrently (i.e., in a time-overlapped manner).

Furthermore, a problem that has not been solved since the introduction of the intelligent disk drives relates to physical loading (current loading, capacitance loading, etc.) of the host I/O bus. In storage-board based systems, the drives themselves did not add physical loading to the host I/O bus; rather, only a storage board added such physical loading, and multiple drives could be used without adding to the physical loading of the host I/O bus. However, present multiple-drive systems entail multiple physical loads of the host I/O bus.

It is becoming increasingly common for a host to be equipped with a removable-media, optical-disk, disk drive. It is particularly common for such a disk drive to accept a so-called "compact disk" ("CD"). One type of CD is a "CD ROM" and a compatible drive is called a "CD ROM disk drive." A retail-level CD ROM disk drive includes a controller having an intelligent interface for communicating with a host computer. The intelligent interface may be a SCSI interface ("SCSI" is an acronym for Small Computer System Interface) or an IDE interface. The controller also includes circuitry for controlling the player mechanism. The player mechanism itself comprises a housing that opens to provide for loading an optical disk, a spindle for supporting the loaded optical disk, a spindle motor for rotating the spindle-supported optical disk, an optical-to-electrical transducer, and an electrically-controllable positioning structure for positioning the transducer relative to the rotating optical disk.

Whereas a typical magnetic floppy disk is capable of storing in the range of approximately one megabyte (1 MB), a typical CD ROM disk is capable of storing in the range of approximately 600 megabytes (600 MB). The ability of CD ROM disks to provide 600 megabytes or greater of digital audio, video, or other data in a transportable optically readable reflective disk has advantages over the lower capacity floppy disks, particularly for audio and video storage applications, including multimedia.

In addition to CD ROM disks and compatible drives (i.e., CD ROM disk drives), other types of optical disks and compatible drives include audio compact disks and compatible drives (generally called CD players) which were introduced commercially in the early 1980s. This original type of CD technology is typically referred to as CD-DA (Digital Audio) to distinguish it from the alternate versions of CD which have subsequently become available.

Commercially available CD ROM disk drives incorporate the same basic player mechanism as a CD-DA player but in addition incorporate decoding, error correction and other circuitry for reading data other than audio from the disk surface. As indicated by the name CD ROM, the data stored in this manner are readable only. In addition, extensions of the basic CD ROM technology have become available including CD-I (Interactive), CD-XA for Extended Architecture, CD-R or CD-Recordable, also known as CD-WO (Write Once), and CD-MO (Magneto Optical, a recordable form of CD). Currently, such CD variations are typically provided in form factors compatible with 120 mm optical disks as well as form factors compatible with 80 and 64 mm optical disks. Recently, a CD-MO, 64 mm disk format has been introduced by Sony that is referred to as CD minidisc or CD-MD.

Although some of these CD technologies have overcome the inability to write data onto the more conventional CD-DA or CD ROM type of optical disk, and although all provide for removable optical disk media, nonetheless such CD technologies have disadvantages. In particular, they are all characterized by a relatively slow access speed and data-transfer rate compared to fixed-media disk drives. This relative slowness of reading data from a CD creates very noticeable delays where the host must repeatedly go to the CD for data. This is particularly the case where applications, such as multimedia, requiring large amounts of data to be frequently transferred from permanent storage into working memory are being run on the host. Additionally, problems arise with "blocking accesses," particularly in relatively low-cost implementations such as those based on the IDE interface. For example, while the host is communicating with a CD ROM disk drive via the IDE bus, the host is blocked from communicating with a fixed-media disk drive that is connected to the common IDE interface. This blocking of the host prevents the host from taking advantage of the CD latency period to perform other tasks.

Commercially available multiple-drive systems incorporating both a fixed-media drive and removable-media, optical-disk, disk drive have a significant cost disadvantage. In such a typical commercially available system, the component count is quite high. Typically, each such drive has a host-interface controller; each has at least one microprocessor and an associated ROM storing firmware for programmably controlling the microprocessor; each has channel circuitry for processing data subject to correction by error-correcting means; each generally has buffer RAM and an associated buffer-manager circuitry. In addition to having such a high component count, such a commercially available multiple-drive storage system may, as discussed above, lack needed performance features such as concurrency of operations, and may suffer from blocking in the I/O path supporting the CD player during the CD latency period.

In summary, a need presently exists for a way to enhance the efficiency of a multiple-drive system employing both a fixed-media disk drive and a removable-media, optical-disk drive. Further, a need exists for a way to reduce the cost and space associated with such a multiple-drive system.

SUMMARY OF THE INVENTION

This invention provides a new and advantageous solution to the problems discussed above. This solution reduces the costs and performance bottlenecks that have adversely affected multiple-drive data-storage systems based on prior art architectures. This solution reduces the number of components redundantly incorporated in high-component count products, improves the speed of performance of the data-storage system, and reduces the physical loading of the host I/O bus.

This invention can be regarded as a controller for a multiple-drive data-storage system by which a host accesses at least two disk mechanisms. The host includes an input/output (I/O) interface. One of the two disk mechanisms comprises a head disk assembly (HDA) having fixed-media therein, and the other disk drive comprises a player mechanism having means for loading and unloading at least one optical disk therein. Preferably, the controller is implemented on a printed circuit board assembly ("PCBA") attached to the HDA.

The controller comprises a plurality of independently-operable communication means including an I/O communication means, an HDA communication means, and a player-mechanism communication means. The controller further comprises command decoding means; player-mechanism control means; HDA control means; buffer memory means; error correcting means; and buffer manager means.

The I/O communication means is shared by the two disk mechanisms and provides for communication of commands, status, and data via the host I/O interface. The host transmits host commands which the controller receives via the I/O communication means. The command decoding means is shared by the two disk mechanisms, and provides for decoding host commands received via the I/O communication means.

The player-mechanism control means is responsive to the command decoding means, and provides control signals to the player mechanism via the player-mechanism communication means to cause a read operation to be performed to cause optical-disk data to be received via the player-mechanism communication means. The optical-disk data include address-defining data. Such address-defining data is part of the standard header data read from optical disks such as CD ROM optical disks.

The HDA control means is responsive to the command decoding means, and provides control signals to the HDA via the HDA communication means to cause performance of a read operation to cause data to be received via the HDA communication means.

The buffer manager means includes buffer-writing means for storing, in the buffer memory means, optical-disk data received from the player mechanism and fixed-disk data from the HDA, and includes buffer-reading means for retrieving data from the buffer memory means.

The error correcting means includes means for providing corrected data, including corrected data for the address-defining data, to the buffer-writing means.

The I/O communication means receives data from the buffer-reading means, and includes means for transferring, to the host via the host I/O interface, such data received from the buffer-reading means.

A multiple-drive controller as summarized above has significant advantages because the sharing of structure by the two drive mechanisms results in a reduction of component count compared with prior art systems incorporating fixed-media and optical-disk disk drives. Having the buffer memory means shared by the two drive mechanisms not only reduces component count, it also offers the opportunity for implementing data caching functions that improve data storage system performance.

Furthermore, employing the error correction means to provide for correcting errors in the address-defining data is a distinguishing and advantageous feature.

An independent distinguishing feature of a multiple-drive controller according to this invention involves structure and operations for storing a table of information corresponding to a table of contents pre-recorded on an optical disk loaded within the player mechanism. A standard CD ROM has at least one such table of contents, there being one for each "session."

Preferably, a controller according to this invention provides a multi-tasking feature. According to this feature, the multiple-drive controller includes means for receiving a plurality of read commands in arbitrary sequences, including a sequence of a first-received read command applicable to the player mechanism to retrieve data stored on an optical disk loaded therein, and a second-received read command received at a time prior to the completion of execution of the first-received read command and applicable to the HDA to retrieve data stored on the fixed media therein. In accord with this preferred feature, the controller further includes multi-tasking sequencing means shared by the two disk mechanisms for controlling sequences of operations performed in execution of decoded commands.

A controller in accord with certain embodiments of the invention has an interface means compatible with a relatively low-level interface means in the player mechanism. In such embodiments, the distribution of control circuitry between the controller and the player mechanism is such that a minimum of control electronics resides in the player mechanism, and primarily includes an optical transducer and an optical-transducer positioning mechanism, a spindle and a spindle motor. This approach tends to maximize the reduction in component count for a complete multiple-drive data-storage system.

A controller in accord with certain alternative embodiments has an interface means that is more intelligent than the above-mentioned relatively low-level interface means. In such alternative embodiments, the player mechanism includes certain circuitry including a servo control circuit referred to in this art as an analog signal processor ("ASP") and includes a data-signal decoding circuit referred to in this art as a digital signal processor ("DSP").

This invention can also be regarded as an integrated disk drive, adapted for use with a host and containing a controller having a plurality of independently operable interface means. One interface means provides for communicating with a compatible interface means in an external disk drive. Another interface means is shared by the integrated disk drive and the external disk drive, and provides for communicating with a compatible interface means in the host.

This invention enables caching of data from both disk mechanisms into the shared buffer memory. Furthermore, another level of caching is possible; i.e., in response to a command from the host, data read from the optical disk loaded in the player mechanism may be copied onto the fixed-media of the HDA, via the common buffer, as well as provided to the host from the buffer. Also, additional data may be read forward from the requested data and cached first within the data buffer and subsequently within the fixed-media disk mechanism. This cached data are thus immediately available when the host subsequently requests data. Also, during the time the data are being read from the removable media and cached within the fixed-media disk mechanism, the host is free to perform other tasks involving the I/O interface. Data caching may also be employed for writing data continuously onto writable optical disks, freeing the host's memory from such a caching function as well as reducing associated host CPU time and I/O interface usage.

Furthermore, where numerous reads from the removable media are anticipated, some or all of the data from the removable media, depending on the relative capacities of the two drive mechanisms and the amount of data desired, may be copied directly onto the fixed-media without being transferred over the host I/O interface. The fixed-media disk drive then operates as a primary source of the data for use during execution of the software application being run on the host. Such data copying can occur in response to a single host command freeing up the host to perform other tasks while the data are being copied onto the fixed-media disk drive.

Accordingly, this invention provides an apparatus and method for reducing the number of components in and cost of a multiple-drive system, and for increasing the performance of the system. It reduces bottlenecks created by the slow access time and data rates of conventional removable-media drives. Furthermore, this invention provides a more compact system. These and other features of this invention are described and claimed in detail below.

BRIEF DESCRIPTION OF THE DRAWINGS

FIG. 1 comprises two block diagrams, FIGS. 1a and 1b; each concerns an embodiment of this invention within an overall information-processing system that includes a typical host, and a multiple-drive data-storage system.

DETAILED DESCRIPTION OF A PREFERRED EMBODIMENT OF THE INVENTION

Figure 1B:
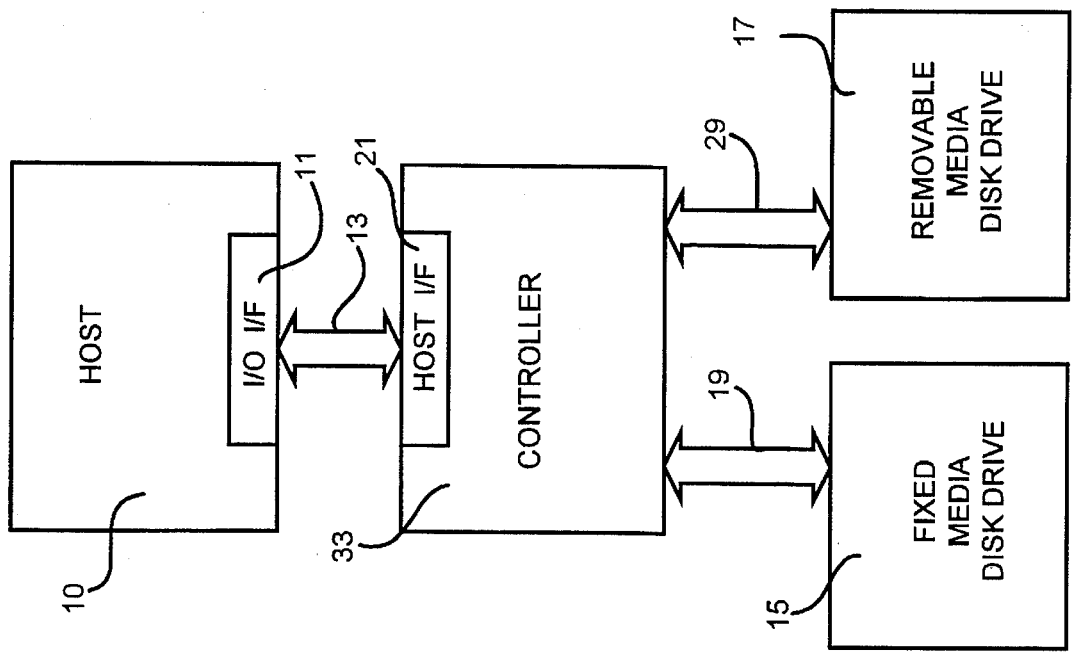
FIG. 1b emphasizes the functionality of the multiple-drive system.
Figure 1A:
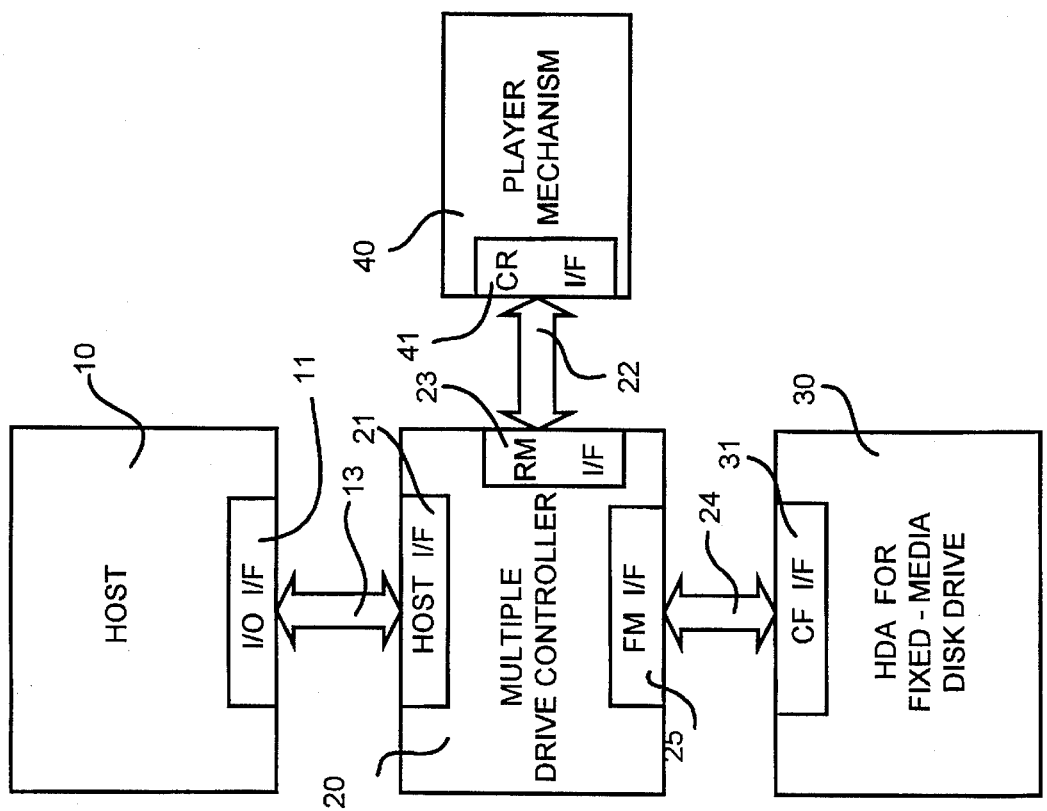
FIG. 1a emphasizes the physical structure of an embodiment of the controller in combination with a fixed-media disk drive comprising a head disk assembly (HDA), and a player mechanism having means for loading and unloading at least one optical disk therein.

FIG. 1a illustrates an overall information-processing system. The overall system includes a host 10 and a multiple-drive data-storage system.

Host 10 has an input/output interface (I/O I/F 11), and is representative of each of a variety of programmable, processor-based systems having such an interface for communicating with various peripheral controllers. That is, host 10 may be a PC such as a desktop or laptop, or any other programmable, processor-based system such as an audio/video system, an interactive entertainment system, or any of various types of communication systems.

The multiple-drive, data-storage system comprises multiple-drive controller 20 and two drive mechanisms. One of the two drive mechanisms is a fixed-media disk drive comprising a head disk assembly (HDA) 30. The other of the two drive mechanisms is a removable-media disk drive comprising a player mechanism 40 having loading means for loading and unloading at least one optical disk therein.

Multiple-drive controller 20 includes a plurality of independently-operable communication means including a host interface (I/F 21), a removable-media interface (RM I/F 23), and a fixed-media interface (FM I/F 25).

A "connection" 13 represents broadly that host 10 and multiple-drive controller 20 communicate with each other via connection 13 and interfaces I/O I/F 11 in host 10 and host I/F 21 in multiple-drive controller 20. A connection 22 represents broadly that multiple-drive controller 20 and player mechanism 40 communicate with each other via connection 22 and compatible interfaces shown as RM I/F 23 in multiple-drive controller 20 and CR I/F 41 in player mechanism 40. A connection 24 represents broadly that multiple-drive controller 20 and HDA 30 communicate with each other via connection 24 and compatible interfaces shown as FM I/F 25 in multiple-drive controller 20 and CF I/F 31 in HDA 30.

Host I/F 21 is shared by the fixed-media disk drive and the removable-media disk drive and, together with connection 13 and I/O I/F 11 in host 10, provides for communication of host commands, status, and data.

HDA 30 includes the basic electro-mechanical components of a fixed-media disk drive, as will be discussed in more detail below. In the preferred embodiment, the fixed-media disk drive is a magnetic disk drive, and HDA 30 contains at least one magnetic disk.

Player mechanism 40 includes the type of structure referred to herein as a "drive mechanism." That is, player mechanism 40 comprises a housing that opens to provide for loading an optical disk, a spindle for supporting the loaded optical disk, and a spindle motor for rotating the spindle-supported optical disk, an optical-to-electrical transducer, and an electrically-controllable positioning structure for positioning the transducer relative to the rotating optical disk.

Preferably, player mechanism 40 is compatible with the type of optical disk referred to as a CD ROM disk. Without limitation, player mechanism 40 may be compatible with any of the following CD technologies and formats: CD-DA (digital audio) as defined by the international CEI/IEC 908 standard, commonly referred to as the "Red Book"; CD ROM (Read Only Memory) as defined by the ISO/IEC 10149 standard also referred to as the "Yellow Book"; CD-I (Interactive) defined by the de facto industry standard set out in the "Green Book"; CD-XA (Extended Architecture) as defined by the de facto industry standard "System Description CD-ROM XA" specification from Sony Corporation and Philips Corporation; CD-R (Recordable) (also known as CD-WO (Write Once)), CD-Photo, CD-MO (Magneto Optic) or CD-Phase Change, all defined by the international standards set out in the "Orange Book", Parts I and II; or the CD-Minidisk as also described by specifications from Sony Corporation.

Although the drawings show a single player mechanism being controlled by multiple-drive controller 20, one or more external data-storage peripherals may be coupled to multiple-drive controller 20. In such case, plural interfaces 23 are provided. These plural peripherals need not be of the same type.

Multiple-drive controller 20 includes decoding means for decoding host commands received via host I/F 21. Multiple-drive controller 20 responds to certain decoded host commands to control the reading and writing of data to the disks in HDA 30. Multiple-drive controller 20 uses FM I/F 25 to communicate serial data to and from HDA 30 and to communicate various motor-control signals to control the spindle motor and the actuator motor.

Multiple-drive controller 20 responds to certain decoded host commands to control the reading of data from an optical disk loaded in player mechanism 40. Read data are provided from player mechanism 40 through RM I/F 23 to multiple-drive controller 20 which then provides it through host I/F 21 to host 10. If player mechanism 40 is compatible with writable optical-disk technology, a host command to write data to player mechanism 40 is likewise decoded by multiple-drive controller 20 and appropriate command signals are transmitted via RM I/F 23 along with data to cause the data to be written to a writable optical disk. Other control signals or commands provided to player mechanism 40 may include stop, start, and eject disk.

FIG. 1b presents a functional model of the invention embodied in FIG. 1a. As seen from host 10, the data storage system consists of a controller 33 having logical connections 19 and 29 to a fixed-media disk drive 15 and removable-media disk drive 17, respectively. The electronics for fixed-media disk drive 15 and removable-media disk drive 17 are embodied in controller 20 of FIG. 1a. Significant parts of the electronics in disk drives 15 and 17 are realized by sharing electronics in controller 20. Connections 19 and 29 are realized by structure embedded in controller 20.

As implemented, controller 33 provides for independent or concurrent or overlapped operation of fixed-media disk drive 15 and removable-media disk drive 17. Controller functions provide for direct data transfer, via data buffers, between fixed-media disk drive 15 and removable-media disk drive 17.

Figure 2:
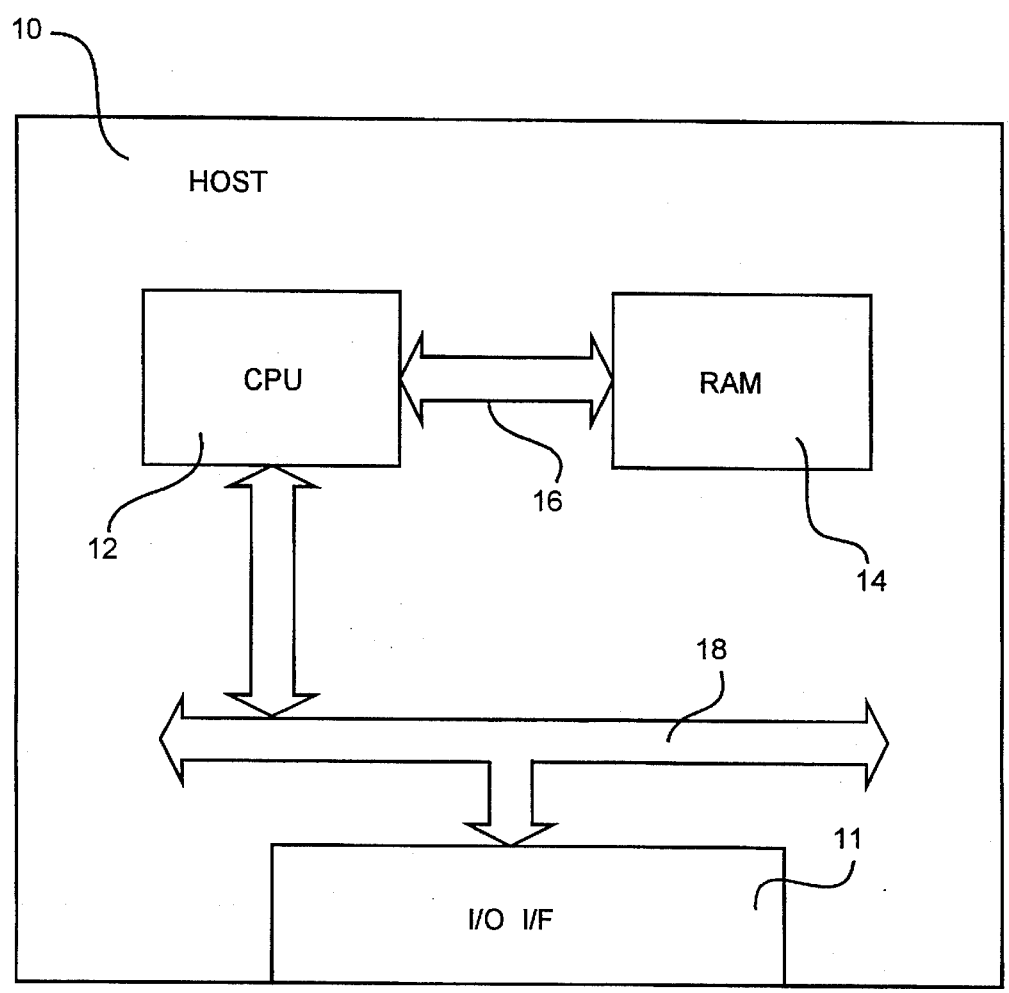
FIG. 2 is a block diagram illustrating the basic structure of the host of FIG. 1.

FIG. 2 shows that host 10 includes a CPU 12, a RAM 14, a local bus 16, and an I/O bus 18. CPU 12 may include any of a variety of commercially available microprocessors, including the 80XXX series of microprocessors or PENTIUM microprocessor manufactured by Intel Corporation, the 68XXX series of microprocessors or the POWERPC microprocessor manufactured by Motorola Corporation, the SPARC microprocessor manufactured by Sun Microsystems, Inc., and a variety of other well-known microprocessors.

Local bus 16 couples CPU 12 to RAM 14. I/O bus 18 enables CPU 12 to communicate with controllers for peripherals, including a keyboard, a mouse, and one or more disk drives, tape drives, printers, etc.

I/O bus 18 may be an AT bus, an enhanced AT bus, or other type of input/output bus such as a PCI bus or a VESA bus. I/O bus 18 may also be a type compatible with various attachments to the AT bus, for example, the attachment commonly referred to as the IDE bus. This attachment is defined by ANSI reference publication number X3.221 Project No. 791D Rev. 4A. Similarly, host I/O bus 18 may be the type of attachments defined by the ATA2 and ATAPI (At bus Attachment Packet Interface) specifications. The ATA2 specification is set out in ANSI reference publication number X3.221 Project No. 948D; the ATAPI specification is set out in ANSI publication No. SFF-8020. Each of the foregoing ANSI publications is incorporated herein by reference.

Other interfaces may also be employed, and such alternate interfaces include the Small Computer Systems Interface (SCSI), the Serial SCSI Architecture (SSA) interface, the P1394 interface, the Fiberchannel interface, and the parallel printer port interface. Accordingly, the following description of this invention, while primarily described in terms of an ATA or ATA2 interface capability, may also be applied with any of the above-noted alternate interfaces, or other suitable interfaces, with host 10.

Figure 3:
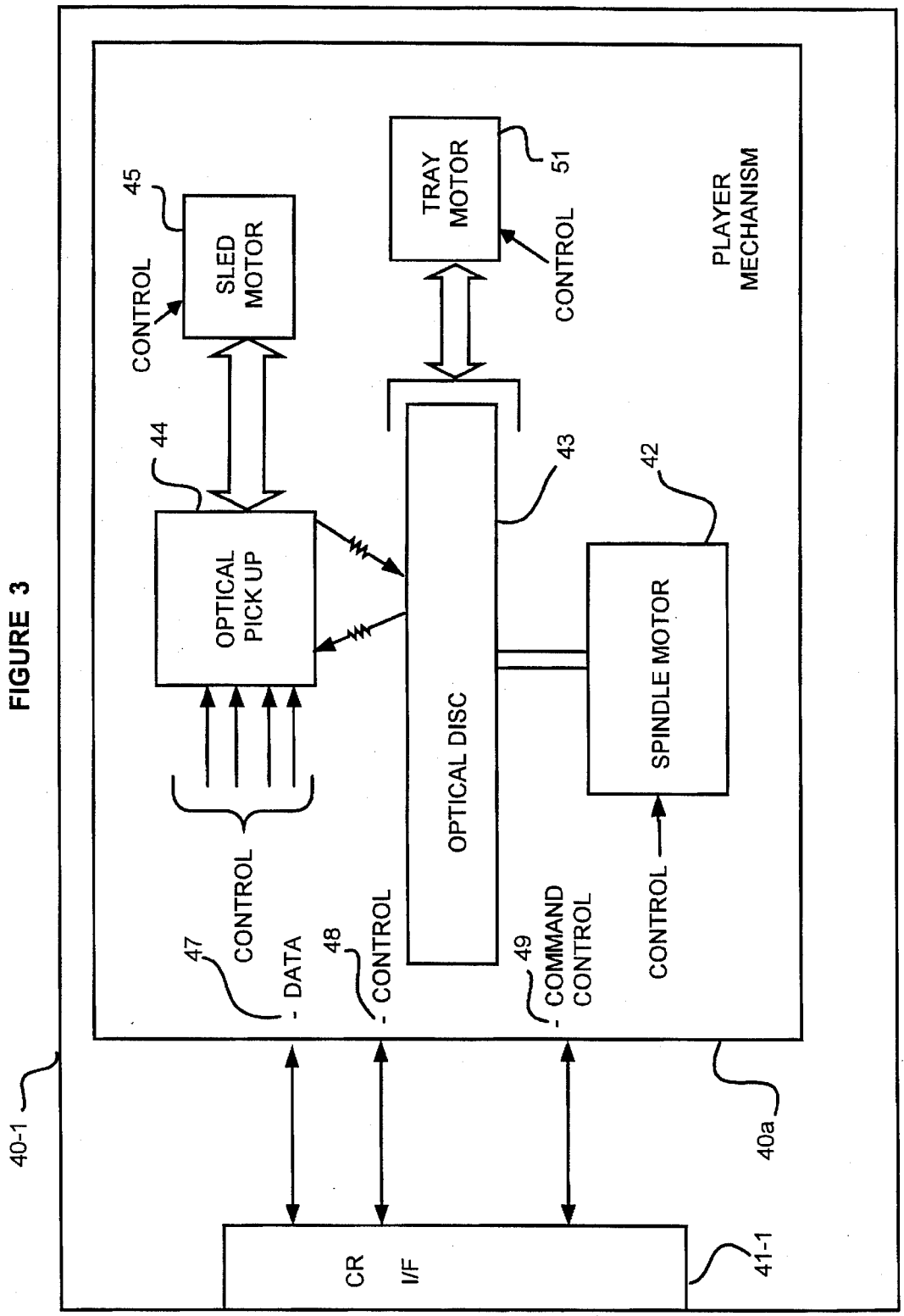
FIG. 3 is a block diagram showing the basic structure of one embodiment of a player mechanism suitable for incorporation into the multiple-drive system of FIG. 1.
Figure 4:
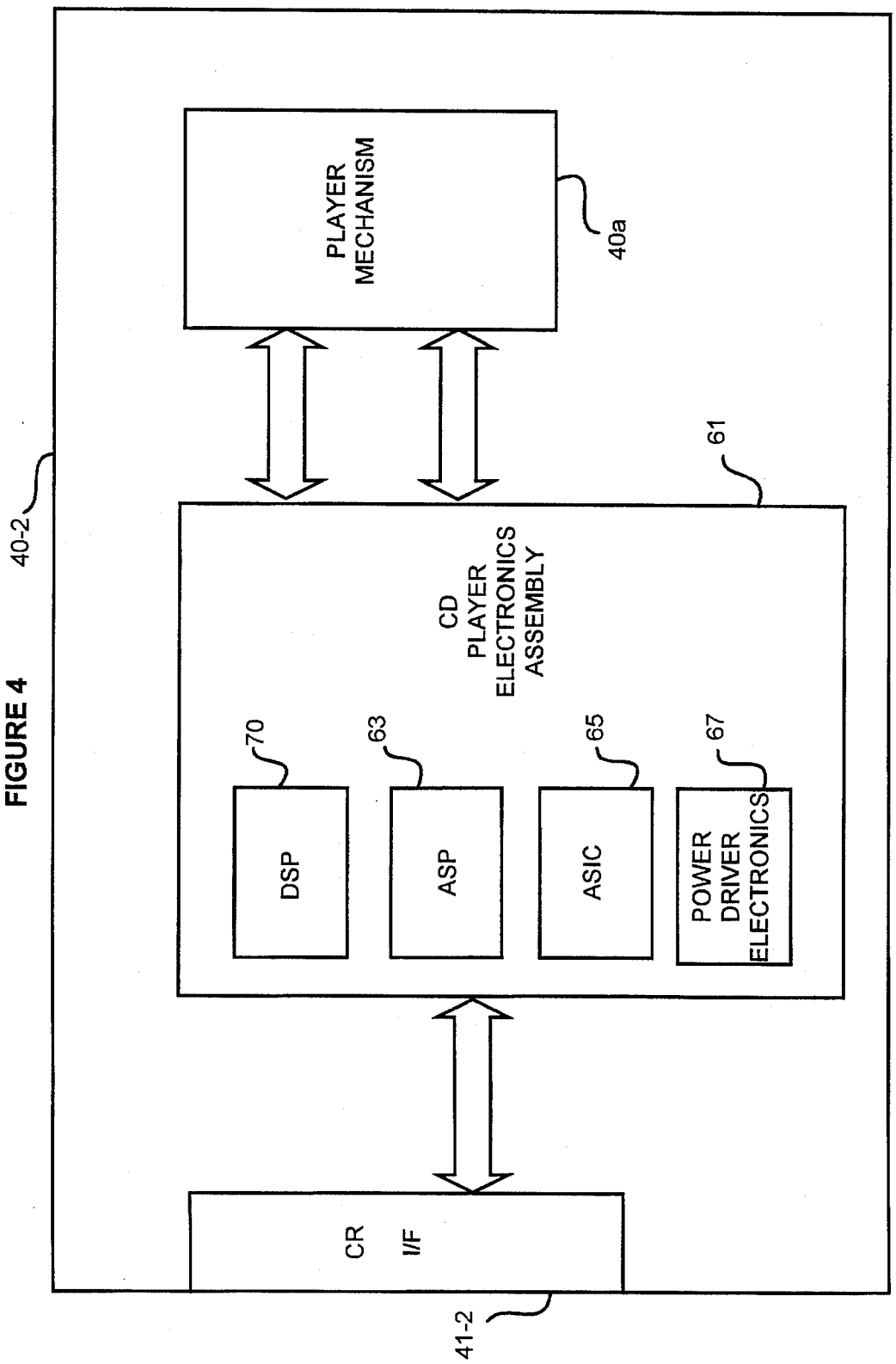
FIG. 4 is a block diagram showing the basic structure of an alternate embodiment of a player mechanism suitable for incorporation into the multiple-drive system of FIG. 1.

FIG. 3 shows a CD drive mechanism 40-1, and FIG. 4 shows a CD drive mechanism 40-2. These two CD drive mechanisms are alternative embodiments, either of which is suitable to implement player mechanism 40 including the communication means represented by CR I/F 41 in FIG. 1. The specific structure and operation of CR I/F 41 and the compatible interface means provided in multiple-drive controller 20 depends upon the distribution of certain circuitry between multiple-drive controller 20 and player mechanism 40.

FIG. 3 shows that CD drive mechanism 40-1 includes an assembly 40a and a communication means shown as CR I/F 41-1. Assembly 40a includes a spindle or disk motor 42 for rotating a removable optical disk 43, and includes a movable sled including a pickup 44. Pickup 44 contains the light generating source, movable lenses for focus and fine track positioning, associated tracking and focus motors, and sensors to receive the light 17 reflected from optical disk 43. Assembly 40a further includes a sled (or feed) motor 45 for moving pickup 44 to different radial locations on optical disk 43, an optional tray motor 46 for loading and ejecting optical disk 43, and for writable CD technologies a write capability in the form of a controllable laser intensity.

CR I/F 41-1 defines a very low-level interface. That is, signals received via CR I/F 41-1 are immediately communicated to their destinations within CD drive mechanism 40-1, without the kind of registering and decoding that is associated with an intelligent interface. The signals so immediately communicated via CR I/F 41-1 include: data signals via a data path 47; control signals via a path 48, including a motor control signal for spindle motor 42, a sled position control signal for sled motor 45, a laser intensity-control signal (read/write) for pickup 44, a tracking control signal for pickup 44, a focus control signal for pickup 44 and a tray motor control signal; position control via a bidirectional path 48, including tracking sense data from pickup 44 and track zero sense from sled motor 45; and additional command and control signals such as power on, power off, write, eject disk, etc., carried via path 49. The control signals provided to CD drive mechanism 40-1 may be analog or digital in nature.

The construction and operation of each of these components of CD drive mechanism 40-1 is well known in the art. Furthermore, complete CD drive mechanisms are commercially available and may be purchased, for example, from Sanyo Corporation, Sony Corporation, Phillips Corporation and other sources known to those skilled in the art. For example, CD drive mechanism model no. CD PM2R with SFC 93 pickup, commercially available from Sanyo Corporation, includes the basic components of CD drive mechanism 40-1 discussed above and illustrated in FIG. 3.

FIG. 4 shows that CD drive mechanism 40-2 includes assembly 40a (details of which are shown in FIG. 3), a CD player electronics assembly 61 and, a communication means shown as CR I/F 41-2.

CD player electronic assembly 61 includes a DSP IC 70, an "analog signal processing IC" (ASP IC) 63, one or more "application specific IC" (ASIC) 65, power driver electronics 67, means for interconnecting the IC's and power driver electronics and, means for connecting electronics assembly 61 to CR I/F 41-2 and to player mechanism 40a.

CR I/F 41-2 is more intelligent than the very low-level interface defined by CD I/F 41-1 (FIG. 3). That is, at least some of the signals received via CR I/F 41-1 are registered, decoded and used by CD player electronics assembly 61 to generate and communicate control signals to destinations within CD player mechanism 40a. The particular signal set and signal functions used in CR I/F interface 41-2 are selected to satisfy individual product design objectives.

Figure 5:
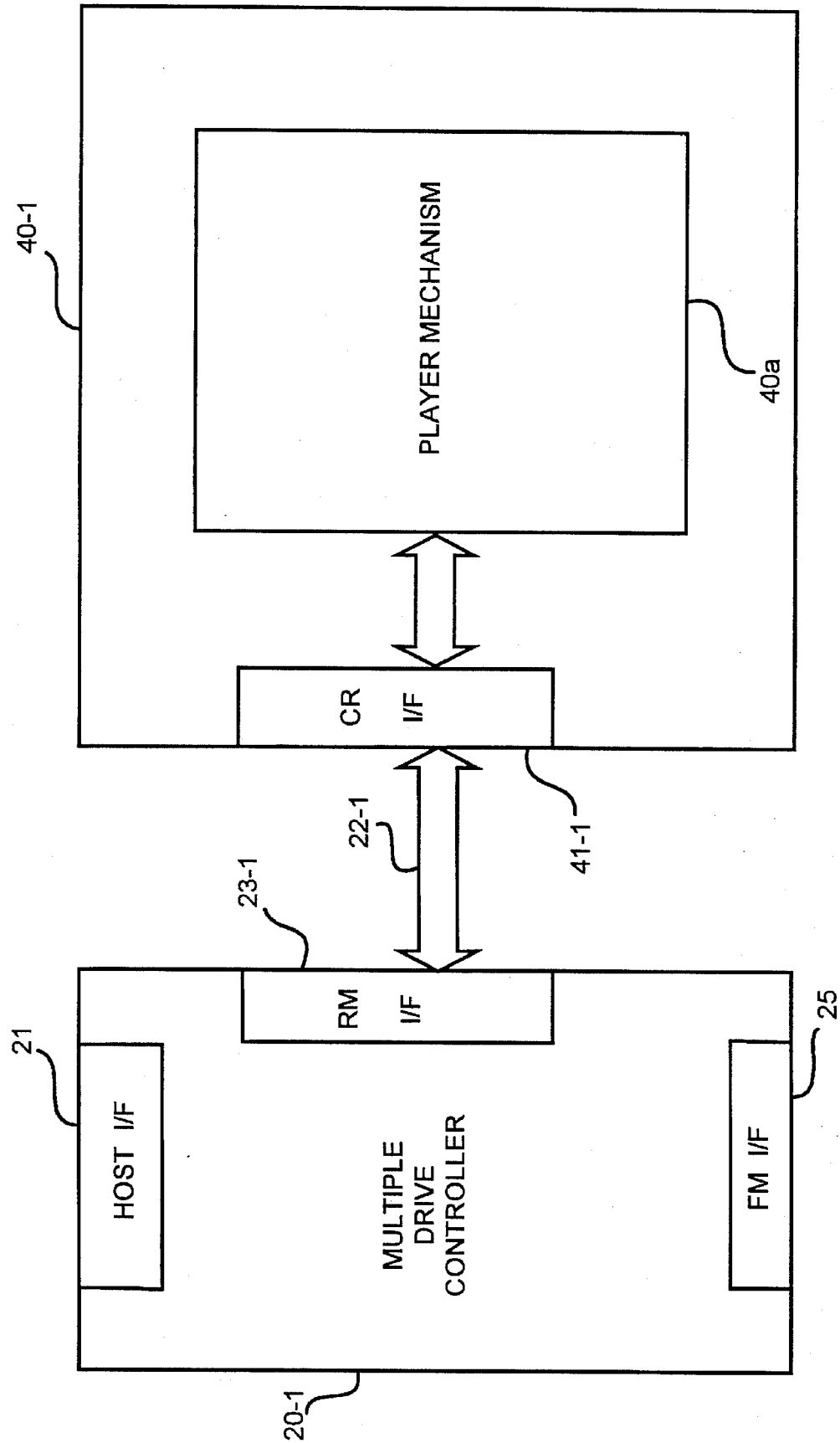
FIG. 5 is a block diagram showing an embodiment of this invention that involves a combination of a multiple-drive controller and the player mechanism of FIG. 3 and that has a very low-level interface between the controller and the player mechanism.
Figure 6:
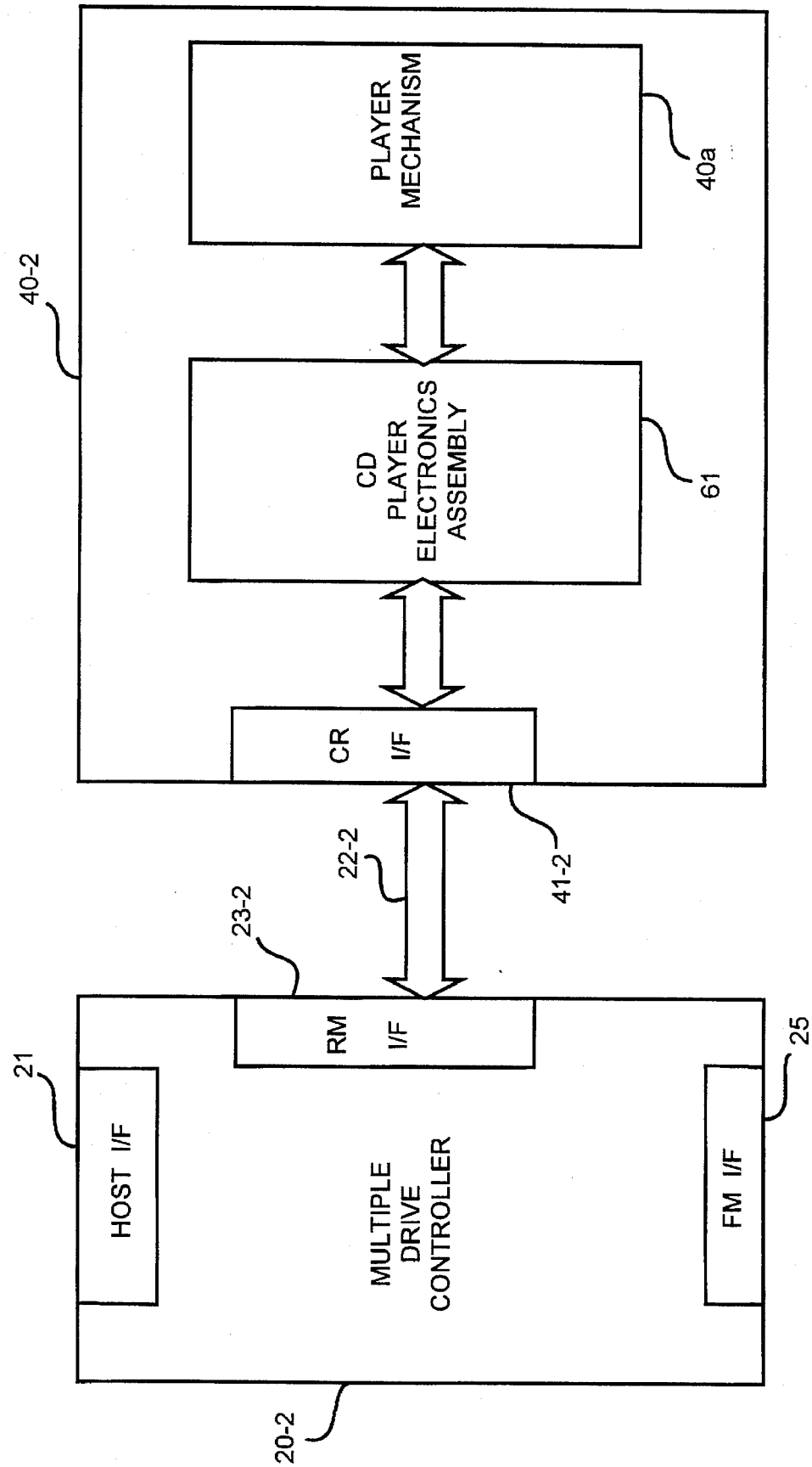
FIG. 6 is a block diagram showing an alternative embodiment of this invention that involves a combination of a multiple-drive controller and CD player mechanism of FIG. 4 and that has an interface, that is more intelligent than the interface of the embodiment of FIG. 5.

FIGS. 5 and 6 show alternative embodiments, either of which is suitable to implement the multiple-drive system of FIG. 1.

FIG. 5 shows a multiple-drive controller 20-1 and CD drive mechanism 40-1 communicating with each other through the low-level interface defined by CR I/F 41-1. The removable-media interface in multiple-drive controller 20-1 is shown as RM I/F 23-1, and the interconnection is shown as connection 22-1.

FIG. 6 shows a multiple drive controller 20-2 and CD drive mechanism 40-2 communicating with each other through the more intelligent interface defined by CR I/F-2 41-2. The removable-media interface in multiple-drive controller 20-2 is shown as RM I/F 23-2, and the interconnection is shown as connection 22-2.

Each of FIGS. 5 and 6 show host I/F 21 and FM I/F 25 which may be the same regardless of whether CD drive mechanism 40-1 or 40-2 is used. For the embodiment shown in FIG. 5, multiple-drive controller 20-1 has the specific structure applicable shown in FIG. 7.

In the embodiment shown in FIG. 5, RM I/F 23-1 may simply be a direct electrical connection via a CD I/F connector adapted to mate with a matching connector on CD drive mechanism 40-1. If multiple-drive controller 20-1 is integrated with the "motherboard" of host 10, the CD I/F connector may be on the motherboard, either directly or through a cable.

In the alternative embodiment of FIG. 6, certain electronic circuitry for performing control functions is incorporated within CD drive mechanism 40-2. Also, a portion of the data encoding/decoding is performed by circuitry incorporated on or in CD drive mechanism 40-2. The circuitry shown in FIG. 6 as part of CD Player Electronics Assembly 61 may be housed in any suitable location in CD drive mechanism 40a.

Figure 7:
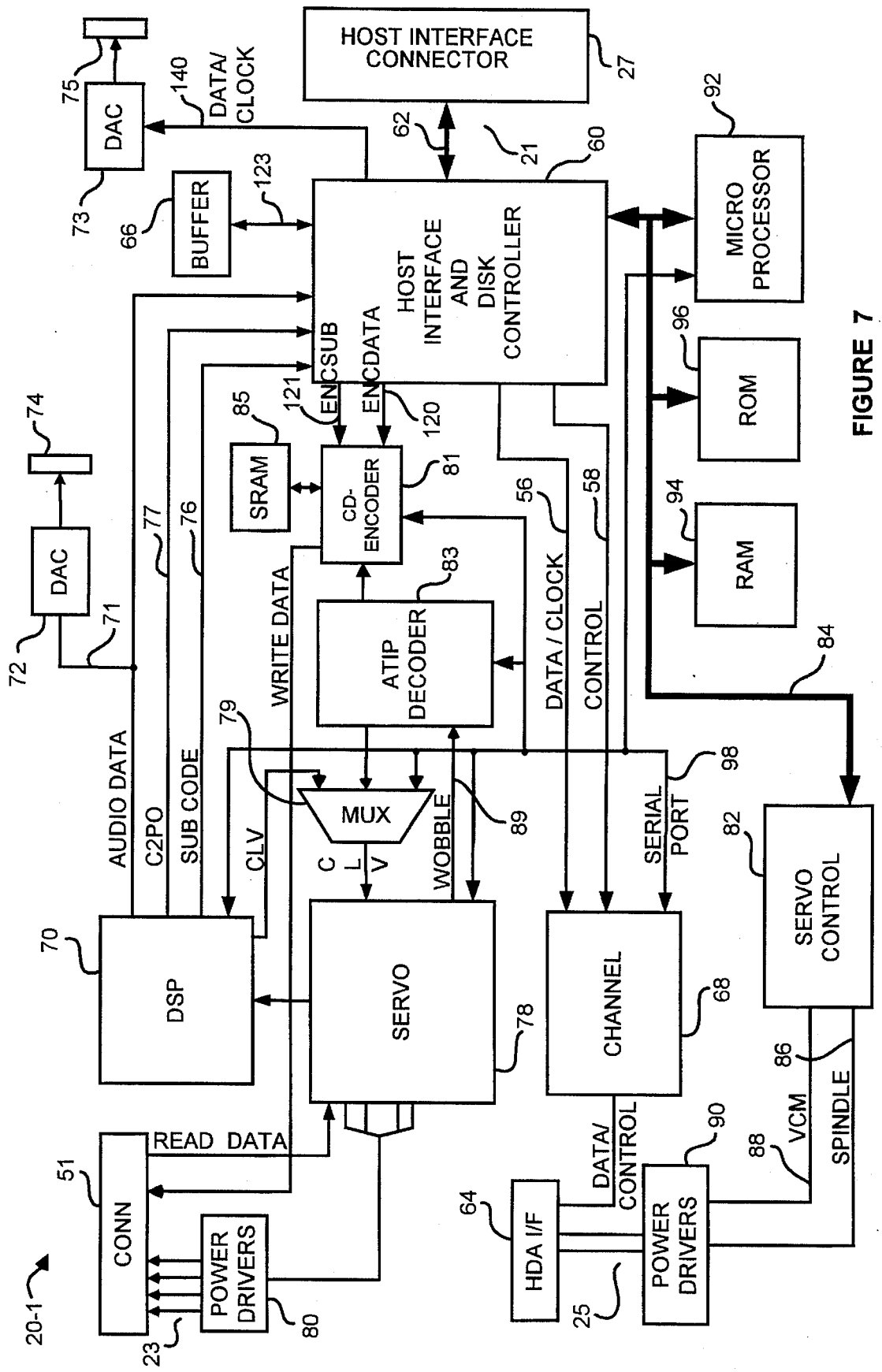
FIG. 7 is a block diagram showing the organization of the multiple-drive controller in accordance with this invention, including circuitry for the embodiment of FIG. 5.

FIG. 7 depicts multiple-drive controller 20-1 shown in FIG. 5. The multiple-drive controller 20-2 shown in FIG. 6 is similar but does not need to include those controller circuit elements provided by the CD Player electronics assembly 61 (FIG. 6).

FIG. 7 shows that multiple-drive controller 20-1 includes Host Interface and Disk Controller (HIDC) 60, a host-interface connector 27, and an interface bus 62. HIDC 60 includes interface circuits 141 (FIG. 8) which, in combination with host-interface connector 27 and interface bus 62, implement host I/F 21. If I/O I/F 11 (FIG. 1) conforms to the ATA interface specification, the host-interface connector may be an ATA connector as standardized in the art. A separate host-interface connector is unnecessary, however, in an alternative embodiment in which circuitry for performing the functions of a multiple-drive controller is incorporated on a motherboard of host 10.

Multiple-drive controller 20-1 also includes an HDA interface connection 64 and power drivers 90, which implement FM I/F 25. Multiple-drive controller 20-1 also includes a connector 51 that, together with other circuitry, implement RM I/F 23.

Multiple-drive controller 20-1 includes a buffer memory 66 and buffer-manager circuitry 146 (FIG. 8) within HIDC. Buffer-manager circuitry 146 includes buffer-writing means and buffer-reading means.. The buffer-writing means provides for storing in buffer memory 66 data received via RM I/F 23 in response to requests (e.g., a host command) to read from the removable-media, and data received via FM I/F 25 in response to requests (e.g., a host command) to read from the fixed media. The buffer-reading means provides for reading data stored in buffer memory 66 and supplying the data to host I/F 21. Buffer-manager circuitry 146 also provides for arbitrating access to buffer memory 66.

HIDC 60 controls the data and command flow from host-interface connector 27 to and from player mechanism 40 through RM I/F 23 and to and from HDA 30 through FM I/F 25. The functions implemented by HIDC 60 include management and arbitration of buffer memory 66 which temporarily stores data read from the removable media in player mechanism 40 as well as data read from the fixed media in HDA 30, as well as data provided from host 10 for writing onto either of the removable or fixed media.

Buffer memory 66 may preferably be a high speed memory, such as a dynamic RAM (DRAM) or static RAM (SRAM), with sufficient capacity to store a desired number of sectors of data from either player mechanism 40 or HDA 30. For example, a suitable buffer memory size currently may be approximately 256K×16 (512K bytes) implemented as a DRAM. Buffer memory 66 may be a separate IC or IC's or may be part of a single IC including HIDC 60.

Multiple-drive controller 20-1 includes error-correcting means shared by the two drive mechanisms. Such shared error-correcting means are included within HIDC 60. Other functions of HIDC 60, which may or may not include shared circuitry or code, are error-correcting code ("ECC") syndrome encode/decode, CRC encode/decode, data formatting, synchronization and serializer/deserializer (SERDES) functions, subcode formatting and synchronization, ECC syndrome encode/decode, EDC encode/decode, data formatting, data synchronization, data SERDES, subcode SERDES, and Subcode CRC validation functions relative to player mechanism 40. These functions are discussed in more detail below.

Multiple-drive controller 20-1 also includes a read/write channel 68. HIDC 60 controls channel 68 to cause data to flow to and from each disk in HDA 30. Channel 68 preferably includes the encode/decode circuitry for converting data supplied from HIDC 60 to an encoded form suitable for writing onto the disk surface, synchronization circuitry for locking the decoding circuitry onto the timing of the data read from the disk surface, as well as suitable filtering and equalization circuitry for converting the analog pulses read from the disk surface to desirable form for digital sampling. Channel 68 also preferably includes suitable circuitry for detecting servo signals written onto the disk surface for track centering and servo control functions. The construction and operation of circuitry for performing such channel functions is well known in the art. Furthermore, IC's are commercially available for performing such channel functions; for example, the SSI 32P4901 IC provided from Silicon Systems, Inc. of Tustin, Calif. may be employed for channel 68.

For an embodiment compatible with CD drive mechanism 40-1, multiple-drive controller 20-1 includes a servo control circuit 78, and includes an integrated circuit of the type that may be called either a "digital signal processor," shown as DSP 70, or a "CD decoder." DSP 70 and servo control circuit 78 control the flow of data from CD drive mechanism 40-1. For an alternative embodiment (FIG. 4), CD drive mechanism 40-2 includes servo and data-decoding circuitry such as a so-called "Analog Signal Processor" or (ASP 63) and a DSP 70. Sanyo sells a suitable ASP as a LA9220, and a suitable DSP as a LC7868KE.

DSP 70 functions as a read channel for data read from CD drive mechanism 40-1 in accordance with conventional technology. For example, DSP 70 may include the following conventional functions: eight to fourteen modulation (EFM) decoding; sync detection; separation of the subcode information from the audio data; de-interleaving of the audio data; and CIRC (Cross Interleaved Reed Solomon Code) error detection and correction. In addition, DSP 70 provides control signals for the Constant Linear Velocity (CLV) servo control of disk motor 42 (FIG. 3) by servo control circuitry 78 (discussed below). The CLV servo control is performed by monitoring the rate at which data come into the EFM decoder within DSP circuitry 70 and comparing this rate with a fixed clock source. The CLV control signal is then provided to servo control circuitry 78 via multiplexor 79. The construction and operation of circuitry for performing these functions is well known in the art. Furthermore, IC's are commercially available for performing such DSP functions; for example, the LC 7861 IC manufactured by Sanyo Corporation may be employed for DSP 70.

DSP 70 outputs data which are generally in the same format as digital audio (i.e. CD-DA format) and therefore an optional audio output path 71 may be provided to directly output audio data from optical disks storing digitally encoded audio. Path 71 connects DSP 70 output to a digital to analog converter 72. The output of the digital to analog converter 72 is provided to an audio connector 74 which may be adapted for interfacing with a conventional audio plug connector. Alternatively, an audio output may be provided from HIDC 60 via connection 140, to take advantage of the data buffering in buffer memory 66 and additional error correction capability provided by HIDC 60. This alternate audio output is provided to digital to analog converter 73 which is coupled to audio output connector 75. Digital to analog converter 72 and/or 73 may be a commercially available IC such as the LC 78815M available from Sanyo Corporation.

The "audio format" data output from DSP 70 is provided to HIDC 60 which provides additional ECC and decode functions as described in more detail below. In addition, DSP 70 provides subcode information, read from the optical disk and decoded in DSP 70, via path 76 to HIDC 60. Such subcode information is conventionally present in optically recorded disks in the various CD formats, and is defined for example in the Red book, Yellow book, and Orange book for the respective CD formats as discussed above. DSP 70 also provides an error signal (C2PO) to HIDC 60 via path 77.

For an embodiment employing writable CD technologies, multiple-drive controller 20-1 includes a CD Encoder 81 and an absolute time in pregroove (ATIP) decoder 83. CD Encoder 81 includes circuitry for providing a write data path from HIDC 60 to player mechanism 40 via RM I/F 23. CD Encoder 81 receives encoded data ENCDATA via path 120 and subcode information ENCSUB via path 121 from HIDC 60 and timing information from ATIP Decoder 83. This information is then processed into a form suitable for recording onto the disk loaded in player mechanism 40. CD Encoder 81 uses the timing information from ATIP decoder 83 to synthesize the Q-subchannel and then combines this Q-subchannel with the subcode information ENCSUB provided via path 121 to form the complete subcode to be recorded. In addition, CD Encoder 81 provides the following functions: data interleaving and CIRC syndrome generation for the encoded data ENCDATA provided via path 120, combining the interleaved and CIRC encoded data with the subcode data, adding synchronization, and performing EFM encoding. The construction and operation of circuitry for performing these functions is well known in the art. Furthermore, IC's are commercially available for performing such CD Encoder functions; for example, the LC89583 IC from Sanyo Corporation may be employed for CD Encoder 81. The LC89583 IC employs a memory 85, such as a commercially available 2K×8 SRAM device, to buffer the data during the interleaving process.

As further shown in FIG. 7, multiple-drive controller 20-1 includes servo control circuitry for both CD drive mechanism 40-1 and for HDA 30. More specifically, multiple-drive controller 20-1 includes what may be conventional servo control circuitry 78 for CD drive mechanism 40-1 to provide a position control signal to control sled motor 45 (FIG. 3), tracking and focusing control signals relative to fine control of the pick-up of the reflected light from the optical disk, spindle speed control signals for control of spindle motor 42 in accordance with conventional constant linear velocity (CLV) or optionally constant angular velocity (CAV) control, and control of optional tray motor 46 (FIG. 3) for loading or ejecting optical disks. These control signals are indicated by the multiple output lines from servo circuitry 78. Such servo control functions may be provided, under microprocessor control as discussed below, by conventional circuitry, and for example may be provided by a commercially available IC. For example, the LA 9210M IC manufactured by Sanyo Corporation provides the above-noted functions in a single IC and may be employed for servo circuitry 78.

ATIP Decoder 83 provides timing reference for the CLV servo control and for generation of the Q-subchannel. Current writable CD technology uses pregrooved media. ATIP Decoder 83 phase locks to the WOBBLE signal provided via path 89 from the pregrooved media and derives an ATIP, or Absolute Time In Pregroove, signal. This ATIP signal reflects the time from the start of the recording process and can be used to generate the Q-subchannel. The clock that is phase locked to the WOBBLE signal provided via path 89 can be compared against a fixed clock source to control the CLV servo, which CLV servo control signal is provided to servo control circuitry 78 via multiplexor 79. Multiplexor 79 provides CLV control signals selectively from ATIP Decoder 83 or DSP 70 in response to a select signal, e.g., provided by microprocessor 92 via serial path 98. The construction and operation of circuitry for performing the functions of ATIP Decoder 83 is well known in the art. Furthermore, IC's are commercially available for performing such functions; for example, the LC89582 IC from Sanyo Corporation may be employed for ATIP Decoder 83. Also, for writable CD technologies, a laser intensity-control signal is provided to servo control circuitry 78 to select laser intensity for reading or writing.

The outputs from servo control circuitry 78 are provided to power drivers 80 which also may be of conventional design. For example, the LA 6530GF IC manufactured by Sanyo Corporation may provide suitable power drivers for the control of the above-noted servo motors and optics in CD drive mechanism 40-1 via RM I/F 23-1.

As further shown in FIG. 7, multiple-drive controller 20-1 includes servo control circuitry 82 which provides control signals for HDA 30, which include constant angular velocity (CAV) control signals for the HDA's spindle motor and position control signals for the HDA's actuator motor. The construction and operation of circuitry for performing the functions of servo control circuitry 82 is well known in the art. The CLSH7200 IC provided by Cirrus Logic Corporation is suitable for providing the spindle motor and actuator analog control signals in response to digital microprocessor control signals. These analog servo control signals are provided along lines 86, 88 to power drivers illustrated schematically by single component 90. Power drivers 90 provide the desired amplification of the signals to provide drive signals to the servo and spindle motors in HDA 30 via FM I/F 25.

Still referring to FIG. 7, multiple-drive controller 20-1 includes a RAM 94 and a ROM 96 that are associated with microprocessor 92. Preferably, RAM is for example, 32 K bytes in size, and ROM 96 is, for example, 64K×16 (128K bytes) in size. RAM 94 depicts volatile memory having the capability to both read and write data during operation of multiple-drive controller 20-1. ROM 94 depicts memory that provides a non-volatile read capability. ROM 96 may be implemented using read only memory or some form of non-volatile read/write memory.

Microprocessor bus 84 couples microprocessor 92 to RAM 94, ROM 96, HIDC 60, and servo control 82. Microprocessor 92 may be a conventional commercially available microprocessor controlled by microprograms. For example, commercially available microprocessor model number 80C196NP available from Intel Corporation may suitably be employed in a presently preferred embodiment. Microprocessor 92 may include any part of or all of the RAM 94 and ROM 96 needed to implement the multiple-drive controller 20-1.

Microprocessor 92, in conjunction with the control microprogram, executes the basic disk drive control functions including decoding of host commands provided from HIDC 60. The microprograms used by microprocessor 92 may be stored in ROM 96, RAM 94 or buffer memory 66. Multiple-drive controller 20-1 provides command decoding means that are shared by HDA 30 and player mechanism 40. The shared command decoding means decodes host commands received via host I/F 21. The command decoding means is comprised of the host interface circuits 141 in HIDC 60, which provides partial decoding of host commands, the microprocessor 92 and, the microprocessor control programs that reside in ROM 96, RAM 94 and buffer 66. The microprocessor 92 receives partially decoded commands from HIDC 60, processes the command by further decoding it and initiating the control functions necessary to complete command execution.

Also, in response to selected host commands microprocessor 92 provides control information to DSP 70, servo circuitry 78, multiplexor 79, ATIP DECODER 83, CD ENCODER 81 and channel 68 along serial communication path 98. Also, as illustrated in FIG. 7, microprocessor 92 communicates with servo control circuitry 82 via local microprocessor bus 84. Alternatively, a serial connection may be provided between microprocessor 92 and servo control circuitry 82. Any or all of the above-noted devices 70, 78, 79, 83, 81 and 68 may be coupled to microprocessor 92 via a parallel connection.

More specifically, microprocessor 92 controls CD drive mechanism 40-1 through servo control circuitry 78 to retrieve data from a specified location on the optical disk, or write data to the desired location. In addition, microprocessor 92 controls functions such as start up of spindle motor 42 (FIG. 3) in response to power up of CD drive mechanism 40-1. Microprocessor 92 also controls HDA 30 through servo control circuitry 82 to similarly write data from a desired location on a disk within HDA 30. This control in turn is responsive to host commands provided via host-interface connector 27 and communicated via HIDC 60. Further details of such host command execution and control of player mechanism 40 and HDA 30 are provided below.

Figure 8:
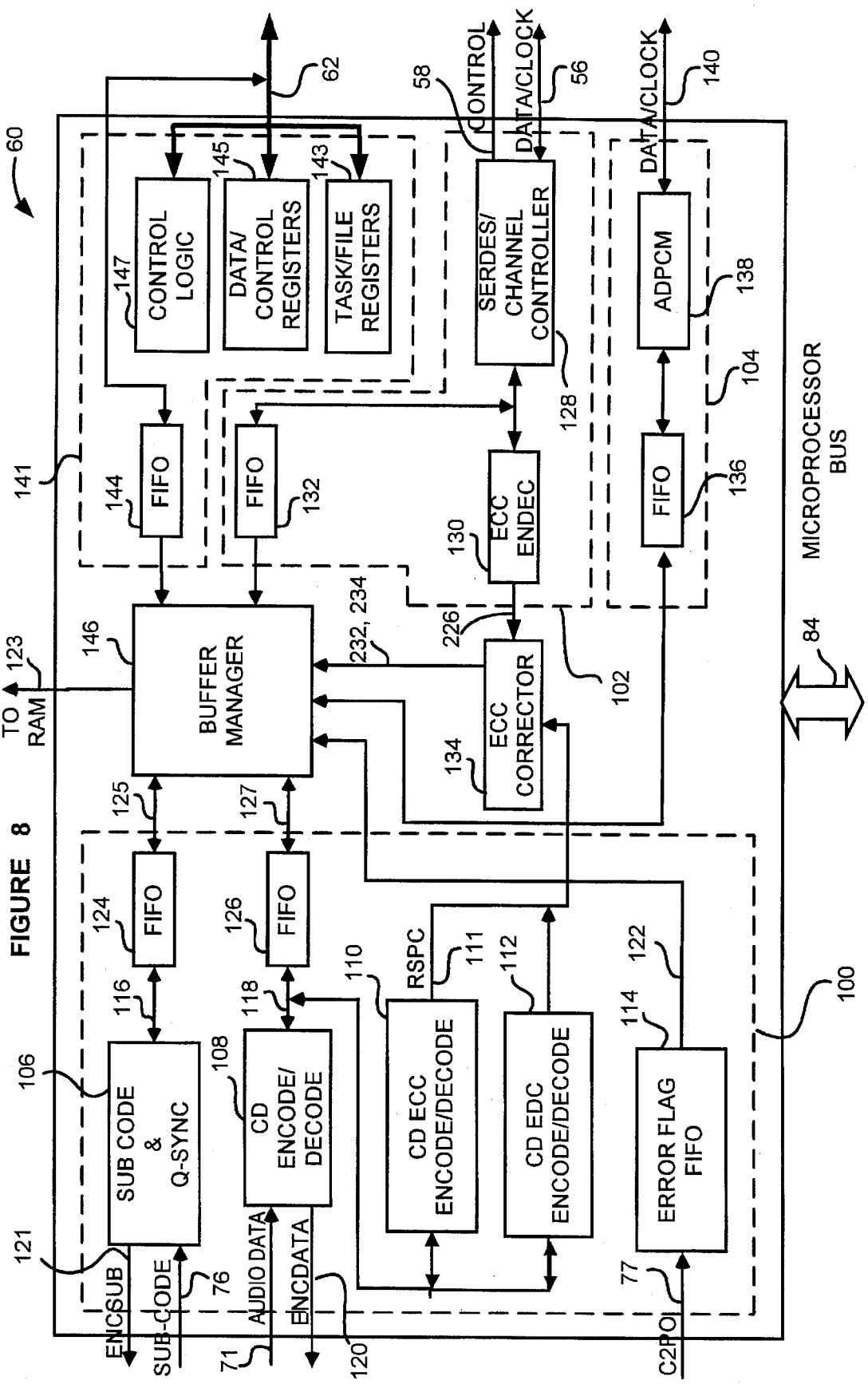
FIG. 8 is a block schematic drawing of the host interface and disk controller of FIG. 7 in accordance with a preferred embodiment of this invention.

As shown FIG. 8, HIDC 60 preferably includes a number of circuitry groups. A first group 100 is directed to data synchronization and formatting and error detection and ECC syndrome generation functions for player mechanism 40. A second group 102 is directed to error detection and ECC syndrome generation, data synchronization and formatting and channel control functions for HDA 30. A third group comprising host interface circuitry 141, buffer manager 146 and ECC corrector 134 is shared between player mechanism 40 and HDA 30. A fourth group 104 includes an optional audio pulse code modulated (ADPCM) output functional block and FIFO 136.

Group 100 includes Subcode and Q-sync circuitry 106, CD encode/decode circuitry 108, CD ECC encode/decode circuitry 110, CD EDC encode/decode circuitry 112, and CD error flag FIFO 114.

Subcode and Q-sync circuitry 106 receives subcode information during a read operation of player mechanism 40. In an embodiment using a low-level interface, as shown in FIG. 5, the subcode information is provided via path 76 from DSP 70, and circuitry 106 converts the subcode information from serial to parallel format and outputs it via path 116 for storage in buffer memory 66 as discussed in more detail below. Subcode and Q-sync circuitry 106 furthermore extracts the Q-subchannel from the subcode information, performs error detection on this Q-sub-channel, and synchronizes CD operations based on this Q-sub-channel information. During a write operation of player mechanism 40, Subcode and Q-sync circuitry 106 receives subcode data via path 123, buffer memory 66, FIFO 124, and path 116, and transfers the data to CD Encoder 81 via path 121. The construction and operation of circuitry for performing such functions is well known in the art. CD encode/decode circuitry 108 receives audio format data that has been processed by a DSP, whether a DSP in CD drive mechanism 40-2 or DSP 70 in multiple-drive controller 20-1. Circuitry 108 further decodes the processed data to a form suitable for passing to host 10. More specifically, circuitry 108 first converts the data from serial to parallel form including synchronizing the data stream, decodes header information (and subheader information for Mode 2/XA data sectors) from the read data, determines the data sector information, and provides the data in parallel form to path 118 for buffering in buffer memory 66 as discussed below. These parallel data are also sent to CD ECC encode/decode circuitry 110 and to CD EDC encode/decode circuitry 112 as necessary, depending on the data sector type.

During a write operation to player mechanism 40, encode/decode circuitry 108 receives data from buffer memory 66 via path 123, buffer manager 146, path 127, FIFO 126, and path 118 in parallel form, and interleaves subchannel information with the data sectors of the data to be written to the CD optical media. Encode/decode circuitry 108 further appends additional header and subheader information to the data, which may be provided from buffer memory 66 or header and subheader registers in circuitry 108. Encode/decode circuitry 108 also converts the data to serial form and provides it via path 120 for writing onto the optical media of player mechanism 40. Both such read data processing performed by encode/decode circuitry 108 and the write data processing may be conventional in nature, in accordance with the international CD technology standards discussed previously, and accordingly are not described in detail herein.

CD ECC encode/decode circuitry 110 provides additional error correction code (ECC) encoding and decoding for CD drive mechanisms operating in Mode 1 and Mode 2/XA Form 1 data types in accordance with the international Yellow book, Orange book, or Green book standards. In particular, this circuitry calculates the ECC syndromes for error detection and correction during the decoding of read data from player mechanism 40 recorded in Mode 1 or Mode 2/XA. These calculated syndromes (or Reed-Solomon Product Codes—RSPC) are provided to shared ECC corrector circuitry 134 via path 111. ECC ENDEC circuitry 110 also calculates the ECC parity check bytes for the above-noted Mode 1 and Mode 2/XA data types which are presented to CD encode/decode circuitry 108 via path 118 to be appended to the CD write data. Such functions are conventional in nature and may preferably be provided in accordance with the above-noted international standards, and accordingly are not described further therein.

CD EDC (Error Detection Code) encode/decode circuitry 112 performs conventional error detection code syndrome generation for Mode 1 and Mode 2/XA data type encoded optical disks, in accordance with the above-noted standards. CD EDC encode/decode circuitry 112 provides the calculated EDC syndrome to shared ECC corrector circuitry 134 via path 111. During the writing of data to player mechanism 40 in response to a host write command, CD EDC encode/decode circuitry 112 calculates the EDC parity check bytes for the above-noted Mode 1 and Mode 2/XA data types which are presented to CD encode/decode circuitry 108 via path 118 to be appended to the CD write data. These functions may be conventional in nature and are implemented in accordance with the above-noted international standards, and accordingly are not described in detail herein.

CD Error Flag First In First Out (FIFO) buffer 114 in turn receives an error flag (C2PO) output signal from DSP 70 (FIG. 7) via path 77, converts the error flag from serial to parallel form and presents it via path 122 to buffer manager 146 for storage in buffer memory 66 as discussed below.

During CD read operations, the output from CD subcode- and Q-sync circuitry 106 is provided via path 116 to FIFO buffer 124 and the output from CD encode/decode circuitry 108 is provided along 118 to FIFO buffer 126. The data from FIFO buffers 124 and 126 are presented along lines 125 and 127 respectively to buffer manager 146 for storage in buffer memory 66 as discussed below. During CD write operations, the data provided from buffer memory 66 via buffer manager 146 are presented to FIFO buffers 124 and 126 which in turn transfer the data to the Subcode and Q-sync circuitry 106 and CD encode/decode circuitry 110, respectively.

Group 102 includes serializer/deserializer (SERDES) and channel control circuitry 128, ECC encode/decode (ENDEC) circuitry 130 and FIFO buffer 132. SERDES/channel controller 128 receives data, and a clock signal synchronized to the data, read from each disk in HDA 30 via path 56 in 2-bit parallel form and converts the data to 8-bit parallel format for provision to buffer memory 66 and then to host 10. (Alternatively, the data received via path 56 may already be in 8-bit parallel format, in which case there is no need for the SERDES function.) Also, SERDES/channel controller 128 receives data from buffer memory 66 via path 123 to be written to a disk in HDA 30 in 8-bit parallel form and converts the data to 2-bit parallel form, if necessary, encodes a clock signal with the data, formats the data into desired physical addresses on the disk surfaces, and provides it via path 56 to be provided to channel 68 (FIG. 7). These functions may be conventional in implementation and accordingly are not described in further detail herein.

In addition, SERDES/channel controller 128 provides channel control signals via path 58 to channel 68 (FIG. 7)

during both read and write operations from/to the disks in HDA 30. For example, these control signals may include a write gate control signal and a read gate control signal.

ECC ENDEC circuitry 130 generates ECC parity check bytes which are provided to SERDES/channel controller 128 during writes to disks in HDA 30 and are appended to the data for writing to the magnetic disks. During read operations from the disks in turn, the ECC ENDEC circuitry 130 computes ECC syndromes from the data read from the disks and provides the computed ECC syndromes to ECC corrector circuitry 134 (circuitry 134 is described in more detail below in relation to FIGS. 14 to 16). The operation of these functions of ECC ENDEC circuitry 130 may be otherwise conventional in nature and are not described in further detail herein.

FIFO buffer 132 acts as a buffer between SERDES/channel controller 128 and buffer memory 66 (FIG. 7) to allow arbitration by buffer manager 146 as discussed in more detail below.

Still referring to FIG. 8, group 104 includes a FIFO buffer 136 for receiving digital audio data in parallel form provided from buffer memory 66 and providing the data to ADPCM decoding circuitry 138, which may be conventional in nature. The decoded audio data are then provided via path 140 to digital to analog converter 73 (FIG. 7). This ADPCM decoding circuitry may also preferably have a mode of operation wherein it transfers data directly from buffer memory 66 without decoding. This direct mode is bi-directional.

Still referring to FIG. 8, host-interface circuitry 141 includes host-interface control logic 147 which is shared so as to allow data and command flow from host 10 directed to both player mechanism 40 and HDA 30 to flow through the same interface. Host-interface circuitry 141 includes task file 143 which includes a set of registers adapted to receive host address signals in the same manner as an IDE drive. Task file 143 preferably contains a single set of registers shared by HDA 30 and player mechanism 40. These task file registers are readable and writable by microprocessor 92, via microprocessor bus 84, as well as by host 10 via bus 62, allowing decoding of host commands and control by microprocessor 92. Also, host-interface control logic 147 includes a register set 145 for data and control signals provided from host 10, preferably in the same manner as an IDE drive. However, microprocessor 92 and HIDC 60 interpret such register set in a way that may differ from conventional specifications, as discussed below. Host interface circuitry 141 also includes FIFO buffer 144 which enables arbitration of the data flow by buffer manager 146 as discussed in more detail below.

In a presently preferred embodiment adapted for communication with host 10 via an ATA compatible interface, task file registers 143 receive addresses and commands in accordance with the ATA standard. To be compatible with the ATA bus, disk drives must implement a register set including:

| register name | size | direction | PA | SA | A1 | A2 |
|---|---|---|---|---|---|---|
| Data register | 16-bit | write/read | 1F0 | 170 | 0F0 | 070 |
| Feature register | 8-bit | write | 1F1 | 171 | 0F1 | 071 |
| Error register | 8-bit | read | 1F1 | 171 | 0F1 | 071 |
| Sector Count register | 8-bit | write/read | 1F2 | 172 | 0F2 | 072 |
| Sector #/Tag register | 8-bit | write/read | 1F3 | 173 | 0F3 | 073 |
| Cylinder-Low register | 8-bit | write/read | 1F4 | 174 | 0F4 | 074 |
| Cylinder-High register | 8-bit | write/read | 1F5 | 175 | 0F5 | 075 |
| SDH register | 8-bit | write/read | 1F6 | 176 | 0F6 | 076 |

-continued

| register name | size | direction | PA | SA | A1 | A2 |
|---|---|---|---|---|---|---|
| Command register | 8-bit | write | 1F7 | 177 | 0F7 | 077 |
| Status register | 8-bit | read | 1F7 | 177 | 0F7 | 077 |
| Alternate Status | 8-bit | read | 3F6 | 376 | 2F6 | 276 |
| Device Control | 8-bit | write | 3F6 | 376 | 2F6 | 276 |
| Device Address | 8-bit | read | 3F7 | 377 | 2F7 | 277 |

Registers 143 appear to host 10 to be a set of memory registers that may reside at any of the four host 10 memory address ranges listed in the above table as (primary ["PA"], secondary ["SA"], alternate 1 ["A1"] and, alternate 2 ["A2"]). Controllers that conform to the ATA specification respond to only one of the four address ranges listed above.

The direction column in the table indicates direction from the point of view of host 10. That is, write indicates a host 10 write operation and, read indicates a host 10 read operation.

Individual registers have format and content that change during interactions between host 10 and multiple-drive controller 20-1. The format and content that applies at any given point in time depends upon register ownership. When the direction column indicates write, host 10 owns the register and the register format that applies is the write format. For example, primary address '1F7' is the command register when the host 10 owns and writes to this register. When multiple-drive controller 20-1 owns the register at primary address "1F7", multiple-drive controller 20-1 uses the register to store status to be read by host 10. Means for establishing register ownership are discussed below.

Host 10 owns task file 143 when no commands are being executed by the multiple-drive controller 10. Host 10 initiates multiple-drive controller 20-1 command execution by writing a multi-byte command into the task file registers 143. Multiple-drive controller 20-1 begins command execution when host 10 writes the command into the Command register.

The SDH register conventionally has the following format and content:

| bit | mnemonic | function |
|---|---|---|
| 7 | 1 | set to one |
| 6 | LBA | logical block address mode |
| 5 | 1 | set to one |
| 4 | DRV | drive number, 0 or 1 |
| 3 | HS3 | head select bit 3 |
| 2 | HS2 | head select bit 2 |
| 1 | HS1 | head select bit 1 |
| 0 | HS0 | head select bit 0 |

The SDH register LBA bit conventionally specifies the data address format. When the LBA bit is zero, the address is in "cylinder, head, sector" (CHS) format and, the four HSi bits specify the head number. When the LBA bit is one, the address is in LBA format and, an alternate disk memory addressing means is employed as is discussed below. For reasons discussed below, the LBA bit is not used to specify the LBA address format in any preferred embodiment of the multiple-drive controller.

Conventionally, the DRY bit indicates which of two logical drives that may be connected to the ATA interface is to respond to the host 10. Use of the DRY bit is discussed further below.

The status register conventionally has the following format and content:

| bit | mnemonic | function |
| --- | --- | --- |
| 7 | BSY | indicates ownership of the task file |
| 6 | DRDY | drive ready |
| 5 | DWF | drive write fault |
| 4 | DSC | drive seek complete |
| 3 | DRQ | data request |
| 2 | CORR | data error occurred and was corrected |
| 1 | IDX | index |
| 0 | ERR | error occurred during execution of previous command |

The host 10 reads the status register to determine general operational status of the selected drive.

As noted above, the SDH register is conventionally defined so that the DRY, bit 4, indicates the drive that to which the command is addressed. For example, if host 10 wants to address drive 1, bit 4 of the SDH register is set to 1 and 0 for the other drive. (The only exception is the DIAG (diagnostic) command which forces both drives to respond regardless of the value of bit 4 of the SDH register.)

Thus, one set of Task file 143 registers in the Host Interface 21 and a single physical address, is sufficient for host 10 to communicate with both player mechanism 40 and HDA 30. The interface registers may be configured in two different but equivalent ways:
1) HDA 30 as "drive 0" and player mechanism 40 as "drive 1"; or
2) HDA 30 as "drive 1" and player mechanism 40 as "drive 0". The microprocessor 92 accordingly examines the task file registers 143 and distinguishes host commands for HDA 30 from commands for player mechanism 40 by examining bit 4 of the SDH register.

Task file registers 143 are also preferably compatible with the AT bus Attachment Packet Interface (ATAPI) specification, as set out in the Small Form Factor Committee specification of ATA Packet Interface for CD ROMs, specification no. SFF-8020, dated February 1994, the disclosure of which is incorporated herein by reference.

ATAPI commands use a special opcode (A0 hex) of the ATA command set to initiate an ATAPI command packet transfer. Such command packets are transferred over the data lines, to circumvent limitations on the available ATA compatible address space. This ATAPI command packet specifies the CD operations the host requests to be performed.

Accordingly, microprocessor 92 may first examine SDH register bit 4 in task file 143 to determine if player mechanism 40 is selected by the host. If it is, microprocessor 92 examines the task file 143 Command register for ATAPI commands. An ATAPI command packet in turn is acquired from host 10 via I/O interface 11 and host interface data registers 145 and sent to FIFO buffer 144 where it is stored until loaded into buffer memory 66 by buffer manager 146. Alternatively, the ATAPI command packet may be read by microprocessor 92 from data/control registers 145 and stored in microprocessor RAM 94 (FIG. 7). In either case microprocessor 92 reads and decodes the packet and executes control of player mechanism 40 based on the decoding of the packet.

In an alternative embodiment, a multiple drive controller in accord with the invention may be configured to respond only to host commands addressed to a specified bit value in bit 4 of the SDH register. For example, such a multiple-drive controller may respond only to commands sent to "drive 0" of the primary address leaving the "drive 1" slot available to other Storage peripherals. To allow such alternate implementation, this invention provides several methods for distinguishing host commands intended for HDA 30 from host commands directed to player mechanism 40, without using the drive select bit in the ATA Task File.

Figure 11:
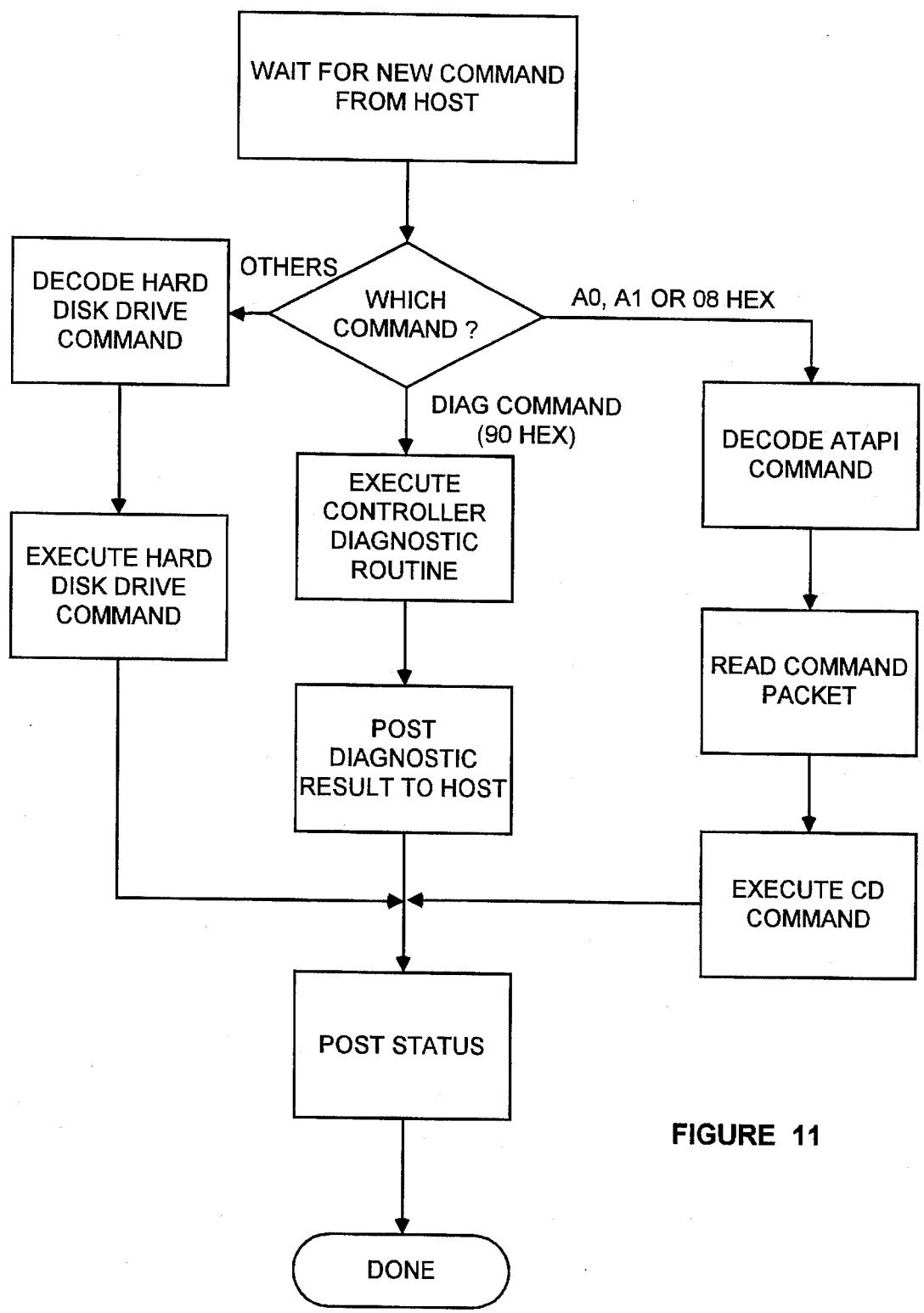
FIG. 11 is a flow diagram illustrating operations performed in decoding host commands in accordance with a first embodiment of the invention.

In a first method, this invention exploits the fact that any host commands directed to HDA 30 are always different from the following three special opcodes reserved for CD control in the ATAPI specification:
A0 HEX: ATAPI packet command
A1 HEX: ATAPI identify drive command
08 HEX: ATAPI soft reset command Commands to control player mechanism 40 thus are either A1 HEX, 08 HEX or A0 HEX, the latter followed by a command packet transferred into FIFO 144 or buffer memory 66 or RAM 94. This method is illustrated in the flow diagram of FIG. 11 which is self explanatory. This method of implementation requires very little modification to system BIOS, or software drivers for HDA 30 or player mechanism 40.

Figure 12:
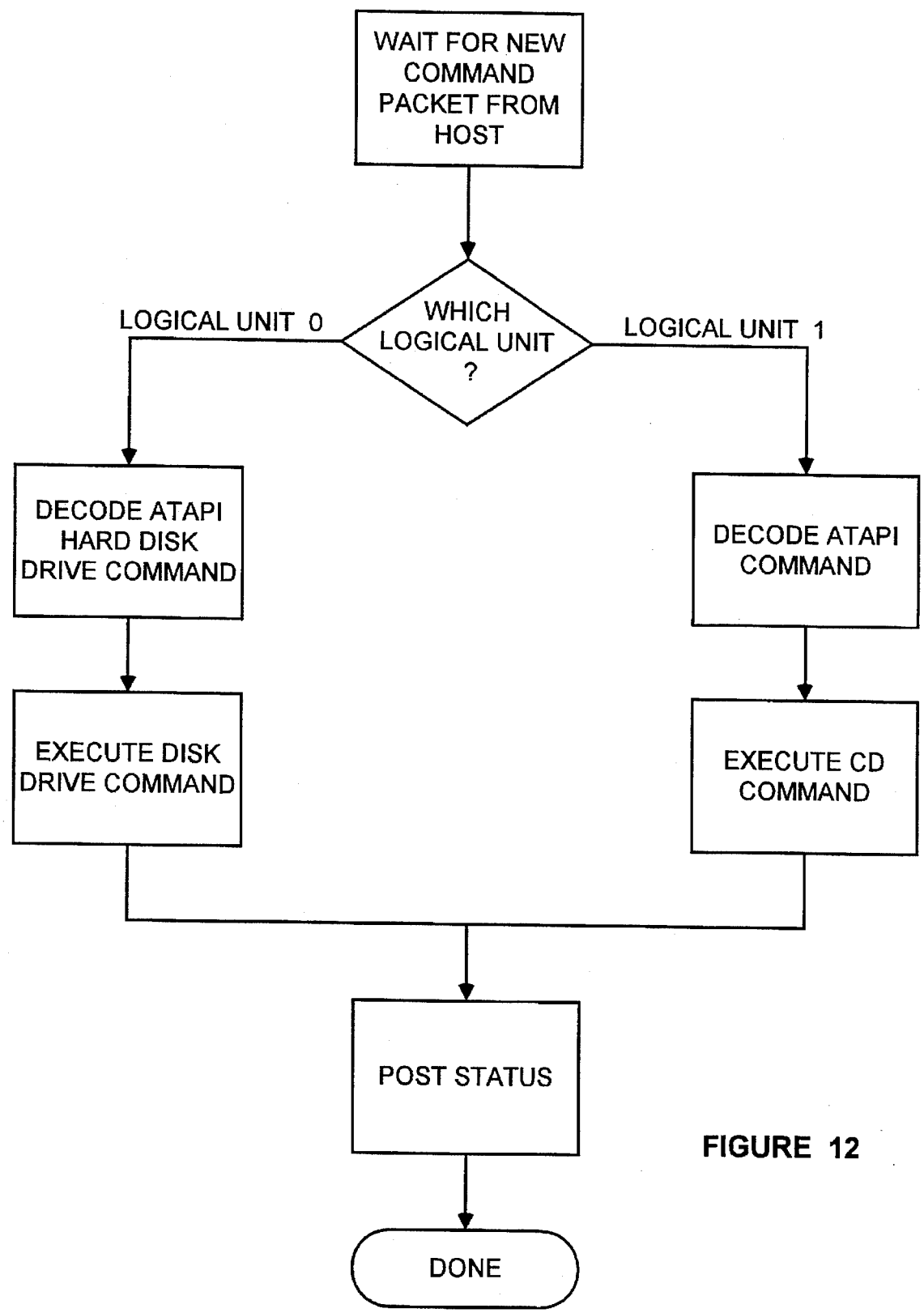
FIG. 12 is a flow diagram illustrating operations performed in decoding host commands in accordance with a second embodiment of this invention.

In a second method in accordance with this invention, the multiple drive controller is designed to use ATAPI command packets to control operation of the fixed-media disk drive HDA 30. Commands for HDA 30 are differentiated from commands for player mechanism 40 by use of the Logical Unit field in the standardized ATAPI command packet. For example, HDA 30 may be designated as logical unit 0 while logical unit 1 represents player mechanism 40 for host ATAPI commands. This approach is illustrated in the flow diagram of FIG. 12 which is also self explanatory in view of the foregoing discussion. This method of implementation also requires little modification to the host system BIOS, or software drivers.

Figure 13:
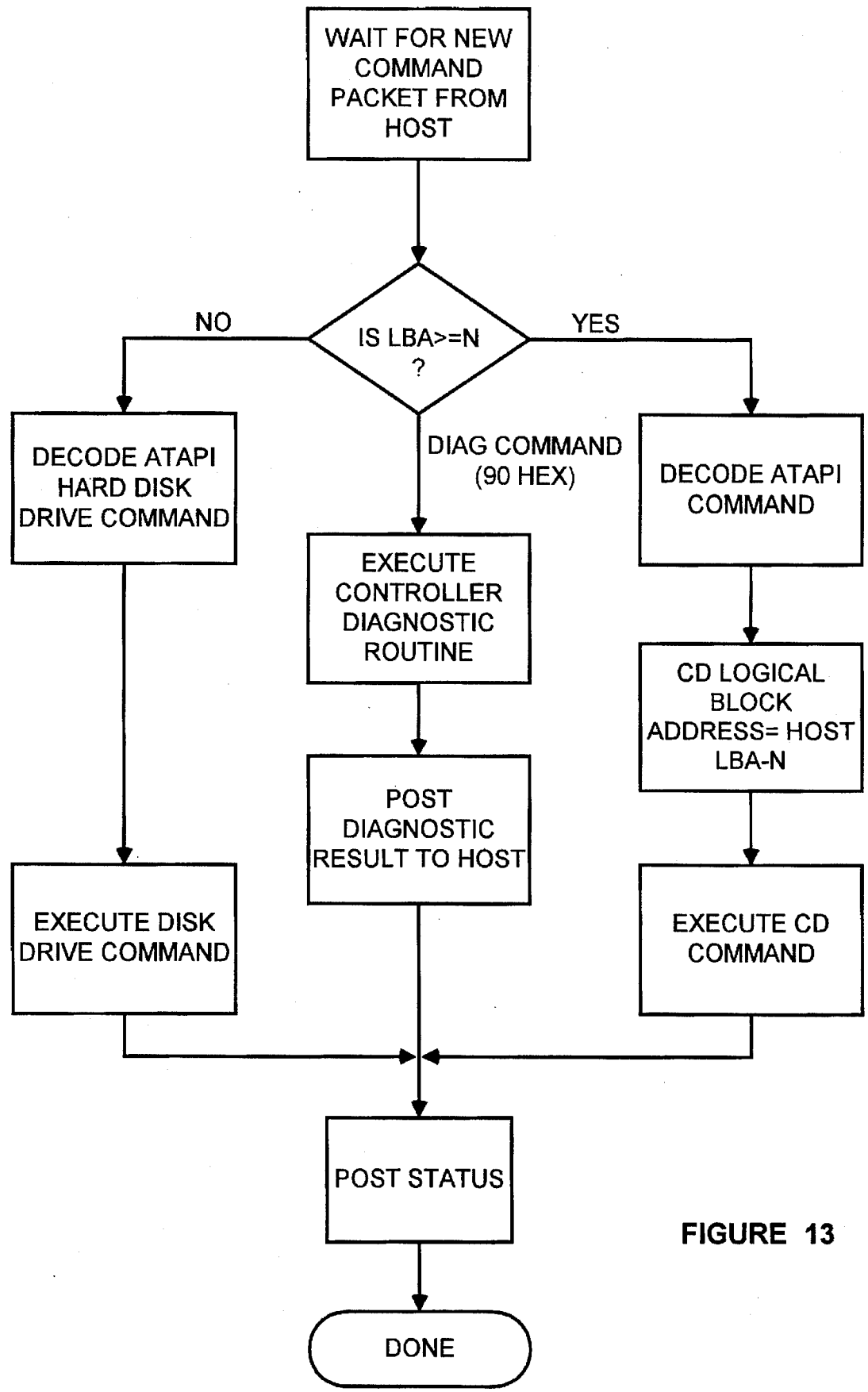
FIG. 13 is a flow diagram illustrating operations performed in decoding host commands in accordance with a third embodiment of this invention.

In a third method in accordance with this invention, the multiple drive controller is also designed to use ATAPI command packets to control operation of the fixed media disk drive HDA 30. However, the logical address field in the ATAPI command packet is used to select the logical unit. Logical addresses 0 to (M–1) specify HDA access and logical addresses M to M+N–1 specify commands for player mechanism 40, where M is the number of user accessible sectors of HDA 30. This approach is illustrated in the flow diagram of FIG. 13 which is also self explanatory. Note that the logical addresses for CD access may also start at any value greater or equal to M. This method of implementation also requires little modification to system BIOS, or software drivers.

In a fourth method, host 10 uses unique packet command codes to send command packets to each of logical units zero and one. In this method, host 10 uses a first command code to send ATAPI command packets destined for fixed disk drive control and a second command code to send ATAPI command packets destined for removable media disk drive control.

Any of these approaches allows the multiple-drive data-storage system to function as a single physical disk drive as seen on the ATA electrical interface. This allows host 10 to accommodate twice the number of disk drives without the need for adding logic circuitry to the host system. These emulation methods thus allow up to 4 disk drives and 4 player mechanisms in a single ATA compatible host system.

Although the above alternative approaches all provide for addressing multiple drives via a single ATA interface, the existing ATA interface protocols preclude host 10 from initiating concurrent or overlapped execution of two or more commands in a single ATA compatible controller. Unless such "overlapped command execution" is provided for, the slow operation of typical CD player mechanisms will effectively "block" the host from utilizing the high performance capability of the fixed-media disk drive. "Overlapped" commands are not conventionally allowed since a Busy (BSY) status flag in the ATA task file registers 143 (FIG. 8) conventionally remains asserted (BSY=1) until command execution is completed. The Busy (BSY) status indicates the owner of the Task file registers. When the Task file is Busy (BSY=1) the registers are owned by multiple-drive controller 20-1, and host 10 may not change their content. When the Task file is not Busy (BSY=0) then the registers are owned by host 10 and multiple-drive controller 20-1 shall not alter their content. As is easily apparent, host 10 may not place new values into the Task file registers while the registers are busy and as such can not issue overlapped commands.

Preferably, overlapped host commands may be executed by multiple-drive controller 20-1. The preferred means for differentiating between commands, in concurrent execution, provides each host command with a "Command tag" (Identification). The "Command tag" is provided via the Sector #/Tag register when the command is issued to multiple-drive controller 20-1. The Sector #/Tag register appears at one of the host 10 addresses 1F3, 173, 0F3 and 073 in the ATA compatible task file registers 143 described above. The Sector #/Tag register format provides for conveying a single eight-bit unsigned integer. Host 10 issues command and command tags in pairs so that no two commands in overlapped execution in multiple-drive controller 20-1 have the same command tag value. Thus, the preferred implementation of the command tagging means provides for overlapped execution of as many as 256 uniquely identifiable commands.

When multiple-drive controller 20-1 receives a (tagged) command from host 10, it preferably stores that command along with its parameters in a command queue in buffer memory 66, then clears the Busy (BSY) flag in the Task file. This allows host 10 either to go on with other processing tasks or to send another command to multiple-drive controller 20-1, which subsequent command could be for either HDA 30 or player mechanism 40. Multiple-drive controller 20-1 determines which command from the command queue to execute. An alternate implementation stores the command queue in RAM 94.

During overlapped command execution, multiple-drive controller 20-1 may have data to transfer to/from host 10 (in the case read or write commands, for example) or no data to send (e.g., for a seek). Before data transfer can be initiated for a particular overlapped command, multiple-drive controller 20-1 must acquire ownership of task file registers 143 and notify host 10 of the identity (tag) of the command requiring service. In the preferred implementation, when multiple-drive controller 20-1 requires service, it requests ownership of the task file registers by placing a one (1) in bit one of the ATA Status register and interrupting host 10 via an interrupt signal generated by HIDC 60. When used in this way, Status register bit one is designated the "attention bit" (ATTN). ATTN is the only status information available to host 10 until host 10 responds to the interrupt. In response to the interrupt issued by multiple-drive controller 20-1, host 10 reads the Status register, noting the ATTN bit and returning ownership of the Task file registers to multiple-drive controller 20-1 by issuing a new ATA command (for example, "Select" "0xA2") to multiple-drive controller 20-1. Multiple-drive controller 20-1 responds to the Select command by setting the busy flag (BSY=1), loading the task file registers 143 with information consistent with the tagged command requiring service and, requesting data transfer by asserting "data request" (DRQ) and clearing BSY in the ATA interface. The information stored in the task file registers includes the command tag which is stored in the sector #/Tag register. Host 10 responds to DRQ by reading some of the information stored in the task file registers 143, including the tag, to determine which command requires service and initiates data transfer using conventional ATA data transfer protocols. When the immediate need for data service are completed, multiple-drive controller 20-1 saves command status in RAM 94 and sets the Status register Busy bit to zero (BSY=0).

The process of acquiring ownership of the task file registers 143 for use by tagged commands is called "task file arbitration" (TFA). TFA and the associated data transfer between host 10 and controller multiple-drive 20-1 may occur more than once and perhaps many times during execution of a single tagged host command. In addition, two or more tagged commands in concurrent execution may intersperse TFA and the associated data transfers in arbitrary sequences. Tagged commands end execution by presenting "final status" during the final TFA initiated information transfer sequence. An operating condition of particular interest is one in which multiple-drive controller 20-1 is operating on two read commands wherein one command is reading data from the fixed disk drive HDA 30 and the other command is reading data from the removable media disk drive player mechanism 40.

Advantages of such an implementation of overlapped commands include 1) host 10 does not have to wait between I/O commands and 2) the I/O throughput may be increased due to command re-ordering for both read/write commands.

Referring to FIG. 8 in conjunction with FIGS. 9 and 10, which illustrate buffer memory 66 schematically, the function of buffer manager 146 will be described. Buffer manager 146 allows buffer memory 66 to be shared between the data flow requirements of the read/write data path of player mechanism 40 and the read/write data path of HDA 30 thereby providing a significant reduction in circuitry for the multiple-drive, data-storage system.

More specifically, buffer manager 146 receives data from several sources, including player mechanism 40 via CD control circuitry 100, data from host 10 via host interface circuitry 141, data from HDA 30 via control circuitry 102, data received from host 10 via bi-directional FIFO buffer 144, and auxiliary data input received by ADPCM interface circuitry 104 via FIFO buffer 136, all of which is directed to buffer memory 66 for temporary storage. Buffer manager 146 arbitrates between these independent data input paths and controls the orderly flow of this data into buffer memory 66 via path 123. Buffer manager 146 also arbitrates data flow out of buffer memory 66 via multiple data paths. More specifically, buffer manager 146 arbitrates data to be written to several destinations, including a removable optical disk in player mechanism 40 via bi-directional FIFO buffers 124 and 126, and a disk in HDA 30 via bi-directional FIFO buffer 132, and host 10 via bi-directional FIFO buffer 144, and the audio data output to the user via FIFO buffer 136.

Figure 9:
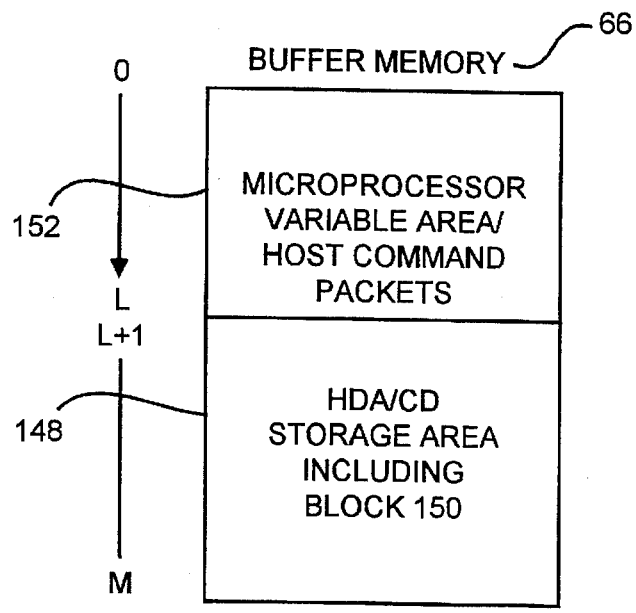
FIG. 9 is a drawing illustrating the contents of some locations in the buffer memory of FIG. 7.

As illustrated at FIG. 9, buffer memory 66 may preferably be organized into the following blocks: microprocessor variable and ATAPI packet storage block 152, and HDA/CD storage block 148 (which includes CD storage block 150). If buffer memory 66 has locations sequentially addressable as 0–M, the addresses 0 to L may be allocated to block 152, and addresses L+1 to M may be allocated to HDA/CD storage block 148. The host data provided to buffer memory 66 for writing to HDA 30 or to player mechanism 40 in turn will be allocated by buffer manager 146 to HDA/CD storage block 148 before writing to the disks.

Figure 10:
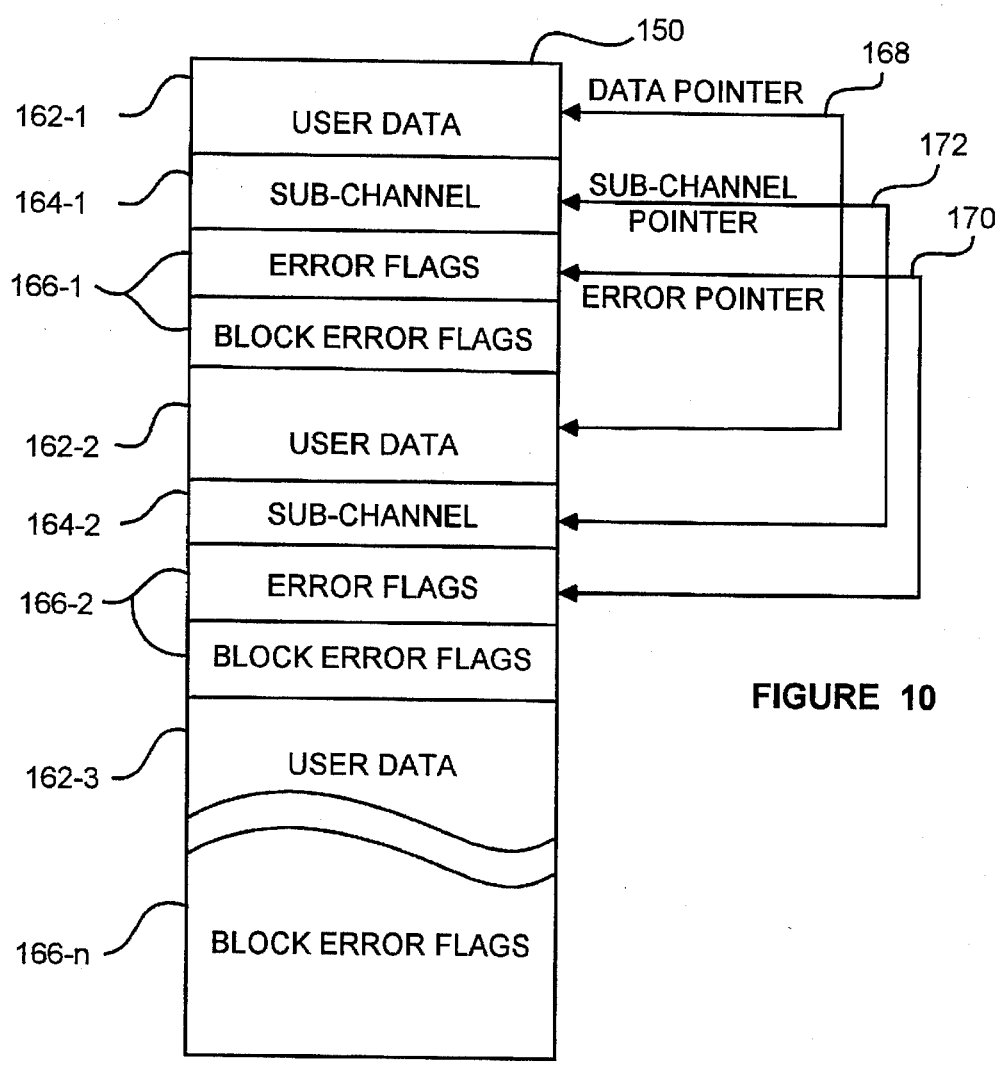
FIG. 10 is a drawing illustrating in more detail the contents of the locations in the buffer memory of FIG. 7.

The blocks illustrated in FIGS. 9 and 10 need not be fixed or contiguous as illustrated and the blocks may be overlapped or variable in size or location. Such partitioning of buffer memory 66 may dynamically change during operation.

Preferably, each of the data paths into and out of buffer manager 146 include FIFO buffers. As discussed above in relation to FIG. 8, the data input paths into buffer manager 146 pass through respective FIFO buffers 114, 124, 126, 132, 136 and 144 which may preferably each have an independent address pointer into buffer memory 66. These FIFO buffers provide relatively large data blocks to be moved into and out of buffer memory 66, for example a page of data (for example 512 words of data) may be moved at a time into buffer memory 66 in this manner.

In addition, buffer manager 146 arbitrates the input into buffer memory 66 from ECC corrector circuitry 134. ECC corrector 134 provides corrections to data already stored in buffer memory 66, as will be discussed in more detail below, which function is preferably shared between the read data correction for HDA 30 and the read data correction for player mechanism 40.

Accordingly, arbitration of the multiple data paths by buffer manager 146 allows highly efficient use of buffer memory 66. Furthermore, due to the speed differential between currently available CD drive mechanisms and that of HDAs and read channel circuitry, there is negligible reduction in the performance of buffer manager 146 and buffer memory 66 as provided by these sharing and arbitration functions when compared to the buffer performance of a standalone magnetic disk controller's buffer manager, when no sharing is employed.

Referring to FIG. 10, CD storage block 150 of buffer memory 66 is illustrated in more detail. As indicated by the previous discussion of FIG. 8, the data flow into buffer memory 66 from the CD ECC and ENDEC circuitry 110 includes separate data paths and interfaces with buffer manager 146 for subcode information (provided via FIFO buffer 124 shown in FIG. 8), data (provided via FIFO buffer 126 shown in FIG. 8) and error flags (provided via FIFO buffer 114 shown in FIG. 8). These three separate data paths, which enter buffer memory 66, through separate interfaces, under arbitration and control of buffer manager 146, are read into different blocks in CD storage block 150 of buffer memory 66 as illustrated in FIG. 10.

More specifically, CD storage block 150 is partitioned into segments where each segment comprises several smaller data blocks. For the first segment, the user data are written into user data block 162-1, the subcode information is written into subchannel block 164-1, and the error flags are written in error flag block 166-1. This memory allocation is repeated for different segments of CD data as generally illustrated by blocks 162-2, 164-2, and 166-2 in FIG. 10. One segment in the CD read storage area 150 is used to store the CD ROM disk "table of contents" (TOC); the TOC is discussed further below.

The three data paths mentioned above provide data streams in parallel for each sector. These three data streams are desirably placed in adjacent areas of buffer memory 66 as illustrated in FIG. 10. More specifically, the user data are written into user data blocks such as block 162-1, the subcode information is written into subchannel blocks such as block 164-1, and the error flags are written into error flag blocks such as block 166-1. Furthermore, for a given sector it is desirable that each subchannel block immediately follow a user data block in buffer memory 66 and that each error flag block immediately follow a subchannel block in buffer memory 66. This memory allocation is repeated for all sectors of CD data.

In order to achieve the memory allocation described above, a separate address pointer is preferably maintained for each of the three data streams. This is also illustrated in FIG. 10. The user data are stored at memory locations given by the user data pointer 168, the subcode information is stored at memory locations given by subchannel pointer 172, and the error flags are stored at memory locations given by error pointer 170. These pointers are incremented after each access within a sector. At the sector boundary, an offset is added to the pointers to update the address to the appropriate location for the next sector. More specifically, user data pointer 168 is offset by the total size of each subchannel block and each error flag block, subchannel pointer 172 is offset by the total size of each user data block and each error flag block, and error pointer 170 is offset by the total size of each user data block and each subchannel block.

Additionally, it is desirable to transfer some or all of the information in the above-mentioned blocks to host 10. Host 10 may request only user data block 162 or a limited subset of the block. In addition, host 10 may request the transfer of part of a subchannel block or error flag block, or both. In order to handle all of the possible options for transferring data to host 10, buffer manager 146 may be programmed to transfer up to three discontiguous blocks from buffer memory 66 as one contiguous block to host 10 for each sector.

Accordingly, the configuration of buffer memory 66 illustrated in FIGS. 9 and 10 provides efficient use of the shared buffer memory and allows efficient access to the stored data by host 10, the microprocessor and other circuitry in multiple-drive controller 20-1 as necessary.

Figure 14:
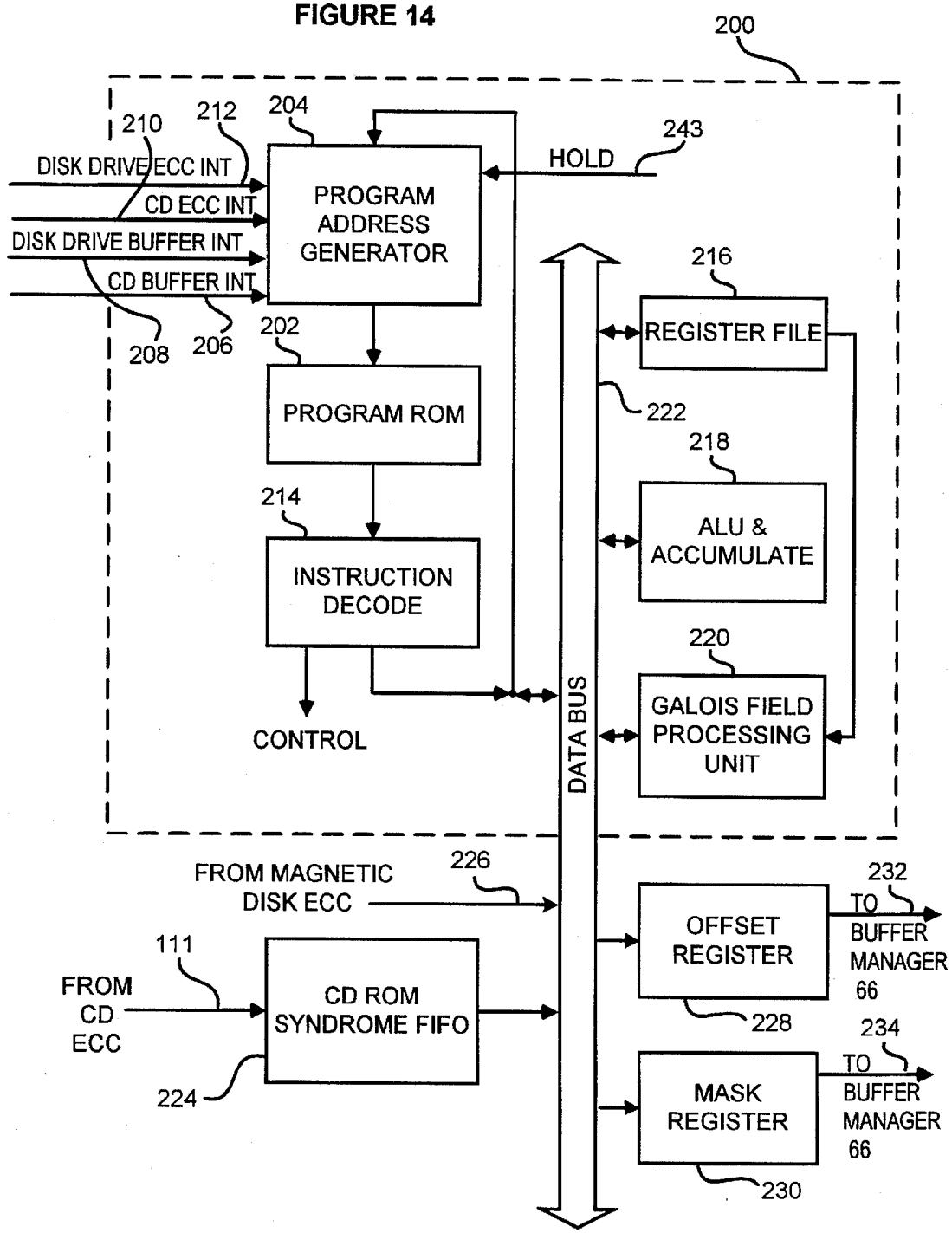
FIG. 14 is a block diagram of the ECC error corrector of FIG. 8 in accordance with a preferred embodiment of this invention.
Figure 15:
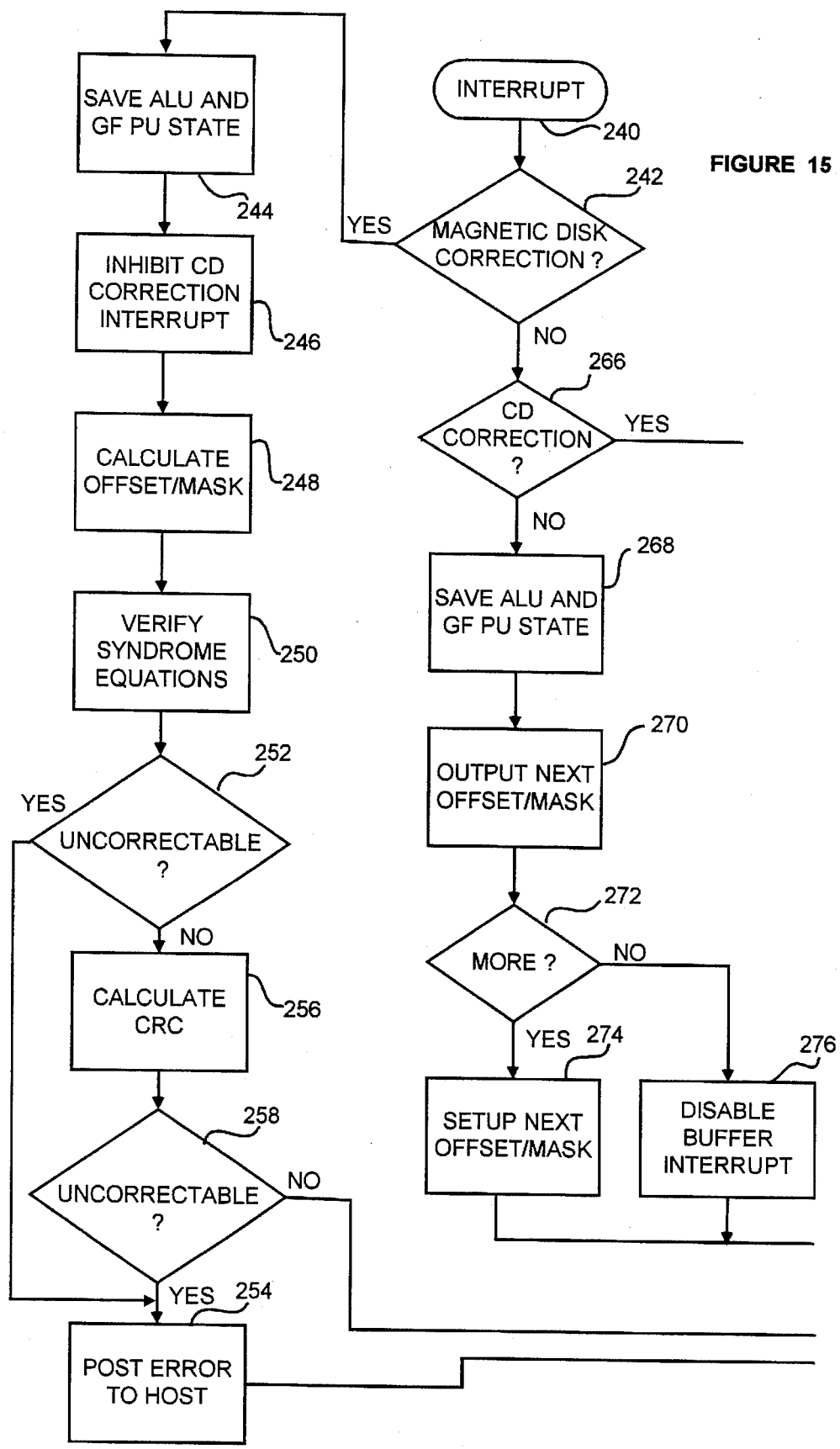
FIG. 15 is a flow diagram illustrating part of the operation of the error corrector of FIG. 14 in accordance with a preferred embodiment of this invention.
Figure 16:
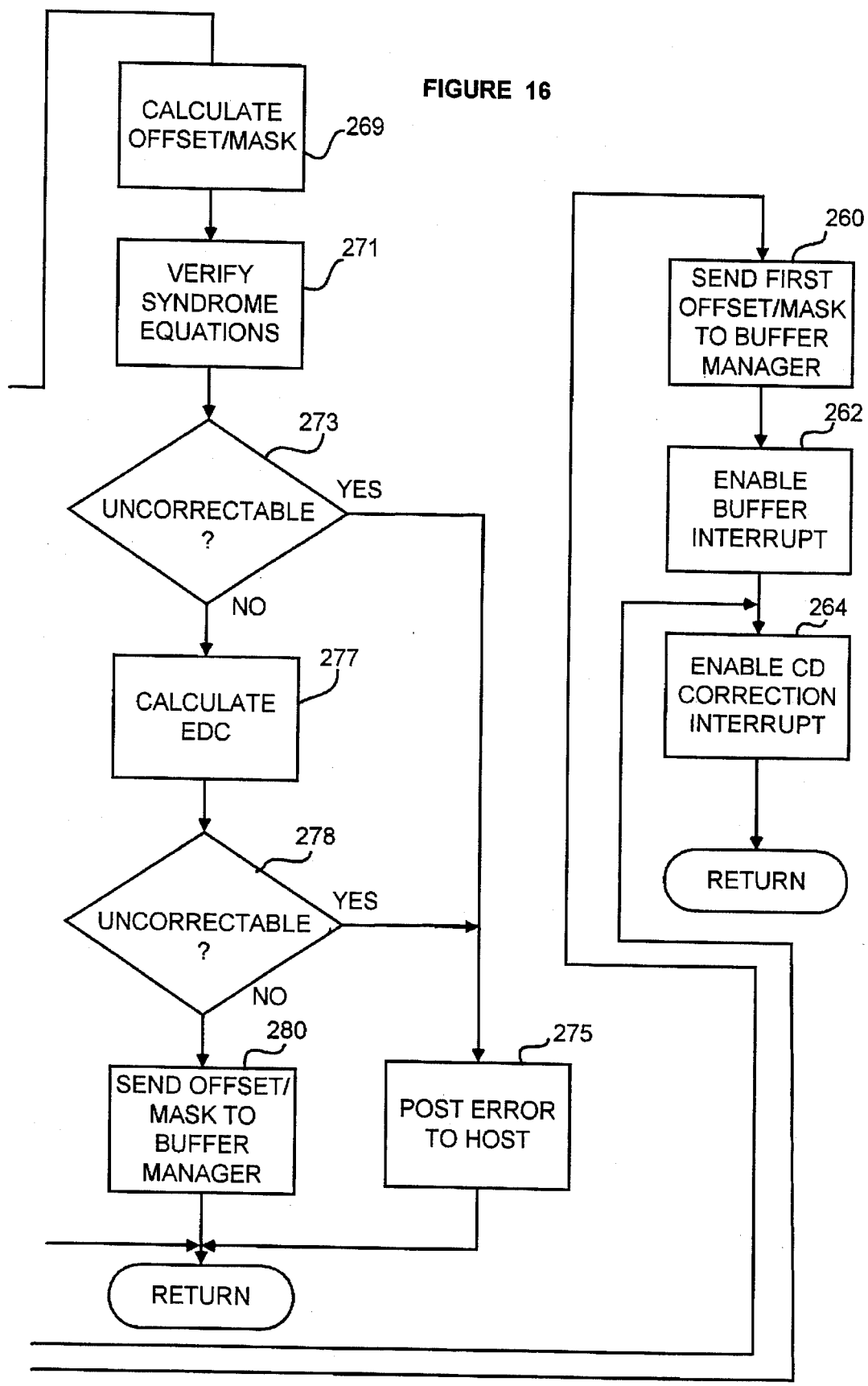
FIG. 16 is a flow diagram illustrating another part of the operation of the error corrector of FIG. 14 in accordance with a preferred embodiment of this invention.

Referring to FIGS. 14, 15, and 16, a preferred embodiment of the shared ECC corrector 134 (FIG. 8) will be described. ECC corrector 134 in accordance with this invention, is preferably shared to provide ECC correction for both errors in read data received from player mechanism 40 and in read data received from HDA 30. This sharing of error correcting means provides for reducing component count and cost for the combined multiple-drive data-storage system.

Preferably, ECC corrector 134 employs the same finite field for the Reed-Solomon ECC code for correcting HDA-errors as conventionally used in CD technology in accordance with the above-noted international specifications. This allows a shared Galois Field Processing Unit to be employed for the ECC correction function. Alternatively, two separate finite fields could be employed with some increase in complexity for the shared Galois Field Processing Unit.

More specifically, the common generator polynomial employed for the ECC functions is:

$$g(x)=x^8+x^4+x^3+x^2+1$$

and the primitive element of the finite field, $GF(2^8)$ is $$\alpha=(00000010)$$

The HDA ECC is a 3-way interleaved, degree 6 (178, 172) Reed-Solomon code. The degree six HDA ECC polynomial is:

$$G(x)=(x+1)*(x+\alpha)*(x+\alpha^2)*(+\alpha^3)*(x+\alpha^4)*(x+\alpha^5)$$

An additional 4-byte CRC (Cyclic Redundancy Check) polynomial is used to minimize miscorrections. This CRC can be the same polynomial as used for the CD EDC as defined below. Conventional CD technology uses a product code calculated across the header, subheader, user data and EDC. The CD EDC polynomial is:

$$G(x)=(x^{16}+x^{15}+x^2+1)*(x^{16}+x^2+x+1)$$

The CD ECC polynomial for both the P and Q parity check is:

$$G(x)=(x+1)*(x+\alpha)$$

The header, subheader, user data and EDC are conventionally arranged into two, 43×24 byte matrices. The P parity checks are 86 (26, 24) Reed-Solomon codewords formed by the columns of this data matrix and the Q parity checks are 52 (45, 43) Reed-Solomon codewords formed by the diagonals of this data matrix. This means that there are 138 pairs of syndrome bytes to be processed for each sector.

Referring to FIG. 14, in a preferred embodiment, the calculations for implementing error correction based upon the above-noted ECC polynomial are implemented by microcontroller 200, which may be a RISC (Reduced Instruction Set Computing) microcontroller which can perform the necessary calculations at high speed. The control firmware for RISC microcontroller 200 is stored in program ROM 202, which program sequence is incremented via program address generator 204. To allow RISC microcontroller 200 to perform error correction for both the CD data and the HDA data, it must process interrupts related to ECC error detection from both the CD error detection circuitry and HDA error detection circuitry, described in relation to FIG. 7, as well as buffer interrupts. This is shown by interrupt lines 206, 208, 210 and 212 leading into the program and address generator 204. This interrupt processing will be discussed in more detail below in relation to FIGS. 15 and 16. RISC microcontroller 200 also includes an instruction decode circuit 214 which interprets the instructions provided from program ROM 202.

RISC microcontroller 200 also preferably includes a dual port register file 216 which is used to store the HDA and CD ECC syndromes for the error correction calculation to thereby allow the shared use of the corrector. Also, a dual ported register file 216 stores temporary values during calculations. RISC microcontroller 200 also includes an arithmetic and logic unit (ALU) 218 with performs standard arithmetic and logic functions, including: ADD, SUBTRACT, NEGATE, NOT, AND, OR and XOR. The temporary results of the ALU are accumulated or temporarily stored in the accumulator 218. RISC microcontroller 200 further includes a Galois Field Processing Unit 220 which performs the primary ECC calculation functions by multiplying and adding in Galois Field $2^8$. These calculations performed by Galois Field Processing Unit 220 are used to compute the relative offset and mask for each code word in accordance with known ECC calculation procedures and accordingly the details of the calculation algorithm are not described further herein.

As further shown in FIG. 14, the RISC microcontroller 200 functional units 202, 204, 214, 216, 218 and 220 communicate via microcontroller data bus 222. Also, as shown in FIG. 14, the dual ports of register file 216 allow it to communicate with microcontroller data bus 222 as well as directly with Galois Field Processing Unit 220 allowing the CD and HDA syndromes to be directly loaded into the Galois Field Processing Unit 220. Also, as shown, instruction decode circuitry 214 is coupled back to program address generator 204 to allow the program address generator to sequence through the program code during execution of the correction algorithm.

More specifically, program address generator 204 normally increments address ROM 202 to the next consecutive address after each instruction (except for jump instructions and subroutine calls). When an ECC interrupt is received, via one of interrupt lines 206–212, and the interrupt is enabled, program address generator 204 changes the program address to a predetermined location in program ROM 202 and the current address is saved. After the interrupt has been processed, a return instruction returns the program address to the stored address location corresponding to the location prior to the interrupt. Such interrupt processing is discussed in more detail below in relation to FIGS. 15 and 16.

As further shown in FIG. 14, ECC corrector 134 includes a CD syndrome FIFO buffer 224 which receives the CD ECC syndrome, in a presently preferred embodiment the Reed-Solomon Product Code (RSPC), from the CD ECC detection circuitry discussed above in relation to FIG. 7. This is stored in buffer 224 until RISC microcontroller 200 is ready to process a corresponding CD ECC interrupt presented via path 210 and calculate the ECC correction. The CD syndrome may be provided from buffer 224 via the connection to microcontroller data bus 222 as illustrated.

As further shown in FIG. 14, error corrector 134 receives the HDA syndrome directly via path 226 from ECC ENDEC 130 (FIG. 8). This syndrome data need not be buffered due to the interrupt structure described in more detail below, wherein an ECC HDA interrupt is processed immediately by RISC microcontroller 200.

As further shown in FIG. 14, ECC corrector 134 includes offset and mask resisters 228 and 230 respectively. Due to the interrupt structure for ECC corrector 134, the update of buffer memory 66 (FIG. 7) will be interleaved with the correction calculation. Therefore, these registers temporarily hold the relative offset and mask data for the sector of data, whether provided from player mechanism 40 or from HDA 30, currently being corrected by RISC microcontroller 200. When these registers are loaded, a request is sent to buffer manager 146, along paths 232 and 234 respectively, which arbitrates these requests along with the other requests for access to buffer memory 66. When the buffer manager arbitration circuitry services the request from registers 228 and 230, buffer manager 146 adds the relative offset data provided from register 228 to the data sectors starting address, to offset the sector starting address, then performs an Exclusive OR (XOR) logical operation of the mask data from register 230 with the data stored at the offset buffer memory location. This loading of the offset data and mask data to buffer manager 146 is preferably done individually for each byte to be corrected.

After buffer manager 146 has completed such a buffer update using the data from offset and mask registers 228', 230, respectively, buffer manager 146 will reset the request for access lines from offset register 228 and mask register 230, and generate an interrupt to the RISC microcontroller to enable the offset and mask for the next buffer update to be sent to offset and mask registers 228, 230. This procedure is performed in the same manner whether the offset and mask data stored in offset register 28 and mask register 230 is for CD data correction or HDA data correction, with only the location in buffer memory 66 being altered to correspond to the allocated CD or HDA data-storage sections, as discussed above in relation to FIG. 9. In other words, error corrector 134 provides corrected data, via paths 232 and 234, to the buffer-writing means within buffer manager 146. Such corrected data will, when appropriate, constitute corrected data for address-defining data retrieved from a header in a CD sector.

Referring to FIGS. 15 and 16, the interrupt processing and error correction flow is illustrated for the error corrector (FIG. 14). More specifically, since the data streams provided from both player mechanism 40 and HDA 30 may need ECC correction at the same time, the corrector circuitry of (FIG. 14) must prioritize the ECC interrupts. In a presently preferred embodiment, due to the relatively slower access times of the currently available CD drive mechanisms relative to HDA disk access speeds, the corrector circuitry will preferably perform CD ECC correction as a foreground task and process HDA ECC requests as a priority interrupt driven background task. Similarly, buffer memory interrupts to update buffer memory 66 are also processed as high priority interrupts to the basic foreground task of calculating the CD ECC correction values.

Thus, as shown in FIG. 15, an interrupt is received at step 240. It is first determined whether the interrupt relates to a high priority ECC correction request related to HDA data at step 242. The error calculation processing branches to a high priority HDA ECC calculation if the determination is yes at step 242. In the case of a HDA ECC, prior to the interrupt the RISC microprocessor (FIG. 14) is temporarily put into a hold state (as indicated by hold path 243 in FIG. 14) which temporarily stops program address generator 204. At such time, the HDA syndrome bytes are directly transferred from ECC ENDEC 130 (FIG. 8) via path 226 into RISC controller register file 216 (FIG. 14). After the syndrome bytes are transferred, the hold is then removed to allow the RISC microprocessor to process the interrupt.

Next, at step 244 illustrated in FIG. 15, the interrupt is acknowledged by the program address generator and the state of Galois Field Processing Unit 220 and the state of accumulator 218 are saved in register file 216 (all shown in FIG. 14). This saving of the ALU and Galois Field Processing Unit state allows the foreground processing of the CD ECC correction to continue once the HDA interrupt has been processed.

At step 246, the CD ECC correction interrupt to the program address generator is inhibited to prevent any delays due to further interrupt processing during the high priority HDA error correction calculation. Next at step 248, RISC microcontroller (FIG. 14), calculates the offset and mask data for the ECC correction to the HDA data. As noted above, the ECC for the data read from the HDA is a three-way interleave, and at step 248 the corrector circuitry (FIG. 14) performs the correction algorithm for each of the three interleaves.

After the correction calculation is completed, at step 250, the corrector validates the correction for each code word of the three interleaves by regenerating the syndromes from the calculated correction and comparing the regenerated syndromes with the syndromes provided via path 226 (FIG. 14). If this syndrome validation process does not validate the correction solution, then the error is deemed uncorrectable at step 252 and the corrector posts an error to the host at step 254.

If the correction is validated at step 252, however, the corrector proceeds at step 256 to perform a further validation employing the cyclic redundancy check (CRC) calculation and determines if the CRC calculation provides a desired zero value indicating a valid correction. If the CRC calculation is determined to be non-zero at step 258, then an error is again posted to the host by the ECC corrector at step 254.

On the other hand, if the CRC calculation provides a zero value, then at step 258 the error is determined correctable and the first computed offset data and mask data corresponding to the correction calculation are sent to offset and mask registers 228 and 230 (FIG. 14) at step 260. This offset and mask data is then provided to buffer manager 146 in accordance with the buffer arbitration procedure (described above in relation to FIG. 14). After buffer manager 146 has performed the buffer correction, it then sends the buffer interrupt to the program address generator at step 262 to indicate the availability of the offset and mask registers for additional offset and mask correction data.

After completion of the HDA ECC interrupt routine, either through successful calculation of the correction or posting of an ECC error to microprocessor 92 (FIG. 7), the corrector moves to step 264 to enable the CD ECC correction interrupt and to return to step 240 for further processing.

Referring again to step 242, if the processing of the interrupt at step 242 determines the interrupt is not a high priority HDA ECC correction, at step 266 the ECC corrector determines whether the interrupt is a CD ECC data correction request. If the determination at step 266 is no, then the interrupt corresponds to a buffer manager interrupt requesting further correction data, and the corrector proceeds at step 268 to save the ALU and Galois Field Processing Unit state as in the case of step 244 discussed above. Next, at step 270, the error corrector provides the next available offset data and mask data to buffer manager 146 through the registers (illustrated in FIG. 14). At step 272, the microcode determines whether the offset/mask provided at step 270 is the last correction by decrementing a counter and checking for zero. If the determination at step 272 is yes, i.e. another correction is pending then at step 274 a address path is moved to the address of the register storing the next offset/mask and a flag bit is set to indicate that another correction is pending and buffer manager 146 is enabled to generate an interrupt after buffer memory 66 is modified. If the determination at step 272 is no, at step 276 the buffer interrupt is disabled and the ECC corrector returns to normal foreground task processing.

Referring back to step 266 shown in FIG. 15, if the determination is that the interrupt is a CD ECC data correction request, then foreground task processing proceeds to step 269 where the offset and mask data for the CD ECC correction is calculated. To execute step 269, the CD syndromes are first read in from the CD syndrome FIFO 224 (FIG. 14), and then the correction data are calculated by the RISC microcontroller 200. The correction is preferably performed on the P codewords first, as defined above, and then on the Q codewords. Any correction solutions from the P codewords are used to adjust the appropriate Q codeword syndromes prior to Q codeword correction. Any correction solution from the Q codewords are used to adjust the appropriate P codeword syndromes.

After the calculation is completed, at step 271, the corrector validates the correction for each code word by checking the computed location and by confirming that after adjustment all P and Q codeword syndromes are now zero. If the evaluation of these syndrome equations fails to validate the correction solutions, at step 273 the error is determined to be uncorrectable. The task processing then proceeds to step 275 and posts an ECC error to microprocessor 92 (FIG. 7). If the verification calculation at step 271 validates the correction solution, however, then at step 273 the error is deemed correctable and the correction solution is subjected to further validation at EDC calculation step 277. If the EDC calculation at step 277 results in a zero value then the correction is deemed valid at step 278 and the first offset and mask data is provided to buffer manager 146 at step 280. The task processing then proceeds to the Return step to process any further interrupts. Alternatively, the corrector may post each correction to buffer manager 146 as computed and only check the EDC calculation after all the corrections have been completed.

If in any of the above-noted error correction calculations the error is deemed uncorrectable, operations may be halted and the error optionally posted to microprocessor 92. If the error is posted to microprocessor 92 it may determine whether a read retry of the data should be attempted, whether other correction procedures are to be performed, whether to send uncorrected data to the host, or whether the read should be aborted and immediately post an ECC error to the host. The microprocessor may also perform erasure correction employing C2PO erasure information (in the case of CD read data) or using other erasure information for magnetic disk read data.

Figure 17:
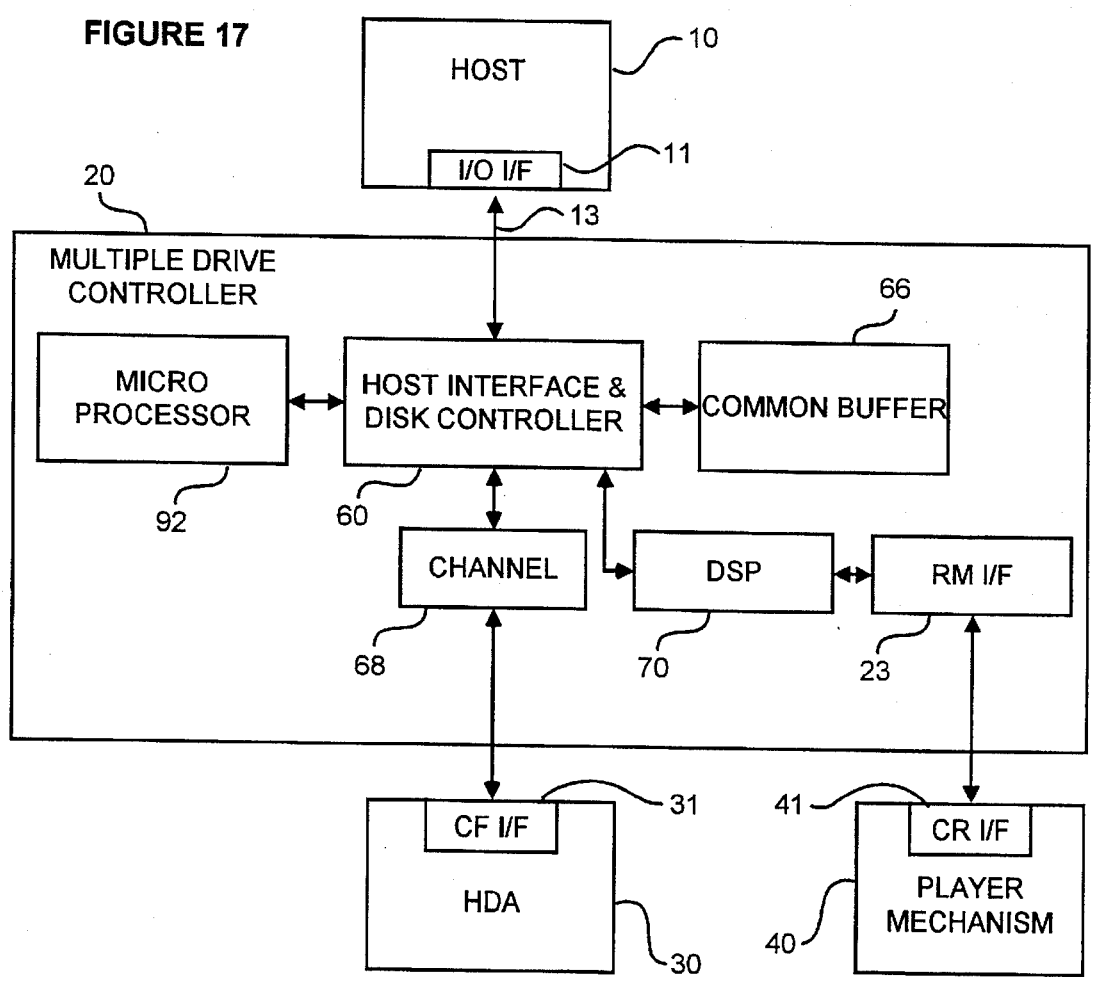
FIG. 17 is a block diagram illustrating structure involved in the flow of data in accordance with a caching method of a preferred embodiment of this invention.
Figure 18:
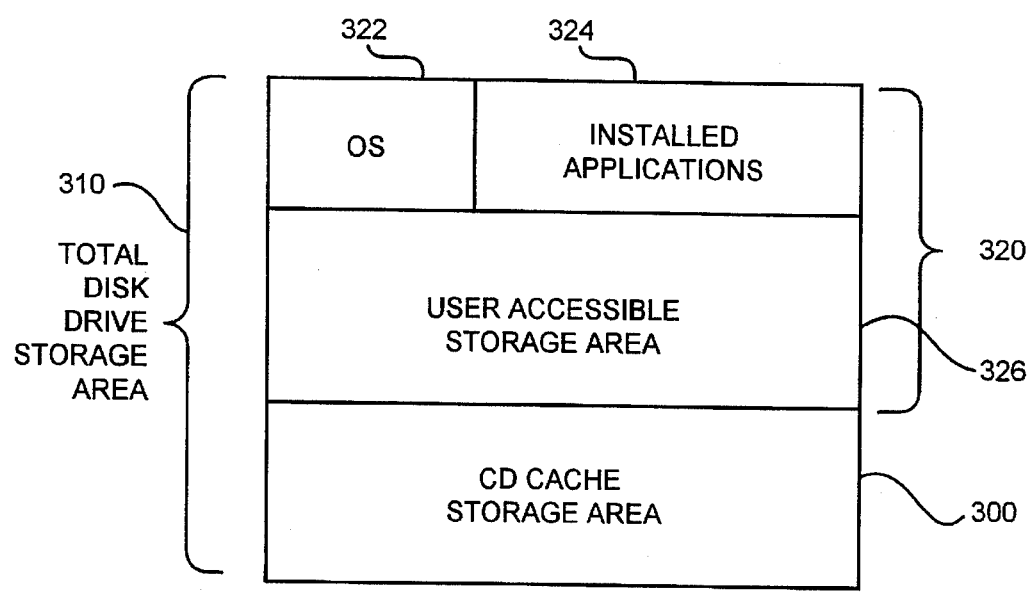
FIG. 18 is a drawing illustrating a partitioning of disk space in the head disk assembly in accordance with the caching method of this invention.
Figure 19:
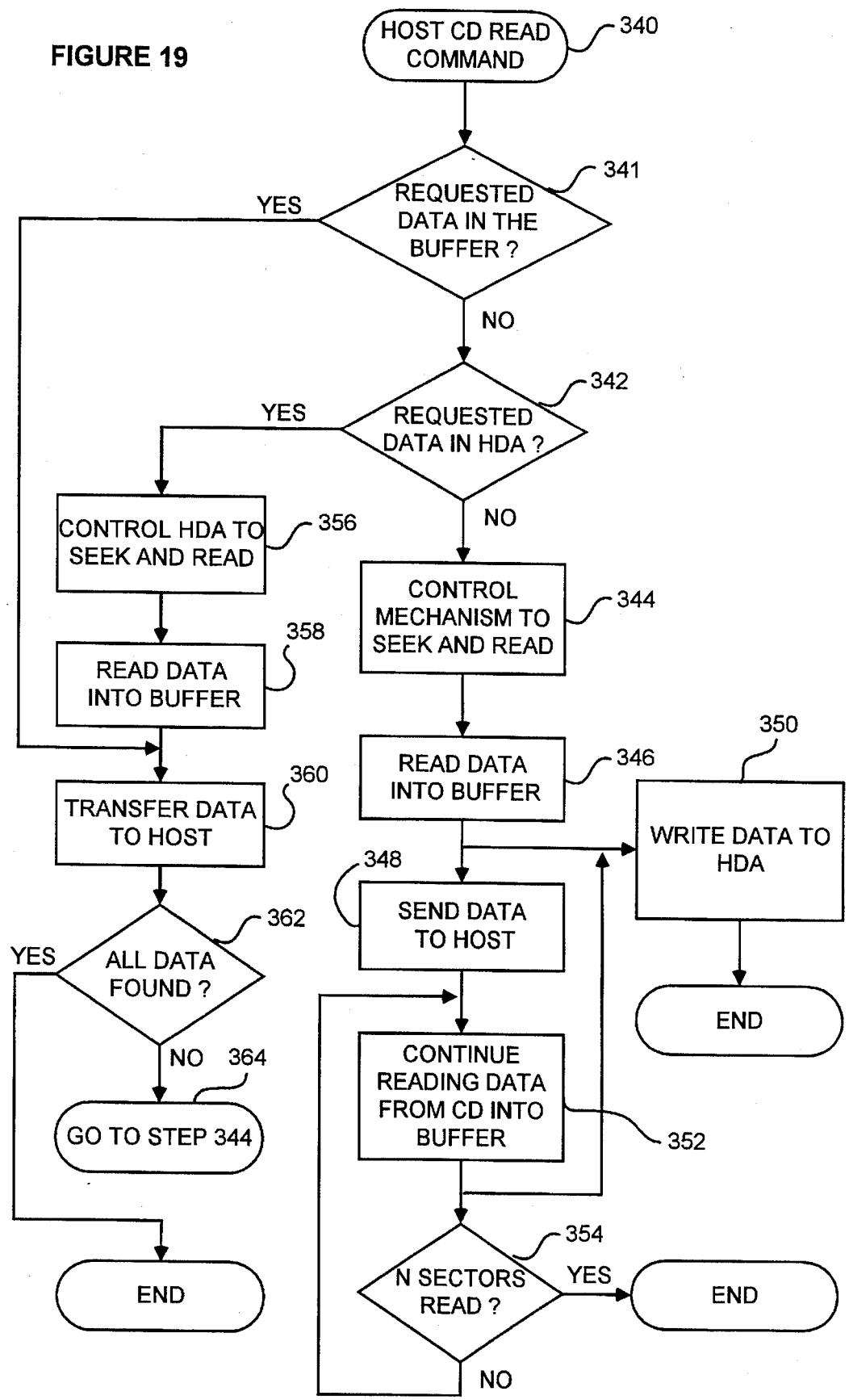
FIG. 19 is a flow diagram illustrating the steps in a read data caching method in accordance with a preferred embodiment of this invention.
Figure 20:
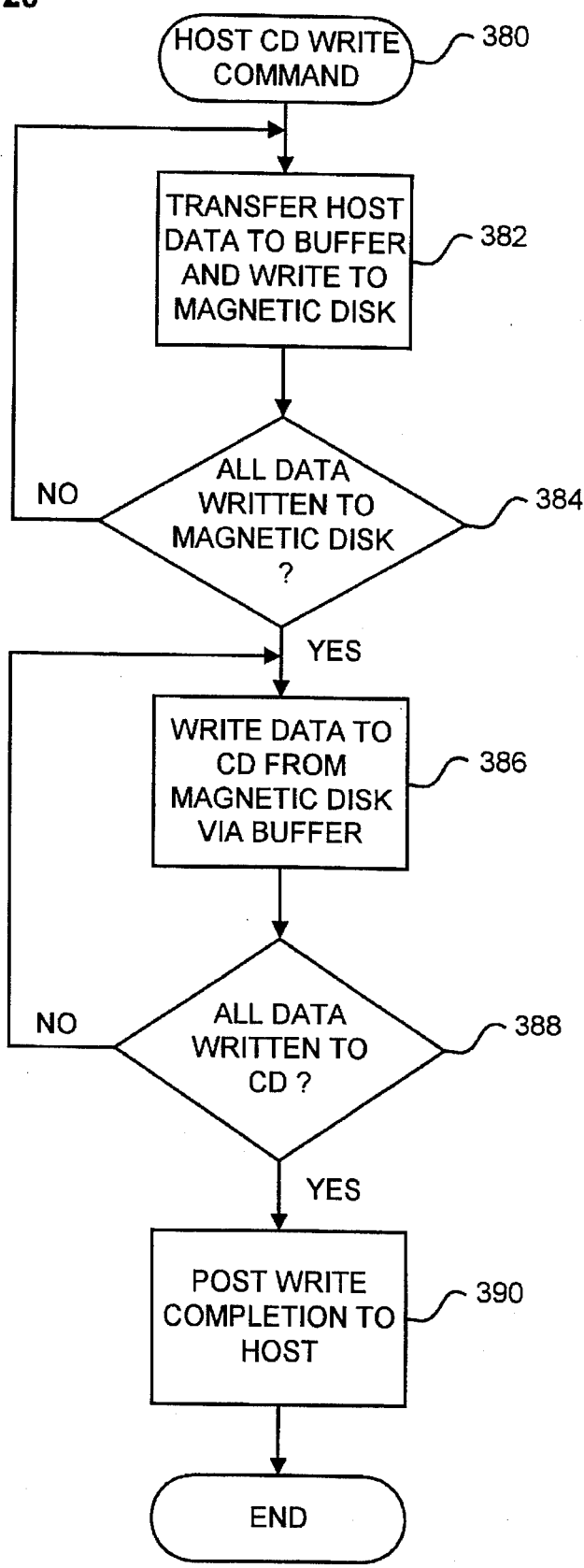
FIG. 20 is a flow diagram illustrating the steps in a write data caching method in accordance with a preferred embodiment of this invention.

With reference to FIGS. 17, 18, 19, and 20, there will now be described a caching method by which data retrieved from player mechanism 40 is cached in HDA 30. More specifically, FIG. 17 illustrates the data flow path used by the caching method and FIG. 18 illustrates the fixed media disk drive storage area partitioning for the HDA in accordance with the caching method of this invention. FIGS. 19 and 20, in turn, are flow diagrams illustrating the basic caching method of this invention employed for host CD read commands and host CD write commands, respectively.

The caching method of this invention exploits the shared buffer 66 to provide "direct caching" of data acquired from player mechanism 40 in the fixed media disk drive HDA 30 without using the host 10 or host I/O interface 11. Direct caching of data acquired from the player mechanism 40 may be fully or partially automatic in that a read commands issued to read data from player mechanism 40 to host 10 may store some part of or all of the data acquired from the player mechanism 40 first in the buffer 66 and then in the fixed media disk drive HDA 30 before forwarding the data to host 10.

The particular caching method employed may vary, depending upon the host command issued to multiple-drive controller 20-1. Thus, the command set includes command variations that call for specific caching operations one such command may call for reading data from the player mechanism 40 into buffer 66 and then storing the data thus acquired in the HDA 30 rather than sending the data to the host 10. Combined use of caching commands, overlapped command execution and optimized sequencing of queued commands provide basis for realizing highly efficient storage system operation.

Multiple-drive controller 20-1 may employ any of a variety of caching algorithms; they includes automatic "read ahead caching" of the type commonly used in fixed-media disk drives. The preferred caching methods use both the buffer 66 and a HDA 30 disk space allocation to implement a "two-level cache" for the player mechanism 40. Some of these caching methods are discussed further below.

FIG. 17 illustrates the direct data flow between player mechanism 40 and HDA 30 which is independent of host I/O interface 11 (FIG. 1). During caching of data to HDA 30 or during a copy command, the data flows from player mechanism 40 through player mechanism interface CR I/F 41, through RM I/F 23, which includes connector 51, through DSP 70, through HIDC 60 and into buffer memory 66. The data then flow from buffer memory 66, through HIDC 60, through channel 68, through CF I/F 31 and into HDA 30 where the data are stored. This data flow is controlled by microprocessor 92 and the programs that it uses.

Due to the currently relatively slow access times and data transfer rates for player mechanisms, the caching or copying of data from player mechanism 40 to HDA 30 permits the host 10 to have significantly faster access to the cached or copied data. This speed advantage is particularly significant in applications which are data intensive or which involve repeated access to digital audio or video, such as in multimedia applications, which are very data storage intensive and performance sensitive.

Also, if all the requested data are cached within HDA 30, multiple-drive controller 20-1 will preferably not power up player mechanism 40. This may provide power savings which are particularly significant in portable computer applications.

Furthermore, in addition to speeding up the host applications due to reduced data access time, the direct data flow between player mechanism 40 and HDA 30, which avoids the host I/O interface, frees host 10 and host I/O interface for other tasks which would otherwise be partially blocked during a standard transfer of data from a conventional CD drive to the host. Also, since this invention provides a high speed cache for CD data, such cache function may be removed from RAM 14, which is a very valuable resource for host 10.

FIG. 18 relates to a preferred feature, whereby in order to implement the caching functions of this invention, the total disk drive storage area 310 of HDA 30 is partitioned, prior to the use by the user of host 10, into two main portions: a CD cache storage area 300 and a remainder portion 320. Multiple-drive controller 20-1 reserves CD cache storage area 300 so that it is invisible to the user of host 10. Thus, the user sees a nominal disk drive capacity corresponding to the remainder of the disk drive storage area 320. This area 320 provides for storing an operating system in area 322, installed applications in area 324, and data in user accessible storage area 326.

This partitioning of the disk drive storage area as illustrated in FIG. 18 prevents the host from writing data into the CD cache storage area 300 thereby ensuring that multiple-drive controller 20-1 is aware of the available cache area to determine whether or not a cache or copy from player mechanism 40 to HDA 30 may be executed. Also, the partitioning prevents accidental erasure of user data which might otherwise be written over in an area used for such caching. To reallocate capacity to provide the user access to the total capacity 310, CD cache storage area 300 may simply be written to zero during initial setup, or by a special user command, thereby disabling the automatic caching function. The blocks illustrated in FIG. 18 need not be fixed or contiguous as illustrated.

When a new optical disk volume is loaded into player mechanism 40, any earlier cached data stored in CD cache storage area 300 is preferably flushed to make room for new cached data. To determine if the new disk is a new volume or just a prior volume being reinserted, multiple-drive controller 20-1 preferably checks the volume number of the optical disk prior to flushing the cache area 300. This volume information is located in the Q subcode information in accordance with conventional CD specifications.

Referring to FIG. 19, the CD data caching method is illustrated in a flow diagram in accordance with a preferred embodiment of this invention. The flow begins when, at step 340, a host CD read command is received (via host I/F 21). The flow has a branch at step 341; there, multiple-drive controller 20-1 performs a test to determine whether the requested data are available in the buffer (i.e., buffer memory 66). If the data are in buffer memory 66, multiple-drive controller 20-1 causes the data to be transferred to host 10 at step 360. If the data are not in buffer memory 66, multiple-drive controller 20-1 proceeds to step 342.

The flow has a branch at step 342; there, multiple-drive controller 20-1 performs a test to determine whether the requested data are available from HDA 30. If that the data are not in HDA 30, multiple-drive controller 20-1 proceeds to step 344, and there controls player mechanism 40 to seek and read the requested data. In portable applications, multiple-drive controller 20-1 first applies a power on control signal via path 52 (FIG. 5) to cause player mechanism 40 to receive power; then starts spindle motor 42. In portable applications or otherwise, multiple-drive controller 20-1 causes pickup 44 to move to the desired location on the optical disk. The requested data are then read from the optical disk through pickup 44. At step 346, multiple-drive controller 20-1 writes the requested data into buffer memory 66. In portable applications, after the requested data are retrieved from player mechanism 40, multiple-drive controller 20-1 turns off power to player mechanism 40.

After writing the requested data into buffer memory 66, multiple-drive controller 20-1 then sends the requested data to host 10 at step 348. At the same time, multiple-drive controller 20-1 may write the read data to HDA 30 as shown at step 350. That is, at step 350, the data are cached into HDA 30 in the CD cache storage area 300 (FIG. 18) for availability during a future host read command.

Still referring to FIG. 19, at step 352, multiple-drive controller 20-1 performs a read-ahead operation; i.e., it continues to write data received from player mechanism 40, such data having been read from at locations on the optical disk following those containing the requested data. Such read-ahead data are also stored in buffer memory 66 (in step 352) and in CD cache data-storage area 300 of HDA 30 (in step 350). The flow has a branch at step 354; there, multiple-drive controller 20-1 performs a test to determine whether a certain number (N) sectors have been read. This number N may be predetermined or may be varied under program control from host 10; the number will typically be larger or smaller depending upon whether CD cache storage area 300 is relatively large or small. If N sectors have not been read, multiple-drive controller 20-1 loops back to step 352. Thus, the read-ahead operation continues until at step 354 it is determined that N sectors have been read, whereby N sectors of data will have been written into buffer 66. Once the N sectors have been read and cached to buffer memory 66 and HDA 30, the determination at step 354 ends the CD read caching method.

Since the next host request for data will, in a significant number of cases, be directed to data at the same or subsequent data locations of the optical disk in player mechanism 40, the read ahead cache illustrated provides cached data which has been optimized for use in subsequent host commands. Thus, referring back to step 342 in FIG. 19, if a subsequent host CD read command occurs, the requested data may be determined to be in HDA 30. At this point, multiple-drive controller 20-1 proceeds to step 356 and controls HDA 30 to seek to the sector or sectors containing the requested data and read the requested data. This thus obviates the need for the slower accessing of player mechanism 40 to search for the requested data. At step 358, the data read from HDA 30 are read into buffer 66. At step 360 the data in buffer memory 66 are transferred to host 10.

At step 362, which may be executed concurrently with step 360, multiple-drive controller 20-1 determines whether the data read from HDA 30 constitutes the entire set of data requested by the host. If the determination at step 362 is yes, then, after the transfer to the host is completed, the host read command is deemed completed. If, on the other hand, the determination at step 362 is that all the data have not been found in HDA 30, multiple-drive controller 20-1 proceeds to step 364 and there effects a jump to step 344. As described above, at step 344, multiple-drive controller 20-1 controls player mechanism 40 to seek and read the requested data, and then proceeds through the subsequent steps described above.

The majority of the steps outlined in FIG. 19 can be conducted without involving host 10; this has the advantage of allowing host 10 to execute other tasks while the requested data are being located and/or cached to the disk drive.

Additionally, in response to a single host command to copy specified data from player mechanism 40 to HDA 30, multiple-drive controller 20-1 may execute steps corresponding to steps 344, 346, and 350 without involving host 10. This simple COPY command thus may make a desired amount of data available for host 10 from HDA 30, with the attendant high speed access capability,. for running an application where it is known that the data will be required. This single COPY command may thus provide significant speed advantages over direct reads to player mechanism 40.

A similar COPY command may also be employed to copy data from HDA 30 to an optical disk in player mechanism 40 via the direct connection. This COPY command may allow archiving of data to the optical disk without tying up host 10.

Referring to FIG. 20, a caching method for a CD write command from the host is illustrated in a flow diagram form in accordance with a preferred embodiment of this invention. At step 380, a host CD write command is received over I/O I/F 21. In response, multiple-drive controller 20-1 proceeds to step 382 to transfer the host data to buffer memory 66. As soon as the data are completely written into buffer memory 66, multiple-drive controller 20-1 controls HDA 30 to seek to the desired location and then to write the data. This transfer of host data to buffer memory 66 and writing to HDA 30 are continued until it is determined at step 384 that all of the data have been transferred to HDA 30.

Once the data to be written have all been transferred to HDA 30, then at step 386, multiple-drive controller 20-1 proceeds to control the writing of the data to the optical disk in player mechanism 40. In doing so, it uses HDA as the source of the write data. More specifically, at step 386, multiple-drive controller 20-1 provides control signals to player mechanism 40 via the RM I/F 23 (FIG. 1) to cause sled motor 45 to move to the desired write location on the optical disk and a write command is issued across the RM I/F 23. In accordance with conventional writable CD technologies, the write data are provided in a continuous stream during the write process. The high speed nature of HDA 30 and buffer memory 66 provides such a continuous source of data during the CD write step 386.

At step 388, if it is determined that the data to be written to player mechanism 40 have all been written, then multiple-drive controller 20-1 posts a write completion notification to host 10 at step 390. If, however, the data writing have not been completed at step 388, the writing to the optical disk using HDA 30 as a write cache, is continued at step 386 until it is written. During such writing however, host 10 is free to perform other tasks.

Currently available writable CD technologies require a continuous stream of data throughout the writing operation. If the stream of data is interrupted, generally the writing operation must be started all over again. The write cache method of this invention provides a significant advantage in this context. Without a relatively high-speed and high-capacity source of data such as HDA 30, a large RAM 14 (FIG. 2) would be required for the host to store enough to allow an uninterrupted stream of data to be written to an optical disk. Accordingly, this invention provides a method for avoiding such problems and at the same time freeing up host and the host I/O bus during the relatively slow write to CD process.

Although the foregoing caching system and method employs writing cached data to HDA 30, caching to buffer memory 66 alone, i.e., without writing to HDA 30, may also provide advantages over a conventional system.

FIGS. 29 through 34 present much of the information that is basis for implementing "seek operations" used to locate information stored in industry standard compact disks (CD). During said seek operations, multiple-drive controller 20-1 directs player mechanism 40 to position optical sensor 44 to gain access to selected read data (target read data) or, for writable CD, to locate the area on CD surface where data is to be written (target write sites).

The host 10 selects the "target" to be operated on by issuing commands to multiple-drive controller 20-1 that defines target in terms consistent with the kind of compact disk (CD) to be read or written and the nature of the operation to be performed in the data storage system. Although there are a variety of CD formats available that might be used in many kinds of software applications, as they affect the subject data storage system, most or all of these operations and applications will consist of reading or writing some combination of audio, compressed audio, compressed video or purely digital data and sending it to host 10. Most existing software applications read data from the CD and send it to the host 10 or equipment associated with the host 10 wherein it is processed and presented in final form to the computer user. One exception is digitized audio data which may be processed by analog to digital or digital analog converters included in multiple-drive controller 20-1 digital analog circuits 72 or 73 (FIG. 7) or 138 (FIG. 8) in order to "play" the CD. Logical extensions to the multiple-drive controller 20-1 could provide for decompressing and "playing" compressed audio and video as well.

Player mechanism 40 optical sensor 44 "positioning" operations are included in all multiple-drive controller 20-1 functions that use player mechanism 40 to read from or write data to industry standard CD. Most such positioning operations include both "seek" operations that move the optical sensor 44 to a location near the area of the CD to be used to read or write data and "follow" operations that maintain sensor 44 in close proximity to the media elements (pits and lands) to be operated on. CD data is then read time sequentially while multiple-drive controller 20-1 examines the content of the data to find recorded disk address information that uniquely identifies the target (a search operation). Since CD are recorded using a continuous spiral track format, the search continues until the data is located, end of data is reached or until it is determined that an error has occurred that requires error recovery procedures.

Figure 29:
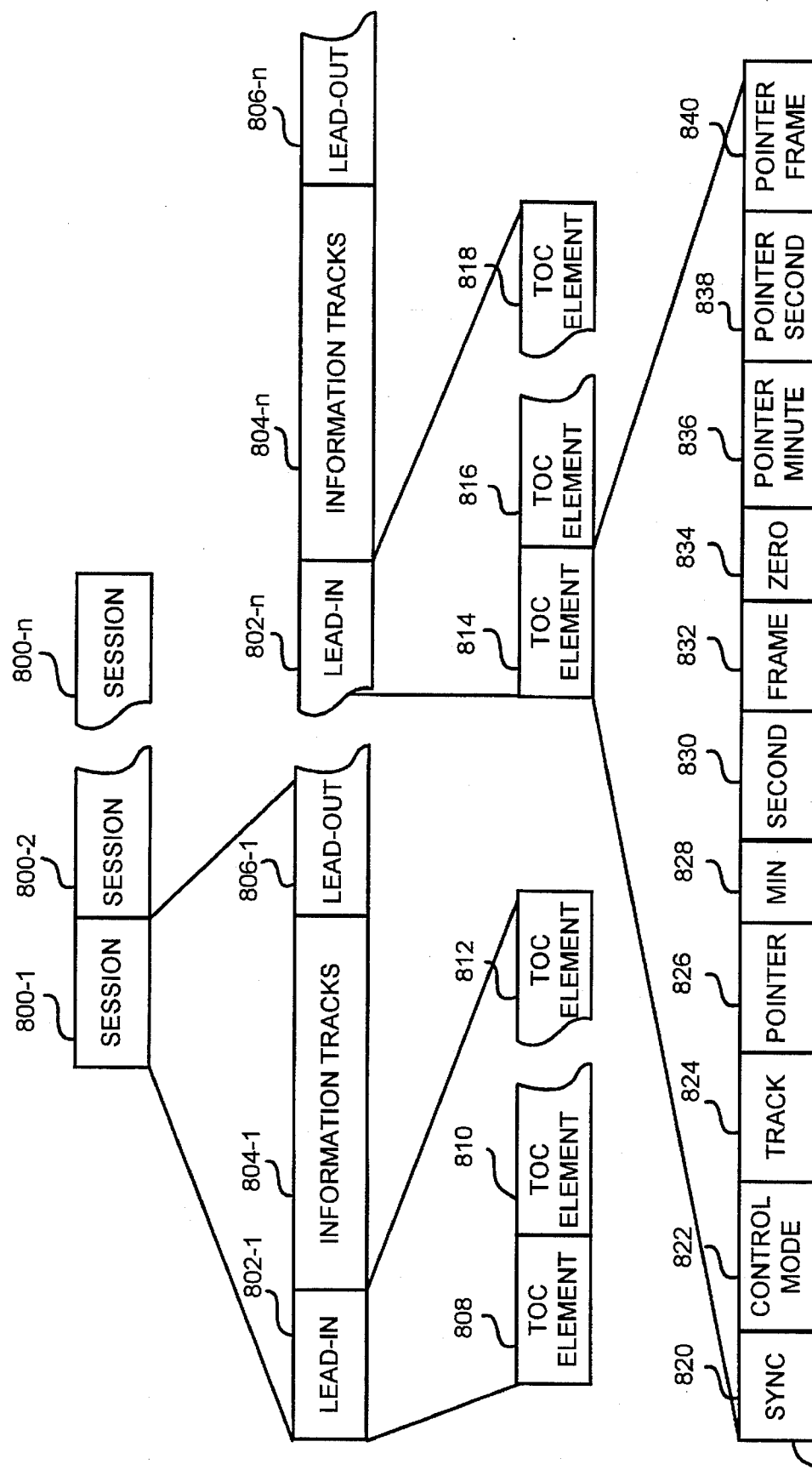
FIG. 29 is block diagram and table that defines the high level information format as used by compact optical disks that conform to certain optical disk standards as identified below.

FIG. 29 illustrates the high level format for "Yellow Book" industry standard CD. The disk physical format consists of from one to "n" spiralled tracks called sessions 800-1, 800-2 through 800-n. The first session 800-1 begins at disk "inner diameter" (ID) and last session 800-n ends at disk "outer diameter" (OD). For standard CD, the number of sessions, n, has maximum value of 99 (ninety-nine); typically, a CD will use from one to five sessions. Sessions comprise variable length divisions called tracks, not shown.

Figure 30:
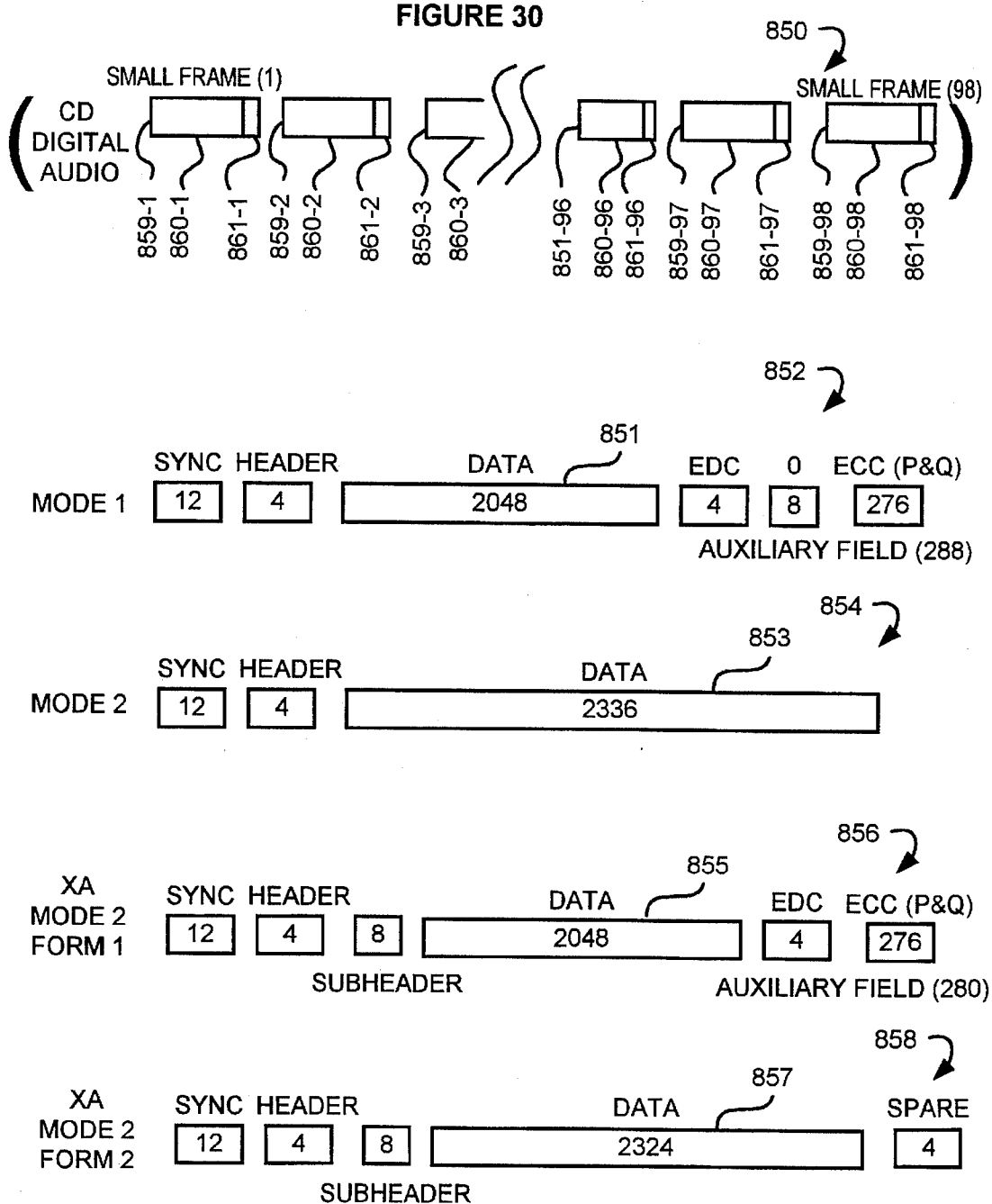
FIG. 30 is a drawing that describes four alternative recording formats for the "data track" portion of a CD ROM disk track as illustrated in FIG. 29.

Referring to FIG. 30, all recoverable parts of sessions 800-i consist of one or more information tracks which are, in turn, made up of smaller information packets called "large frames" (frames) or sectors 850. All sectors are further divided into 98 (ninety eight) smaller fields called "small frames" or "F1 frames" 859-i. Each of the 98 small frames 859-i include a 24 byte information field 860-i where index i is one of the integers 1 (one) through 98 (ninety eight). User data are stored in the 98 F1 frame information fields 860-i creating a user information storage capacity of 2352 bytes per sector 850.

Prior to being recorded on a CD, each F1 frame 860-i is fed through a Reed-Solomon encoder that generates error correction codes and converts the F1 frame 860-i to a 32 bytes F2 frame which is combined with a control byte 861-i to create a 33 byte F3 frame. Ninety eight F3 frames are combined to create a "section"; the section is encoded using an 8-to-14 encoder and recorded on the CD in "channel bit" serial form. Each channel bit corresponds to one pit site on the CD surface. The control bytes 861-i contain control information which is stored as subchannel data. The Q-subchannel contains CD address data. Section format and content conforms to International Standard ISO/IEC 10149 (Yellow Book).

FIG. 30 also shows four kinds of "large frames" or sector formats; those that conform to Yellow book mode-1 852; those that conform to Yellow book mode-2 854, those that conform to XA Form-1 856 and those that conform to XA Form-2 858. All four large frames (sectors) 852, 854, 856, 858 are composed of 98 24-byte small frame information fields 860-i, a total of 2,352 bytes. The mode-1 and form-1 formats 852, 858 provide a 2,048 byte data field 851, 855; the mode-2 format 854 provides a 2,336 byte data field 853; the form-2 format provides a 2,324 byte data field 857. The data field 851, 853, 855, 857 is the smallest quantity of data that may be addressed in the CD. Further, the contents of the data field 851, 853, 855, 857 is the read data that is sent to host 10 during execution of a read data command. The header field 864 in all four formats contains the "absolute playing time" in minutes, seconds and frames; absolute time is measured from beginning of user data.

Referring to FIG. 29, in time order, each session has three regions, a lead-in track 802-i, from 1 (one) to 99 (ninety nine) information tracks 804-i and lead-out track 806-i. Lead-in 802-i consists of one track and contains the session-i table of contents (TOC). The information tracks field 804-i of a session 800-i contains the target information to be read and transferred to the host. Each session contains at least one and may contain as many as 99 (ninety nine) information tracks. The lead out 806-i consists of one track, terminates the session and, usually does not contain information essential to the CD addressing process, however, lead out transit time must be accounted for in CD seek operations. All of lead in 802, information tracks 804 and lead out 806 consist of a plurality of sectors 850 (FIG. 30).

Lead in 802-1 for session 1 (one) contains TOC for session-1 800-1; lead in for session-i 800-i contains TOC for sessions-1 800-1 through session-i 800-i; lead-in for last or n-th session contains TOC for all sessions.

As shown in FIG. 29, TOC in each session is repeated three times as illustrated by session-1 TOC elements 808, 810, 812 and last session TOC elements 814, 816 and 818. TOC is acquired from lead-in Q-subchannel; data field 851, 853, 855, 857 (FIG. 30) in lead in sectors contains zeroes. Each TOC element 808, 810, 812, 814, 816, 818 contains a set of TOC packets. The number of packets in a given TOC varies with session number, number of information tracks 804-i used in session and kind of information stored in session 800-i. A complete packet 819, as acquired from Q-subchannel, consists of 2 sync bits 820, a control byte 822, 8 information bytes 824, 826, 828, 830, 832, 834, 836, 838, 840 and a 16-bit check sum, not shown. Control/ address byte 822 contains two codes, a 4-bit control code that indicates whether user data is digital or audio and a 4-bit Q-mode code that indicates nature of Q-subchannel data that follows; q-mode is one for lead in area. Track number field 824 is zero in TOC packets. Zero field 834 contains zeroes. The min 828, second 830 and frame 832 fields indicate elapsed playing time since start of lead in track 802-i. A frame corresponds to a playing time of 1/75-th of a second.

Continuing to refer to FIG. 29, pointer field 826 combines with pointer minutes 836, second 838 and frame 840 to provide several kinds of information about information tracks 804 in preceding sessions or information tracks 804 that follow in the same session. When pointer 826 contains a BCD (binary coded decimal) integer 01 through 99, pointer minutes 836, second 838 and frame 840 fields indicate playing time position of first section that has an index that has the same value as pointer 826. A section carrying an index set to '01' contains data for information track '01'. When pointer 826 contains hexadecimal value 'A0' or 'A1', pointer minutes 836 field indicates first track number in information tracks area 804 and pointer seconds 838 and frame 840 fields are filled with zero. When pointer 826 is set to hexadecimal 'A2', pointer minutes 836, second 838 and frame 840 specify playing time location of first section in lead out track 806.

Figure 31:
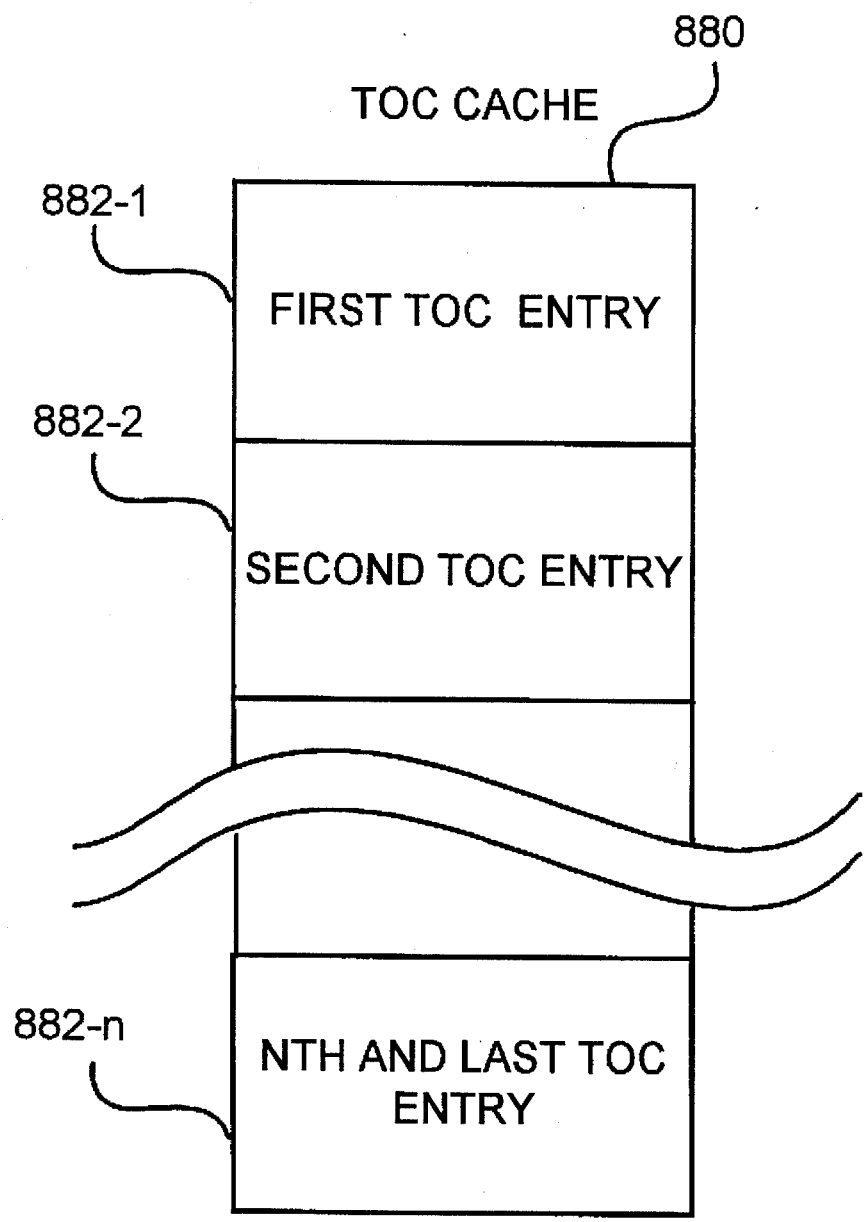
FIG. 31 is block diagram that illustrates one possible table of contents (TOC) cache organization.

Referring to FIG. 31, as session-1 lead in 802-1 (FIG. 29), is read, one set of TOC data 808, 810 or 812 is stored in TOC cache 880 allocation 882-1. As TOC are read for session-i 800-i, TOC for session-i are stored in TOC cache allocation 882-i. TOC cache 880 is part of buffer memory 66 CD Read Storage Area 150 (FIG. 9).

Contents of stored TOC provides position information for tracks in terms of playing time "minutes-seconds-frames" (MSF). Although MSF form of addressing is a reasonable technique to be used with audio data, it is not well suited for addressing computer digital data that is stored in disk drives. Usually, disk drive data is organized into groups of "sectors" each of which has assigned a unique identity in the form of a LBA. The disk controller "translates" LBA as supplied by host 10 into "physical disk address" which is suitable for use by disk drive servo electronics.

LBA starts at 0, and counts upwards for every data sector through end of CD. For a CD, the first LBA (LBA=0) refers to the first sector of the first information track. This track begins after CD session-1 lead in 802-1; session-1 TOC 882-1 always provide absolute location of first information track.

In order to locate data associated with an LBA, multiple-drive controller 20-1 must first translate a LBA into an MSF address and then into a radial distance from CD ID to the physical track that contains target (target radius). A physical track is any single 360 degree turn of any multiple turn spiral track. Since lead-in does not contain LBA addressed data, translation of LBA to target radius must allow for all non-data tracks. To facilitate rapid translation, information about length of lead-in and lead-out are preferably computed and stored in TOC cache 880 along with TOC data for each session 800-i. Generation and caching of lead-in, lead-out length is preferably accomplished in advance of receipt of a host 10 command to seek and read or write a CD target.

When using LBA data sector addressing and MSF CD addressing, first LBA (LBA=0), should be assigned to actual starting address of track 1. If Ms:Ss:Fs is MSF address for beginning of first information track in session-1 as stored in TOC cache 882-1, then one equation that relates LBA to an MSF address M:S:F is as follows:

$$LBA=((((M-Ms)*60)+(S-Ss))*75)+F-Fs$$

Inverse equations can be used to convert a LBA into a MSF address for target physical track. MSF address must be further converted into target radius. Various methods can be used to convert MSF to target radius; preferably, calculation of target radius is accomplished using equations that are based upon constant angular velocity playing time and known CD track pitch. An alternate implementation uses extrapolation of tabular data that relates MSF to radius.

Figure 32:
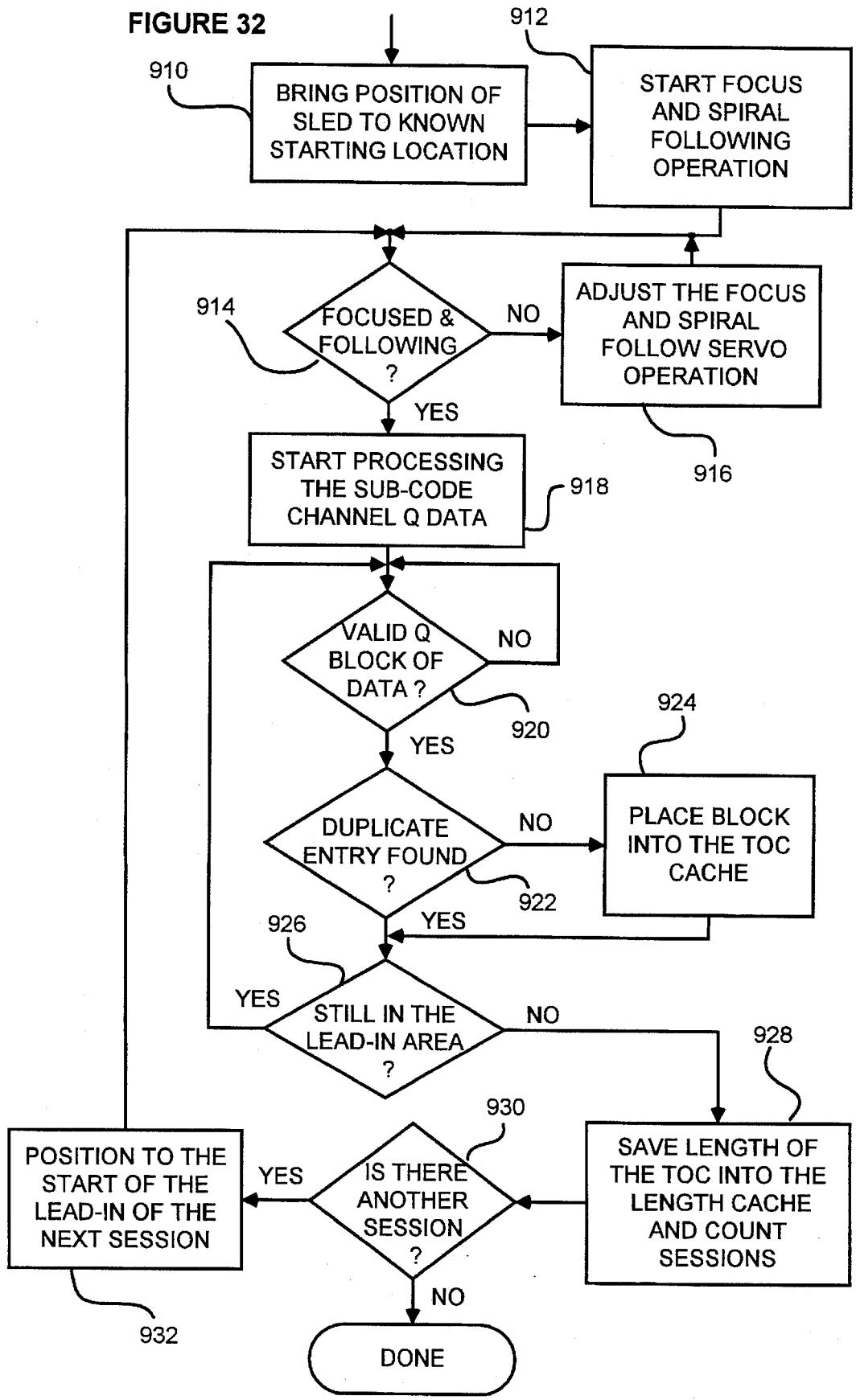
FIG. 32 is a flow diagram illustrating the operations required to read and cache the TOC stored in a typical CD ROM disk.

FIG. 32 presents a flow diagram that defines preferred method for multiple-drive controller 20-1 and player mechanism 40 reading and storing of CD TOC in TOC cache 880. Block 90 moves sled 630 into a position near target physical track as specified in Red Book or IEC 908; for session-1, sled 630 is positioned at CD ID. Block 912 initiates player mechanism 40 focus and track following operations. Block 914 tests for proper focus and track following and, if not focussed and following, initiates block 916 functions which adjust focus and following and returns control to block 914. Once properly focussed and following, valid Q-subchannel data is decoded by DSP 70 (FIG. 7) and supplied along line 76 to HIDC 60. Upon realizing good focus and following, block 914 initiates block 918 wherein HIDC 60 and microprocessor 92 begin processing Q-subchannel data. Block 920 functions scan or search over Q-subchannel data until beginning of session lead-in 802 and further until beginning of one of session TOC elements such as 808 is identified whereupon control is passed to block 922. Block 922 functions determine whether a copy of session TOC, such as 808, for session being processed is already stored in TOC cache 880 (FIG. 31). If TOC 808 or 810 is not in TOC cache 880, control is passed to block 924 and TOC such as 808 is read from Q-subchannel into TOC cache 880 whereupon control is passed to block 926. Block 926 determines if player mechanism 40 is still reading lead-in 802. If block 926 determines that Q-subchannel is still presenting lead-in data, control is passed to block 920 and sequence beginning with block 920 is repeated until block 926 determines that player mechanism 40 is no longer reading lead-in 802 data as indicated by content of Q-subchannel data stream. Upon determining that end of lead-in 802 has been located, block 926 passes control to block 928 which computes and saves length of lead-in 802 in TOC cache 880 and passes control to block 930. Block 930 examines contents of TOC cache to determine if another session 800 follows session last processed and, if so, passes control to block 932. Block 932 positions sled 630 near beginning of lead-in 802-i for next session and passes control to block 914 and method defined in FIG. 32 is continued until all TOC such as 808 have been stored in TOC cache 880.

The flow diagram in FIG. 32 describes one of many possible operation sequences that might be used to read and store TOC such as 802 in TOC cache 880. In addition, TOC cache process may be interrupted while other higher priority data storage systems operations are performed and resumed when higher priority activity is complete.

Figure 33:
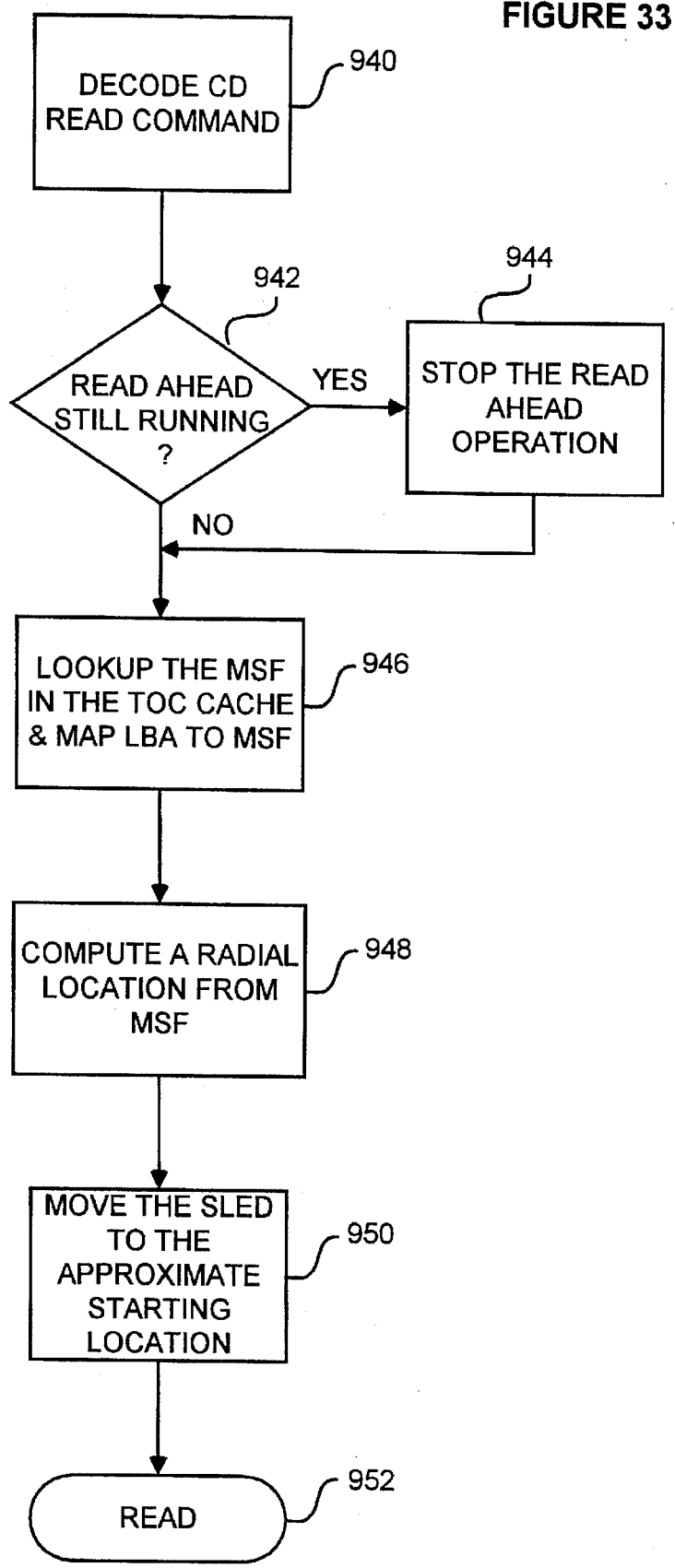
FIG. 33 is a high level flow diagram that illustrates the sequence of operations required to convert a "logical block address" (LBA), as provided by the host, into a physical CD ROM physical radius, to position the player mechanism optical sensor into close proximity with the requested stored data and to begin sequential read search for said requested data.

The flow diagram in FIG. 33 describes process used to initiate execution of a host 10 CD read data command that uses LBA. Upon receiving CD read command from host 10, multiple-drive controller 20-1 decodes command as indicated by block 940 and passes control to block 942. Block 942 functions to determine if "read ahead" is ongoing as a consequence of executing an earlier command and, if yes, control is passed to block 944 wherein read ahead operations are terminated and control is passed to block 946. Block 946 uses data in TOC cache 880 to compute MSF address for target data, passes control to block 948 wherein MSF address is further converted to a target radius and control is passed to block 950; block 948 calculations adjust MSF value to provide for need to skip over lead-in 802. Block 950 moves sled 630 to radial position near target radius, coarse positioning and subsequently passes control to block 952 which ends the CD read command process.

Figure 34:
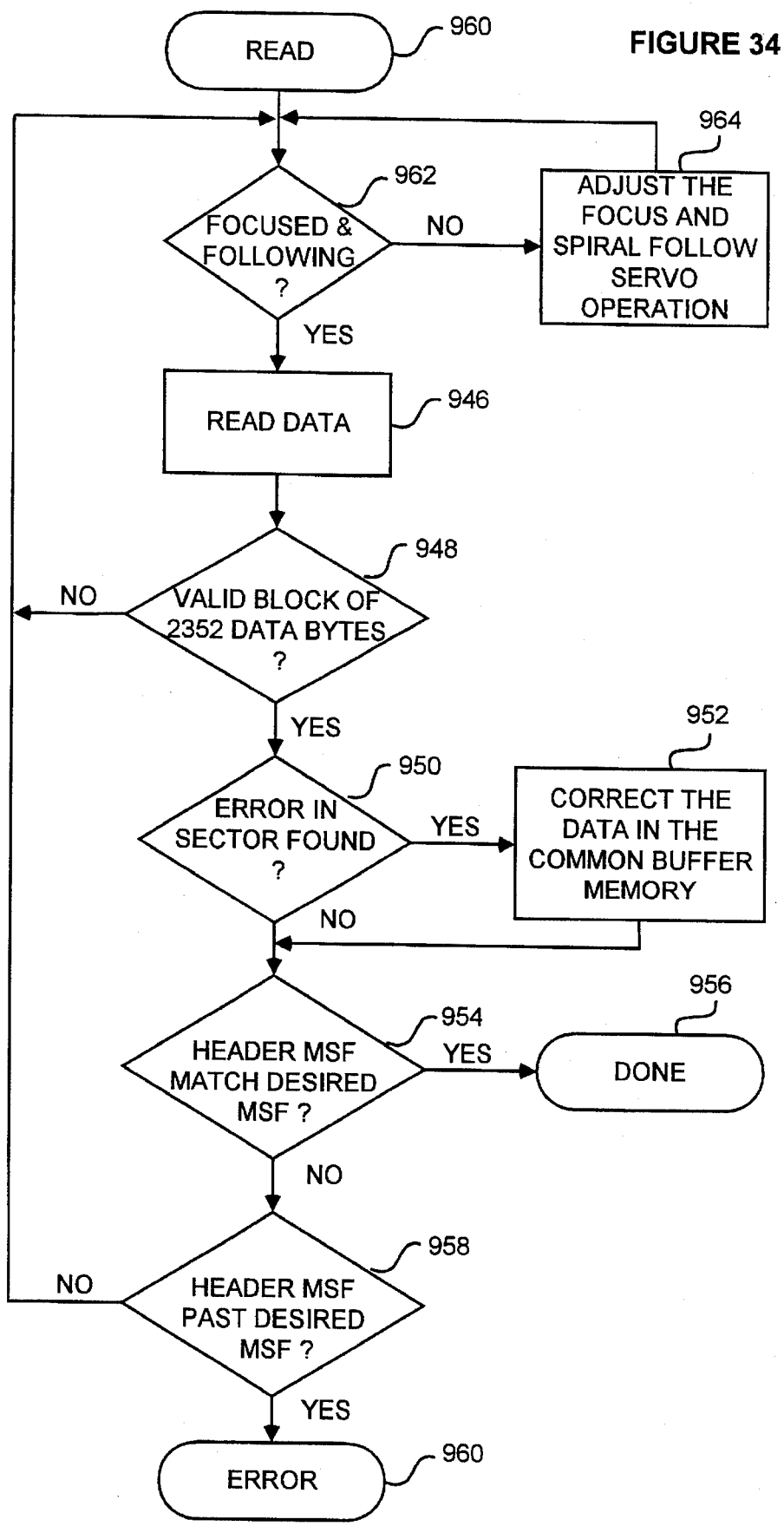
FIG. 34 is a high level flow diagram that illustrates the sequence of decisions required to determine that the sequential search for requested data, as initiated by the operations illustrated in FIG. 33, has located the requested data.

FIG. 34 presents flow diagram that defines one method for executing CD read command as initiated by operations outlined in FIG. 33. Block 960 is continuation from block 952 (FIG. 33) that passes control to block 962. Since operations as outlined by FIG. 33 ended with a sled 630 positioning operation, it will usually be necessary to achieve player mechanism 40 focus and track following condition before data can be read reliably. If focus or track following is not good, block 962 passes control to block 964 wherein focus and following servo are adjusted and control is passed back to block 962. When block 962 determines that focus and following are both good, control is passed to block 946 wherein reading of sectors is initiated. Block 946 passes control to block 948 wherein it is determined whether an entire valid block of data has been read into buffer 66 and, if not, control is passed back to block 962 and 964 as needed to maintain focus and track following while data is read. The sequence of operations beginning with block 962 is repeated until block 948 determines that an entire block of 2352 data bytes have been stored in buffer 66, then block 948 passes control to block 950. Block 950 evaluates error codes to determine if sector in buffer memory 66 contains error and, if yes, control is passed to block 952 wherein error is corrected and control is passed to block 954. Block 954 compares that portion of data stored in buffer memory 66 that concerns header 864 (FIG. 30) against the target MSF values to determine whether the target data is stored in buffer memory 66. If yes, control passes to block 956 wherein first sector read is done. If block 954 determines that header 864 does not match target MSF value, control passes to block 958 and header 864 is further evaluated to determine if read operation has passed over target sector and, if yes, control passes to block wherein error recovery is initiated. If block 958 determines that target sector is latent, then control is passed to block 962 and sector read process continues.

The operations outlined by FIG. 34 apply to reading a single sector, and are performed iteratively to read multiple sectors. The operations for a sector-read are completed by reaching block 956. If a host command requires that more than one sector be read, LBA and MSF target addresses are incremented, and reading operations for every subsequent sector are iteratively performed. When all sectors requested by host 10 have been read to buffer, reading and buffering of additional sectors may be allowed to continues as a "read ahead caching operation." During read ahead caching, sector data accumulates in buffer memory 66 until buffer allocation is exhausted. Should another host read command be received while read ahead caching is operative, command initiation function block 942 (FIG. 33) will pass control to block 944 which will terminate read ahead caching before moving sled 630 to new location.

The TOC caching operations outlined above and, the operations outlined in FIGS. 32, 33 and 34 are fundamental to considerably more elaborate procedures used in firmware executed in microprocessor 92 during command execution. Execution of these operations completely within a storage subsystem is thought to be a significant extension to the art.

Figure 21:
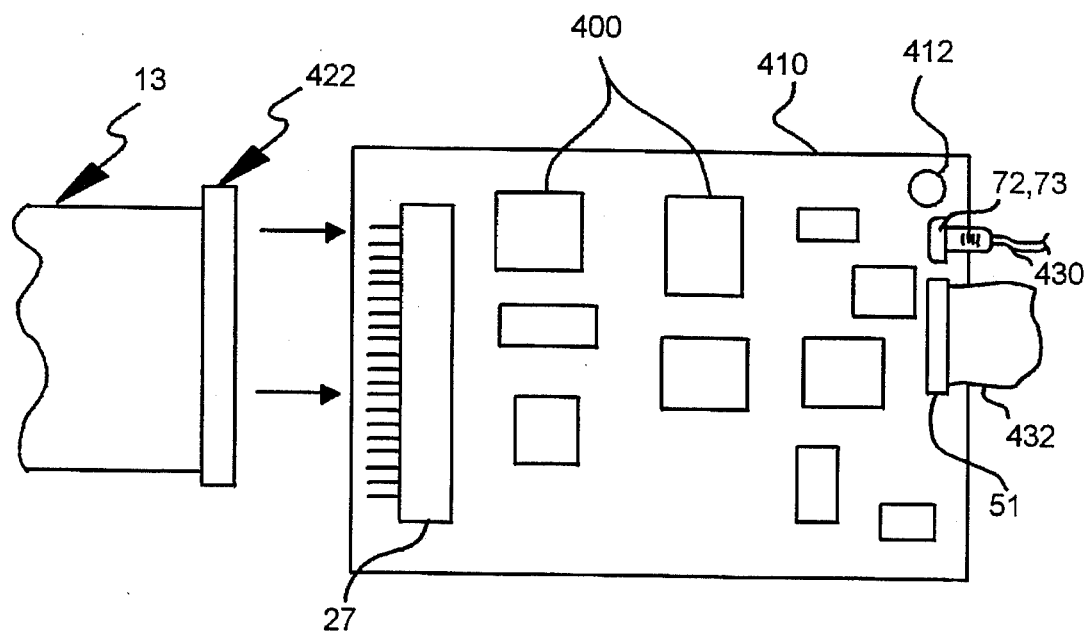
FIG. 21 is a bottom view of a printed circuit board assembly, incorporating the multiple-drive controller of FIG. 7 and mounted to the head disk assembly of the fixed-media disk drive, in accordance with a preferred embodiment of this invention.
Figure 22:
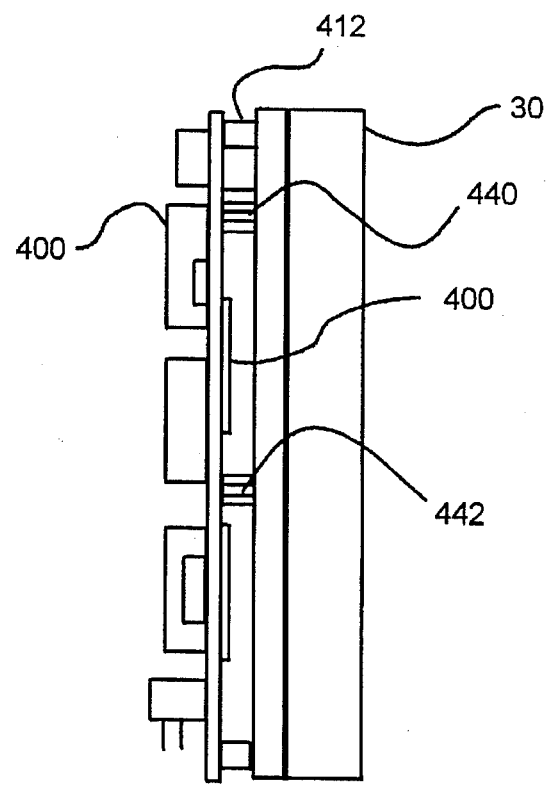
FIG. 22 is an end view of the printed circuit board assembly of FIG. 21.

Referring to FIGS. 21 and 22, a preferred embodiment of this invention is illustrated in a configuration involving a single printed circuit board assembly ("PCBA") 410 having the circuitry of multiple-drive controller 20-1 contained therein and integrally connected to HDA 30 to form a compact assembly.

More specifically, the circuitry of multiple-drive controller 20-1 is preferably contained in a number of IC's 400 which are schematically illustrated in FIGS. 21 and 22. As best shown in the end view of FIG. 22, PCBA 410 may preferably be a double sided circuit board assembly allowing for a more compact configuration of the integrated assembly. As also shown in FIG. 22, PCBA 410 is preferably affixed to HDA 30, which is described in more detail below in relation to FIGS. 23 and 24. For example, PCBA 410 may be affixed to HDA 30 through screws 412 which are received in matching threaded openings in HDA 30. Alternatively, PCBA 410 may be affixed to HDA 30 through adhesive bonding, press snap fitting, or other well known techniques.

As further shown in FIGS. 21 and 22, PCBA 410 includes three sets of electrical connections. More specifically, PCBA 410 includes means to connect multiple-drive controller 20-1 to I/O interface 11. The preferred means are compatible with the ATA interface standard referenced above. Such connection means includes host-interface connector 27 which may be a standard 40-pin ATA compatible connector. As generally shown in FIG. 21, host-interface connector 127 interfaces with a matching host connector cable 422 which couples to I/O interface 11. The host 10 end of the connector cable 422 is not shown. Alternatively, host-interface connector 27 may attach directly to a matching connector within host 10 without a cable.

PCBA 410 includes a player mechanism connector 51 which is preferably configured on the bottom of PCBA 410 as shown in FIG. 21, i.e., on the side opposite to that mounted to HDA 30, or on one of the ends or sides of PCBA 410. Connector 51 may be a multi-pin connector adapted to connect to a matching connector and attachment cable illustrated generally at 432 in FIG. 21. Alternatively, a flex cable may be permanently affixed to the PCBA 410 having a free end for coupling to the CD drive mechanism through any one of a number of connector types.

As further illustrated in FIG. 22, PCBA 410 also includes a third connector, for example in the form of a flex cable 440 coupling PCBA to the interior of HDA 30, in the manner discussed in more detail below in relation to FIGS. 23 and 24. Additionally, a separate spindle motor flex connection may also be provided as illustrated as 442 in FIG. 22. Detachable connectors may also be employed in place of flex cables 440, 442. Suitable connectors are disclosed in copending application Ser. No. 08/119,023, filed Sep. 9, 1993, the disclosure of which is incorporated herein by reference. Preferably, the flex cables 440 and 442 or connectors are connected and assembled when PCBA 410 is affixed to HDA 30 during manufacture of the disk drive. Optionally, PCBA 410 may be separately provided or assembled by OEMs or users in which case flex cable 440 and spindle connection 442 may be terminated with a suitable connector for attaching to a commercially available HDA.

Alternatively, PCBA 410 may be permanently attached or preassembled with the CD drive mechanism with a connector provided on PCBA 410 for subsequent attachment to HDA 30 by an OEM or end user. In yet another alternate embodiment, PCBA 410 illustrated in FIG. 21 may be dispensed with and the various IC's 400 mounted on a host computer system motherboard. In either case, HDA 30 may be provided with a suitable connector and, optionally guide rails to allow a removable HDA capability.

In such an embodiment, HDA 30 and CD drive mechanism 40-1 would attach to the motherboard via cables or other suitable connections.

As further illustrated in FIG. 21, an audio connector 72, 73 is preferably provided on PCBA 410 for connection to a conventional audio plug and cord 430.

Figure 23:
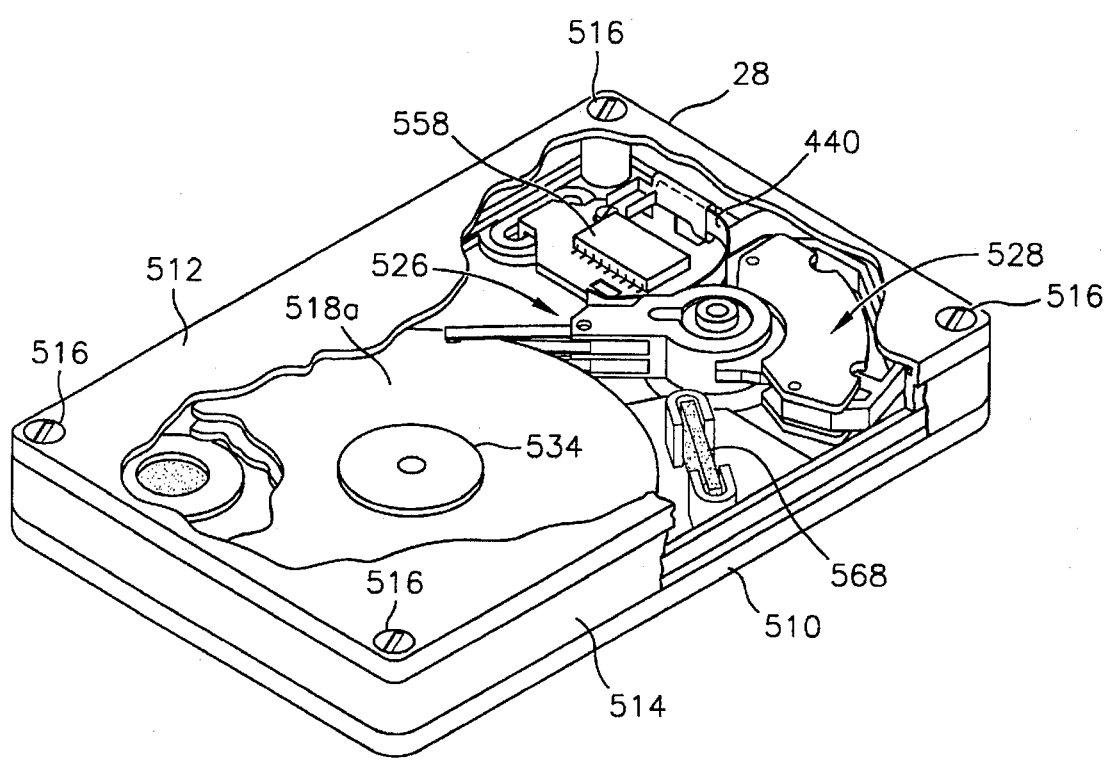
FIG. 23 is a cutaway view of a head disk assembly suitable for incorporation into the multiple-drive system of FIG. 1.
Figure 24:
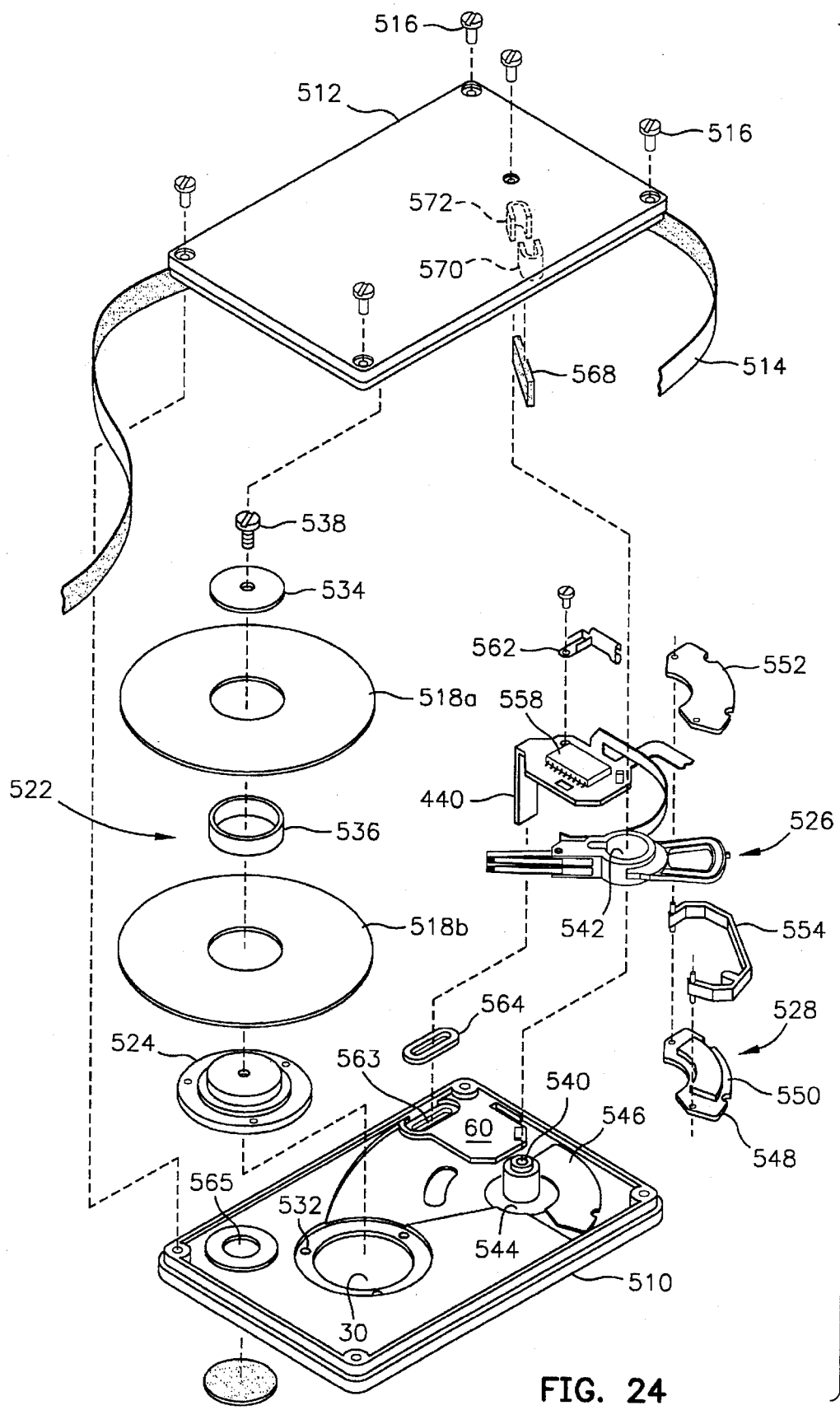
FIG. 24 is an exploded view of the head disk assembly of FIG. 23.

HDA 30 is illustrated in FIGS. 23 and 24. HDA 30 includes the major mechanical and electro-mechanical components of the fixed-media disk drive, mounted within a housing formed by base 510 and cover 512. Base 510 and cover 512 are preferably made of a rigid lightweight material having matching dimensions so as to form a nearly sealed enclosure. Cover 512 may conveniently be mounted to base 510 through screws 516 engaging matching threaded openings in base 510. The contact surface between base 510 and cover 512 may be made substantially airtight by tape seal 514. In the illustrated embodiment, two magnetic data-storage disks 518a and 518b are provided. HDA 30 of this invention may be embodied in a variety of form factors.

As illustrated in FIGS. 23 and 24, the principal HDA mechanical and electro-mechanical subassemblies are mounted to the base 510 in a compact layout. The principal subassemblies of HDA 30 are: disk stack assembly 522; spindle motor 524; actuator assembly 526; and voice coil magnet assembly 528. Base 510 may be provided with circular spindle motor mounting opening 530 which allows the spindle motor 524 to extend below the bottom surface of base 510 and be mounted securely to the base 510 through mounting holes 532 and matching bolts (not shown). Disk stack assembly 522 is in turn mounted to spindle motor 524 through disk clamp 534 and spacer 536 through a single mounting screw 538.

Actuator assembly 526 is mounted on base 510 through mounting post 540 and matching cylindrical opening 542 in the actuator. Mounting post 540 has an inner post, which is riveted or otherwise rigidly mounted to base 510, and an outer sleeve rotatably coupled to the inner post through a ball bearing and race assembly. Actuator assembly 526 is preferably mounted in a machined, slightly recessed, portion 544 of the base 510 which facilitates mechanical alignment of the actuator assembly on the base during assembly.

Voice coil magnet assembly 528 is mounted into a machined recess 546 which is designed to provide accurate registration of this component during assembly. Voice coil magnet assembly 528 may preferably be riveted, screwed or bonded firmly into place in recess 546 through bottom magnet plate 548 which has a permanent magnet 550 adhesively bonded to. Voice coil magnet assembly 528 also includes an upper magnet plate 552 and a crash/spacer member 554 which may preferably be firmly held in place against lower magnet plate 548 by the magnetic force applied to upper magnet plate 552.

Disk clamp 534 rigidly clamps disks 518a, 518b to a rotatable hub and spindle motor 524 which is connected to PCBA 410 via connector 442 as discussed above. Spindle motor 524 preferably is a commercially available brushless three phase motor having the disk mounting hub coupled thereto through a spindle bearing assembly (not shown). Spindle motor 524 rotates disks 518a, 518b at a constant speed. The speed of the spindle motor is preferably monitored by sensing the back EMF from spindle motor 524 to derive the spindle angular position and speed. This information is then used to provide a drive current to spindle motor 524 to stabilize the angular velocity at the desired R.P.M.

As further illustrated in FIGS. 23 and 24, HDA 30 also preferably includes one end of flex circuit 440 described above for electrically connecting actuator assembly 326 to the control electronics. More specifically, flex circuit 440 connects the read/write transducer heads to PCBA 410 and connects the voice coil to PCBA 410 through thick film connective leads encased in a flexible plastic carrier. Additionally, the portion of flex circuit 440 within HDA 30 may include an IC 558, for example a pre-amp circuit for the read/write channel, to take advantage of the space within HDA 30. Flex circuit 440 exits base 510 through an opening 563 which is sealed through gasket 564.

As further illustrated in FIGS. 23 and 24, an air filtration system is provided by means of air access port 565 and breather filter 566 in base 510, and recirculating air filter 568 which is held in place by filter mounting brackets 570, 572 in cover 512. Also, tape seal 514 further ensures such a contaminant free environment within the housing by virtue of its sealing the entire junction between base 510 and cover 512 so as to minimize the possibility of entry of contaminants through this junction.

Figure 25:
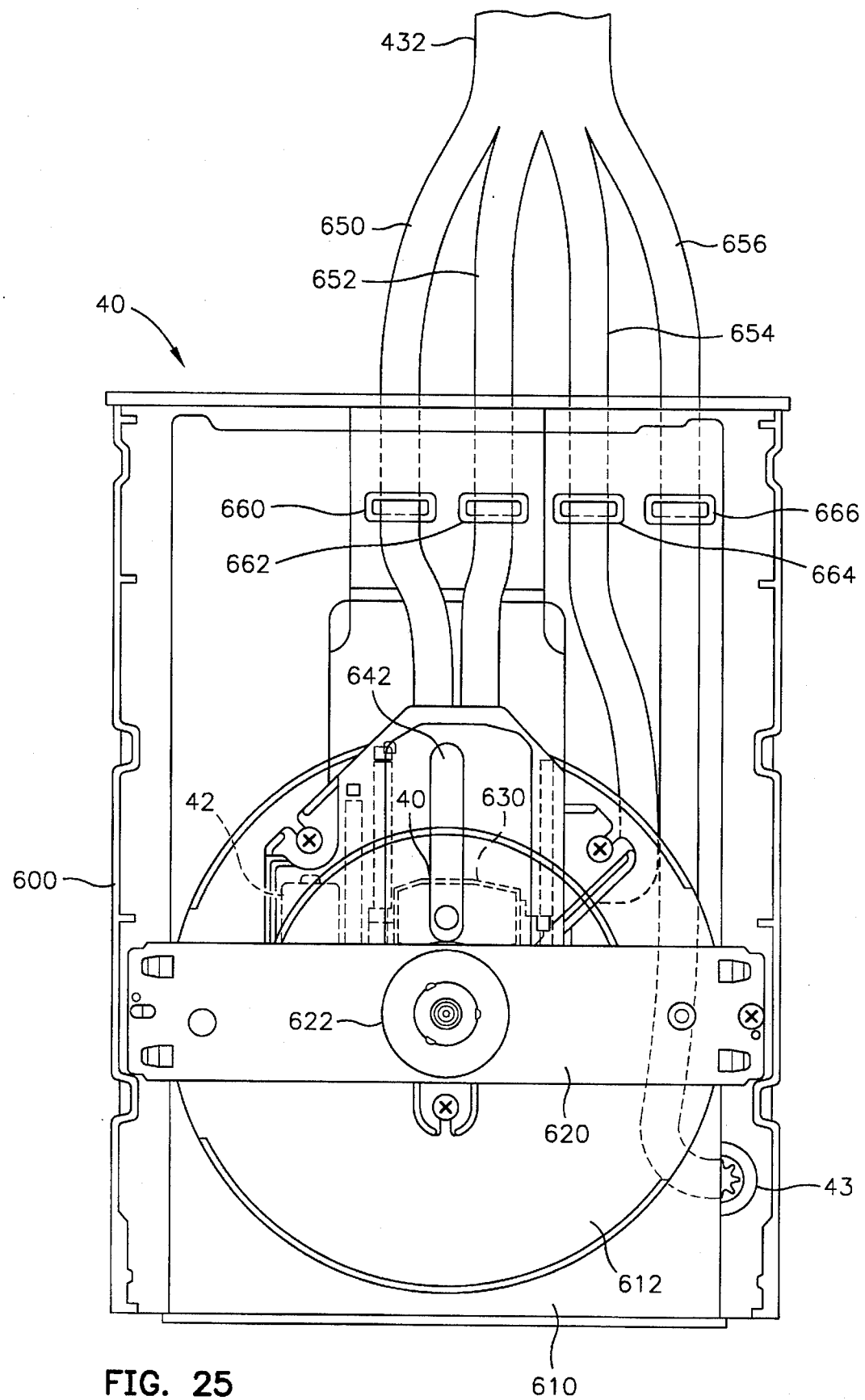
FIG. 25 is a top plan view of a CD drive mechanism, in accordance with a preferred embodiment of this invention.
Figure 26:
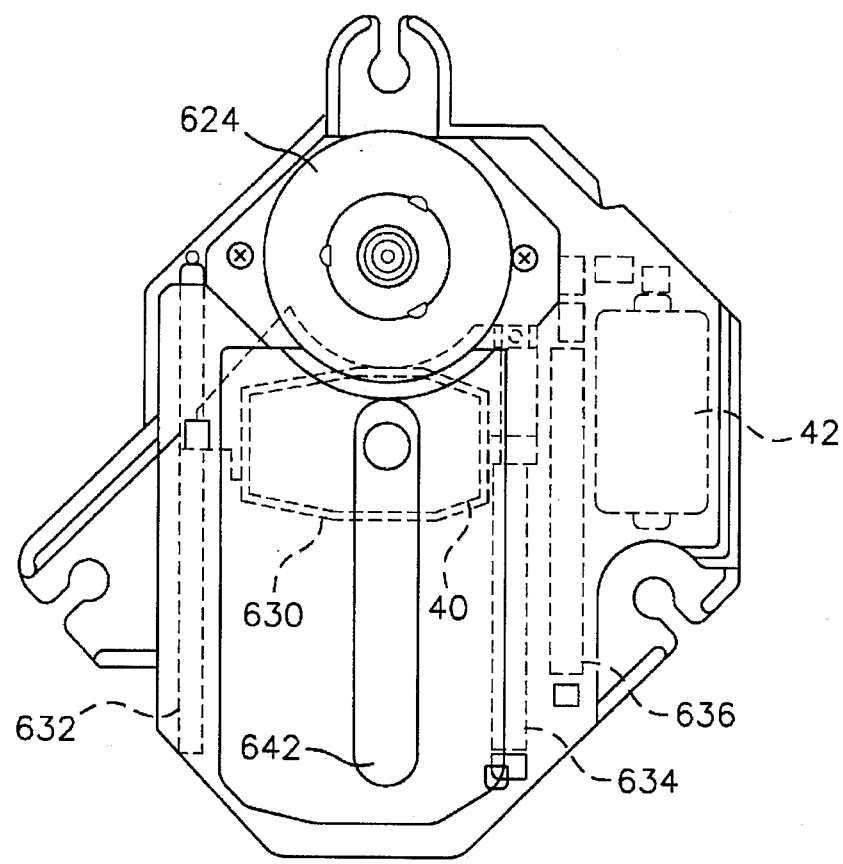
FIG. 26 is top view of the sled.
Figure 27:
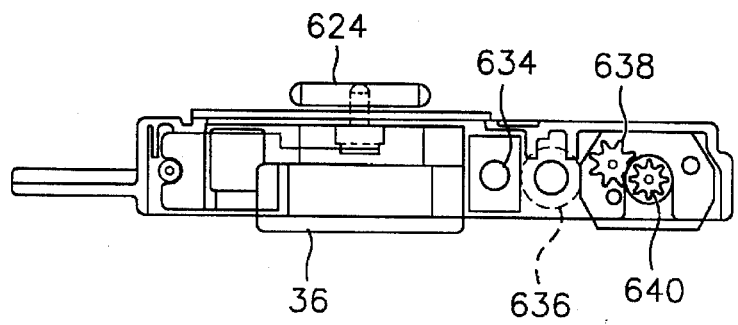
FIG. 27 is a cross-sectional view of the sled.

Referring to FIGS. 25, 26 and 27, player mechanism 40 is illustrated in accordance with a preferred embodiment of this invention. As shown, player mechanism 40 includes a housing 600 which may preferably be a rectangular shape configured in accordance with a standard form factor. For example, a form factor suitable for accommodating a 120 mm disk is currently conventional for some CD drive mechanisms while a smaller form factor is conventional for the 64 mm CD minidisk format. As further shown in FIG. 25, player mechanism 40 includes a tray 610 which receives optical disks on recessed region 612 thereof for insertion into player mechanism 40. Alternatively, in place of tray 610 other well known disk loading mechanisms may be employed. Tray 610 is driven by tray motor 43 which is responsive to tray motor control signals provided from multiple-drive controller 20-1 as described previously, and optionally in response to operator activation of an eject button (not shown) in the front of player mechanism 40. Irrespective of the specific form factor of housing 600, tray region 612 is preferably adapted to receive standardized size optical disks. For example, .currently standardized optical disks are 64 mm, 80 mm and 120 mm in diameter.

Player mechanism 40 also includes a cross support member 620 which includes a rotatable optical disk support 622 which engages the top portion of the optical disk when inserted into the mechanism. The bottom surface of the optical disk in turn is engaged by a matching rotatable bottom support member 624 illustrated in FIGS. 26 and 27. Bottom support member 624 in turn is coupled to spindle or disk motor 42 which rotates the optical disk in accordance with CLV motor control signals provided from multiple-drive controller 20-1 as discussed previously.

As further illustrated in FIGS. 25 and 26, player mechanism 40 includes a linearly movable sled 630 which includes pickup 44 therein. Sled 630 is mounted on first and second guide rails 632, 634 and driven by linear screw feed drive mechanism 636. Drive mechanism 636 in turn is coupled to sled motor 45 through gears 638–640 as best illustrated in FIG. 27. During linear actuation of sled 630, pickup 44 traverses elongated slot 642 so as to be positioned below different radial locations on the optical disk in response to position control signals provided to sled motor 45.

Although a linear sled drive system is illustrated in FIGS. 25, 26, and 27, alternate forms of sled servo mechanisms are equally suitable. For example, rotatable actuator mechanisms are also available to move pickup 44 to different radial locations on the optical disk surface.

Pickup 44 mounted within sled 630, includes in one conventional approach the read/write laser, optics for focusing the laser on the track(s) of the optical disk, including a tracking system in accordance with conventional designs (e.g. three beam, push pull and differential phase detection), a quadrature optical sensor also conventional in the art, a focus motor, and a tracking motor. Such components may be supplied in a single commercially available pickup; for example, the SFC 93 pickup manufactured by Sanyo Corporation may suitably be employed.

As further shown in FIG. 25, the various control signals and data to and from player mechanism 40 are provided via flexible cable 432 which preferably attaches to PCBA 410 as discussed above in relation to FIGS. 21 and 22. As for the control signals to spindle motor 42, sled motor 45, tray motor 43, and data to and from pickup 44, these are provided via single flexible cable 432 which may preferably split into four separate flexible cables 650, 652, 654 and 656 coupled to sled motor 45, pickup 44, spindle motor 42 and tray motor 43, respectively. These separate flexible cables are shown in FIG. 25 entering the bottom housing 600 through respective openings 660, 662, 664, and 666. The flexible cables inside the housing may be bonded to the bottom of housing 600 or may be otherwise affixed so as to exit the bottom of housing 600.

Alternatively, these separate cables illustrated may attach separately to PCBA 410 illustrated in FIG. 21 with separate connectors provided for each flexible cable. Alternatively, the cables may terminate at housing 600 and PCBA 410 may have connectors adapted for each of the attachments to player mechanism 40 so as to engage such connections by attaching of PCBA 410 to the bottom of housing 600 of player mechanism 40, for example, by an OEM or system user. Alternatively, PCBA 410 may be assembled to the bottom of the housing 600 and the cables 650–656 bonded or otherwise affixed to PCBA 410 during assembly of player mechanism 40.

Accordingly, this invention supports a multiple-drive data-storage system which includes a fixed-media disk drive and a removable-media, optical-disk disk drive mechanism. The multiple-drive controller for the system may be very compact may be defined on a single circuit board assembly forming part of the fixed-media disk drive. The specific configuration illustrated for HDA 30, player mechanism 40 and PCBA 410 is only exemplary, however, and a variety of modifications are possible.

Figure 28:
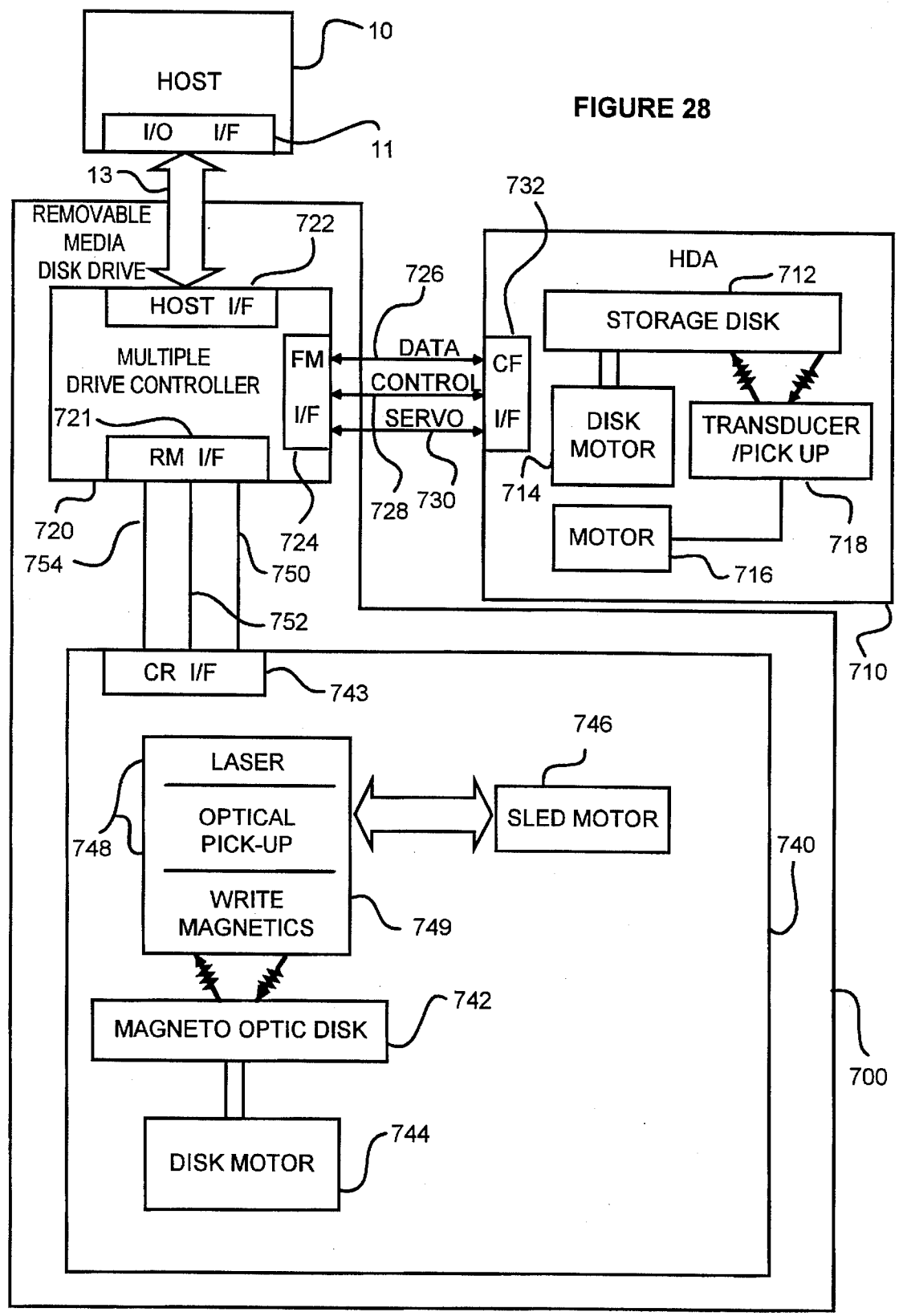
FIG. 28 is a block schematic drawing of an alternate embodiment of this invention in which a multiple-drive controller is included with a magneto-optic disk drive and has an interface to a head disk assembly.

FIG. 28 shows an alternate embodiment of this invention. This alternate embodiment is a data storage system that comprises a removable-media disk drive 700 and an external fixed-media disk drive HDA 710. As in the case of the data-storage system described above in relation to the embodiment of FIG. 1, this alternative multiple-drive, data-storage system is coupled to host 10 which may include components described previously and for which like numerals are employed.

Removable-media disk drive 700 comprises a player mechanism 740 and an integrated multiple-drive controller 720 that includes means for supporting an disk drive HDA 710. Preferably, the removable-media disk drive 700 is a magneto-optic drive, and the external peripheral is a fixed media disk drive HDA 710 that uses magnetic storage media. The multiple-drive controller 720 is an integrated part of the removable-media disk drive 700.

HDA 710 may include optical or magnetic data-storage technologies. Thus, HDA 710 includes at least one data-storage disk 712, which may be an optically readable disk in the case of optical data-storage technologies, such as CD or magneto-optic technologies, or a magnetic data-storage disk in the case of a rotating magnetic hard disk drive.

As shown in FIG. 28, HDA 710 includes a disk motor 714 which rotates storage disk 712 under control of controller 720. As further shown in FIG. 28, HDA 710 also includes a transducer-positioning motor 716 which controls the position of transducer/pickup 718 under the control of controller 720. If HDA 710 uses magnetic data-storage technology, the transducer 718 is a magnetic read/write head which is moved to radial locations on the magnetic data-storage disk 712 by an actuator motor, such as a voice coil motor described above in relation to HDA 30. If mechanism 710 uses optical data-storage technology, transducer/pickup 718 may be an optical pickup mechanism as described previously, which is moved under control of a sled motor 716 to allow data to be read from an optical data-storage disk 712. Also, HDA 710 could be a magneto-optic mechanism in which case transducer/pickup 718 may include both magnetic and optical components.

Still referring to FIG. 28, multiple-drive controller 720 (within removable-media disk drive 700) may substantially correspond to multiple-drive controller 20-1 described above with reference to FIG. 7. Controller 720 includes a host interface 722 which includes a host interface-connector as well as the appropriate circuitry for receiving commands and transmitting data to and from host 10. Controller 720 also includes interface FM I/F 724 which communicates data and control signals with HDA 710 via lines 726, 728 and 730 and HDA interface CF I/F 732. In a preferred embodiment, interface 724 may simply be an electrical connection as in the case of the embodiment described above in relation to FIG. 1 without any registers or other interface circuitry. In an implementation where HDA 710 is an optical-disk disk drive, the control signals provided via paths 728 and 730 may be as described in detail above in relation to the embodiment of FIG. 5. Where HDA 710 is a magnetic hard disk drive, however, the control signals may be as described above as provided to HDA 30.

FIG. 28 also shows that removable-media disk drive 700 includes an optical mechanism 740. In a preferred embodiment, the optical mechanism may be a magneto-optic data-storage mechanism into which a magneto-optic disk 742 can be loaded. Disk 742 includes a media thereon adapted to store data through magneto-optic polarization effects. Disk 742 is rotated by a disk motor 744 under the control of controller 720 which provides motor control signals including a motor speed control signal via path 750. Magneto-optic data-storage mechanism 740 also includes a positioning motor 746 which positions optics and laser system 748 and magnetic write head 749 at different radial locations over magneto-optic disk 742 under the control of position control signals provided by controller 720 via paths 750. The functions of motor 746, optics and laser system 748 and magnetic write head 749 may be conventional in the magneto-optic drive art.

As further shown in FIG. 28, controller 720 communicates with player mechanism 740 via interface RM I/F 721, signal paths 750, 752, 754 and player mechanism interface CR I/F 743. Controller 720 provides control signals Go the optical mechanism 740 via path 752 and transmits and receives data via path 754. Preferably, controller 720 and optical mechanism 740 are an integrated assembly with controller 720 being defined on a printed circuit board assembly fastened to the housing of magneto-optic data-storage mechanism 740. The electrical connections indicated schematically by lines 750, 752 and 754 in FIG. 28 may thus be flexible circuit connections between the printed circuit board assembly and the magneto-optic data-storage mechanism electrical, mechanical and magneto-optic components. Alternatively, controller 720 may have a connector and mechanism 740 a matching connector to allow optical mechanism 740 to be attached to drive controller 720 by an OEM or end user of the data-storage system. Also, drive controller 720 may be integrated with the host motherboard or other host control circuit board assembly with a separate connection provided for mating to optical mechanism 740 and HDA 710.

While the foregoing description of this invention has been in relation to preferred embodiments of the data-storage system and associated methods of operation, the illustrated embodiments are possible of a wide variety of modifications without departing from the scope of this invention. Accordingly, the illustrated embodiments should not be viewed as limiting but purely illustrative in nature.

We claim:

1. A multiple-drive controller adapted for use with a host and at least two drive mechanisms, the host having a host interface constituting a first type of interface, one of the two drive mechanisms comprising a player mechanism having means for loading and unloading at least one optical disk therein and having a player-mechanism interface constituting a second type of interface, and the other drive mechanism comprising a head disk assembly (HDA) having fixed media therein and having a HDA interface constituting a third type of interface, the optical disk containing data including ECC check bytes encoded such that a combination of check bytes and a data block define a codeword in a set of Reed Solomon codewords generated over a predetermined finite field, the multiple-drive controller comprising:

at least three independently-operable communication means including: 1) an I/O communication means compatible with the host interface; 2) a player-mechanism communication means compatible with the player-mechanism interface; and 3) a HDA communication means compatible with the HDA interface;

the I/O communication means being shared by the two drive mechanisms and providing for communication of host commands, status, and data via the host interface;

command decoding means shared by the two drive mechanisms for decoding host commands received via the I/O communication means;

buffer memory means shared by the two drive mechanisms;

control means responsive to the command decoding means for providing control signals to cause operations to be performed to cause data to flow through the buffer memory means in paths from the player-mechanism communication means to the I/O communications means and bidirectionally between the I/O communications means and the HDA communications means;

the control means including encoder circuitry for generating ECC check bytes and appending the check bytes to data flowing to the HDA communication means to form a codeword in a set of Reed Solomon codewords generated by the same predetermined finite field used for the optical-disk data.

2. The multiple-drive controller of claim 1, wherein the command decoding means includes a microprocessor.

3. The multiple-drive controller of claim 2, wherein the command decoding means further includes circuit means for partially decoding commands.

4. The multiple-drive controller of claim 1, wherein the control means includes a player-mechanism control means and a HDA control means;

the player-mechanism control means being responsive to the command decoding means for providing player-mechanism control signals to the player-mechanism interface via the player-mechanism communication means to cause a read operation to be performed to cause optical-disk data to be received via the player-mechanism communication means;

the HDA control means being responsive to the command decoding means for operating in parallel with the player-mechanism control means for providing, substantially simultaneously with the player-mechanism control signals, HDA control signals to the HDA interface via the HDA communication means to cause a read operation to be performed to cause fixed-disk data to be received via the HDA communication means.

5. The multiple-drive controller of claim 1, wherein the predetermined finite field is generated by the polynomial:

$$g(x)=x^8+x^4+x^3+x^2+1.$$

6. The multiple-drive controller of claim 5, wherein the primitive element of the predetermined finite field is:

$$\alpha=(00000010).$$

7. The multiple-drive controller of claim 1, wherein the encoder circuitry is defined within a host interface and disk controller integrated circuit.

8. The multiple-drive controller of claim 1, wherein substantially all of the circuitry for the multiple-drive controller is defined on a printed circuit board assembly, and the printed circuit board assembly is attached to the HDA.

9. The multiple-drive controller of claim 1, wherein a plurality of host commands are received in arbitrary sequences, including a sequence of a first-received read command applicable to the player mechanism to retrieve data stored on an optical disk loaded in the player mechanism, and a second-received read command received at a time prior to the completion of execution of the first-received read command and applicable to the HDA to retrieve data stored on the fixed media, and wherein the multiple-drive controller further comprises:

multi-tasking sequencing means shared by the two drive mechanisms for controlling overlapped sequences of operations performed in execution of decoded commands to cause the I/O communication means to transfer, to the host via the host I/O bus, the data retrieved during the sequentially received read commands.

10. A multiple-drive controller adapted for use with a host, a removable-media drive mechanism, and a fixed-media drive mechanism to utilize the fixed-media drive mechanism to provide caching of data read from the removable-media drive mechanism, the host having a host interface constituting a first type of interface, the removable-media drive mechanism comprising a player mechanism having means for loading and unloading at least one optical disk therein and having a player-mechanism interface constituting a second type of interface, and the fixed-media drive mechanism comprising a head disk assembly (HDA) having fixed media therein and having a HDA interface constituting a third type of interface, the multiple-drive controller comprising:

at least three independently-operable communication means including: 1) an I/O communication means compatible with the host interface; 2) a player-mechanism communication means compatible with the player-mechanism interface; and 3) a HDA communication means compatible with the HDA interface;

the I/O communication means being shared by the two drive mechanisms and providing for communication of host commands, status, and data via the host interface;

command decoding means shared by the two drive mechanisms for decoding host commands received via the I/O communication means;

buffer memory means shared by the two drive mechanisms;

control means responsive to the command decoding means for providing control signals to cause operations to be performed to cause data to flow through the buffer memory means in paths from the player-mechanism communication means to the I/O communication means and bidirectionally between the I/O communication means and the HDA communications means;

the control means further including means for providing control signals to cause operations to be performed to transfer data, without use of the host interface, in a path from the player-mechanism control means to the HDA communication means to provide for the caching of the transferred data in the HDA.

11. The multiple-drive controller of claim 10, wherein the command decoding means includes a microprocessor.

12. The multiple-drive controller of claim 11, wherein the command decoding means further includes circuit means for partially decoding commands.

13. The multiple-drive controller of claim 10, wherein the control means includes a player-mechanism control means and a HDA control means;

the player-mechanism control means being responsive to the command decoding means for providing player-mechanism control signals to the player-mechanism interface via the player- mechanism communication means to cause a read operation to be performed to cause optical-disk data to be received via the player-mechanism communication means;

the HDA control means being responsive to the command decoding means for operating in parallel with the player-mechanism control means for providing, substantially simultaneously with the player-mechanism control signals, HDA control signals to the HDA interface via the HDA communication means to cause a read operation to be performed to cause fixed-disk data to be received via the HDA communication means.

14. The multiple-drive controller of claim 10, wherein substantially all of the circuitry for the multiple-drive controller is defined on a printed circuit board assembly, and the printed circuit board assembly is attached to the HDA.

15. The multiple-drive controller of claim 10, wherein a plurality of host commands are received in arbitrary sequences, including a sequence of a first-received read command applicable to the player mechanism to retrieve data stored on an optical disk loaded in the player mechanism, and a second-received read command received at a time prior to the completion of execution of the first-received read command and applicable to the HDA to retrieve data stored on the fixed media, and wherein the multiple-drive controller further comprises:

multi-tasking sequencing means shared by the two drive mechanisms for controlling overlapped sequences of operations performed in execution of decoded commands to cause the I/O communication means to transfer, to the host via the host I/O bus, the data retrieved during the sequentially received read commands.

16. A multiple-drive controller adapted for use with a host and at least two drive mechanisms, the host having a host interface constituting a first type of interface, one of the two drive mechanisms comprising a player mechanism having means for loading and unloading at least one optical disk therein and having a player-mechanism interface constituting a second type of interface, and the other drive mechanism comprising a head disk assembly (HDA) having fixed media therein and having a HDA interface constituting a third type of interface, the multiple-drive controller comprising:

at least three independently-operable communication means including: 1) an I/O communication means compatible with the host interface; 2) a player-mechanism communication means compatible with the player-mechanism interface; and 3) a HDA communication means compatible with the HDA interface;

the I/O communication means being shared by the two drive mechanisms and providing for communication of host commands, status, and data via the host interface;

command decoding means shared by the two drive mechanisms for decoding host commands received via the I/O communication means;

buffer memory means shared by the two drive mechanisms;

control means responsive to the command decoding means for providing control signals to cause operations to be performed to cause data to flow through the buffer memory means in paths from the player-mechanism communication means to the I/O communication means and bidirectionally between the I/O communication means and the HDA communications means;

the control means further including means for causing optical-disk data defining a table of contents to flow from the player-mechanism communication means to the buffer memory means, and including means for utilizing the table of contents to determine address data for controlling read operations of the player mechanism;

the control means further including buffer manager means;

the buffer manager means including buffer-writing means, buffer-reading means, and buffer-access arbitration means;

the buffer memory means and the buffer manager means being shared by the two drive mechanisms with the buffer-access arbitration means causing the buffer-writing means to be time-shared to store, in the buffer memory means, optical-disk data received from the player mechanism unit fixed-disk data from the HDA and causing the buffer-reading means to be time-shared to retrieve, from the buffer memory means, optical-disk data and fixed-disk data; and the I/O communication means receiving data from the buffer-reading means, and including means for transferring, to the host via the host interface, such data received from the buffer-reading means.

17. The multiple-drive controller of claim 16, wherein the command decoding means includes a microprocessor.

18. The multiple-drive controller of claim 17, wherein the command decoding means further includes circuit means for partially decoding commands.

19. The multiple-drive controller of claim 16, wherein the control means includes a player-mechanism control means and a HDA control means;

the player-mechanism control means being responsive to the command decoding means for providing player-mechanism control signals to the player-mechanism interface via the player-mechanism communication means to cause a read operation to be performed to cause optical-disk data to be received via the player-mechanism communication means;

the HDA control means being responsive to the command decoding means for operating in parallel with the player-mechanism control means for providing, substantially simultaneously with the player-mechanism control signals, HDA control signals to the HDA interface via the HDA communication means to cause a read operation to be performed to cause fixed-disk data to be received via the HDA communication means.

20. The multiple-drive controller of claim 16, wherein substantially all of the circuitry for the multiple-drive controller is defined on a printed circuit board assembly, and the printed circuit board assembly is attached to the HDA.

* * * * *

UNITED STATES PATENT AND TRADEMARK OFFICE
CERTIFICATE OF CORRECTION

PATENT NO. : 5,661,848
DATED : August 26, 1997
INVENTOR(S) : Carl E. Bonke, Devon Worrell, Kenneth D'Souza, Kiem Nguyen It is certified that error appears in the above-identified patent and that said Letters Patent is hereby corrected as shown below:

The Assignee of this patent is Western Digital Corporation, Irvine, California.

In Claim 16, at Column 48, Line 52, after the words "player mechanism", please delete the word --unit--

Signed and Sealed this

Seventh Day of July, 1998

Attest:

BRUCE LEHMAN

*Attesting Officer*  *Commissioner of Patents and Trademarks*